United States Patent [19]
Browning

[11] Patent Number: 5,261,858
[45] Date of Patent: Nov. 16, 1993

[54] METHOD AND SYSTEM FOR COMPUTER-CONTROLLED BICYCLE GEAR SHIFTING

[75] Inventor: David L. Browning, Bainbridge Island, Wash.

[73] Assignee: Browning Automatic Transmission, Bainbridge Island, Wash.

[21] Appl. No.: 901,549

[22] Filed: Jun. 19, 1992

[51] Int. Cl.$^5$ .............................................. F16H 59/00
[52] U.S. Cl. ........................................ 474/69; 474/78
[58] Field of Search ..................................... 474/69–80, 474/18; 280/236, 238; 364/424.01, 424.04, 424.05

[56] References Cited

U.S. PATENT DOCUMENTS

| | | | |
|---|---|---|---|
| 4,490,127 | 12/1984 | Matsumoto et al. | 474/110 |
| 4,605,240 | 8/1986 | Clem et al. | 280/236 |
| 4,713,042 | 12/1987 | Imhoff | 474/69 |
| 4,887,990 | 12/1989 | Bonnard et al. | 474/78 |
| 4,952,196 | 8/1990 | Chilcote et al. | 474/70 |

OTHER PUBLICATIONS

Zimmer, Carl "Easy Rider," *Discover*, Aug. 1990, p. 30.

*Primary Examiner*—Thuy M. Bui
*Attorney, Agent, or Firm*—Seed and Berry

[57] ABSTRACT

A method and system for computer-controlled shifting of a bicycle is provided. In preferred embodiments, the present invention provides a computer system that detects speed, hub speed, and crank speed, determines the optimum bicycle gear selection to maintain a desired cadence, and shifts the bicycle to the optimum bicycle gear. The computer also inputs a shift up and shift down signals from the cyclist to override the computer-selected gear. When the cyclist indicates a shift up or down, the computer adjusts the desired cadence. The computer determines the gear selection to ensure a uniform transition from the current gear to the next gear. The computer ensures that when shifting from the current gear to the next gear, the bicycle does not transition through a gear that is not between the current and next gears.

45 Claims, 37 Drawing Sheets

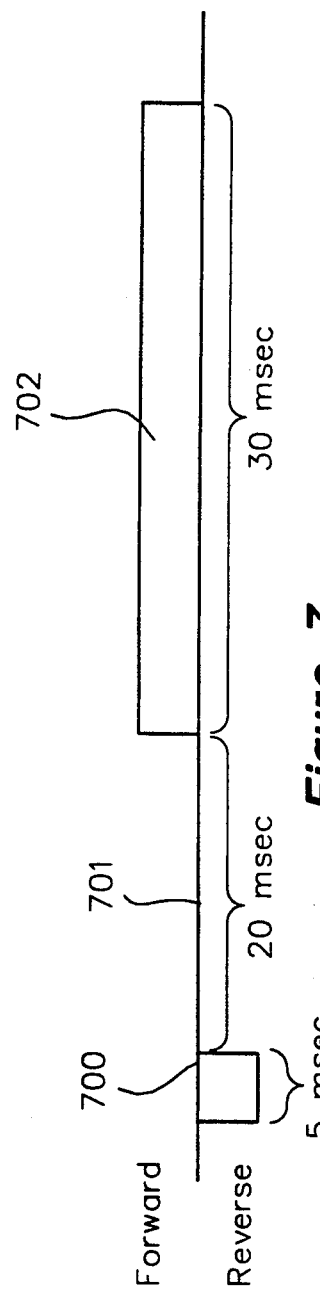
Figure 7
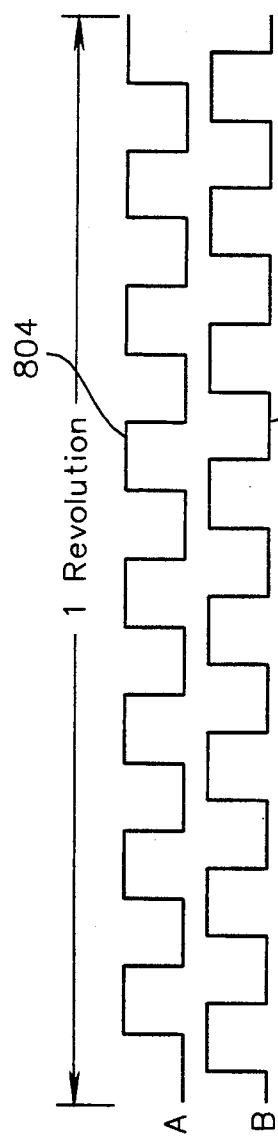
Figure 8B
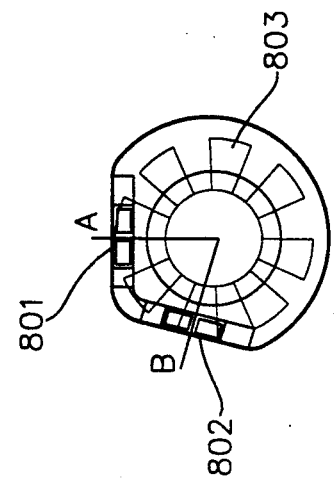
Figure 8A
Figure 8C

METHOD AND SYSTEM FOR COMPUTER-CONTROLLED BICYCLE GEAR SHIFTING

TECHNICAL FIELD

This invention relates generally to the shifting of a bicycle chain and, more particularly, to computer controlled automatic shifting of a bicycle chain.

BACKGROUND OF THE INVENTION

Multigeared bicycles typically are shifted manually under the control of the cyclist. Generally, multigeared bicycles have a gear assembly at the rear wheel (rear gear assembly), and one at the pedal-crank assembly (front gear assembly). The cyclist can independently select a front gear and a rear gear. By selecting appropriate front and rear gears, a cyclist determines a gear ratio that is suitable for the riding conditions. For example, a cyclist may select a low gear ratio when traveling uphill and a high gear ratio when traveling downhill at a high rate of speed. The gear ratio specifies the number of revolutions that the rear wheel turns per revolution of the pedal crank assembly. Each combination of a front and rear gear is referred to as a bicycle gear. The bicycle gears are ordered from gear 1 (low gear) based on the gear ratio. In the following, the term "bicycle gear" refers to a particular front and rear gear combination.

Many cyclists find it desirable and comfortable to travel at a constant cadence. The cadence is the speed at which the cyclist pedals. To maintain a constant cadence, the cyclist shifts gears based on the riding conditions. For example, a cyclist may select a desired cadence. The cyclist may be comfortable pedalling at this cadence when the bicycle is in the highest gear traveling on level terrain. If, however, the cyclist encounters a slight rise in the terrain, it may be uncomfortable (too hard) to pedal at the desired cadence. The cyclist shifts to a lower gear so that the desired cadence can be maintained. It is, however, often difficult for a cyclist to maintain a constant cadence. The cyclist may not know which gear should be selected to maintain the desired cadence. Also, the cyclist may have to shift both the front and rear gears to maintain the desired cadence. This can be cumbersome, especially when the terrain changes often.

SUMMARY OF THE INVENTION

It is an object of the present invention to provide a computer-controlled bicycle shifting system.

It is another object of the present invention to provide a computer-controlled bicycle shifting system which shifts the bicycle to maintain a desired cadence.

It is another object of the present invention to provide a computer-controlled bicycle shifting system which shifts the bicycle in response to input by a cyclist and adjusts the desired cadence.

It is another object of the present invention to provide a computer-controlled bicycle shifting system which determines the actual gear currently selected.

It is another object of the present invention to provide a computer-controlled bicycle shifting system which uses an adjustable hysteresis to effect a more uniform cadence.

It is another object of the present invention to provide a computer-controlled bicycle shifting system which shifts the bicycle only while it is being pedalled in the forward direction.

These and other objects, which will become more apparent as the invention is described more fully below, are obtained by providing an improved bicycle shifting system. In preferred embodiments, a computer controls the shifting of a multigeared bicycle. The computer senses wheel speed, hub position, and crank direction and position, and controls the shifting for the crank (front) gear and hub (rear) gear assemblies to maintain a desired cadence. In a preferred embodiment, the computer selects the next gear to shift to from the current gear to ensure that the next gear can be reached without shifting into a gear that is not between the current gear and the next gear. In a preferred embodiment, the computer maintains a shift up and a shift down wheel speed and shifts the bicycle either up or down when the current wheel speed is outside the range. When gears are shifted, the computer determines new shift up and shift down wheel speeds to correspond to a desired cadence. While in a given gear, the computer adjusts the shift up and shift down wheel speeds to ensure a more uniform cadence. In a preferred embodiment, the computer counts the number of crank and hub revolutions during a specified interval and determines the actual gear selected. In a preferred embodiment, a quadrature signal is generated when the bicycle is being pedalled. From the quadrature signal, the computer determines the direction of pedalling and signals a shifting mechanism to shift only when the bicycle is being pedalled into the forward direction. In a preferred embodiment, a cyclist signals the computer to shift up or shift down to override the computer-generated shifting. In response, the computer resets its internally maintained desired cadence so that it will shift the bicycle to the new gear whenever the bicycle is traveling at the same speed as when the cyclist signalled the shift.

BRIEF DESCRIPTION OF THE DRAWINGS

FIG. 7 shows signal waveform that is supplied to the shift selector in a preferred embodiment.

FIG. 8A shows the location of the crank sensors relative to the rotor.

FIG. 8B shows the signals generated when the crank is pedalled in the forward direction for one revolution.

FIG. 8C shows the output of sensors A and B when the bicycle is being pedalled in the forward and reverse directions.

DETAILED DESCRIPTION OF THE INVENTION

The present invention provides a computer-controlled shifting system for a bicycle. The system senses wheel speed, hub position, and crank position and direction and automatically shifts the bicycle. In a preferred embodiment, the shifting system interfaces with the bicycle transmission system of the type described in U.S. Pat. Ser. No. 5,073,152, entitled "BICYCLE TRANSMISSION," which is hereby incorporated by reference. One skilled in the art would appreciate that the methods of the present invention can be adapted to interface with other bicycle and non-bicycle transmission systems.

Figure 1A:
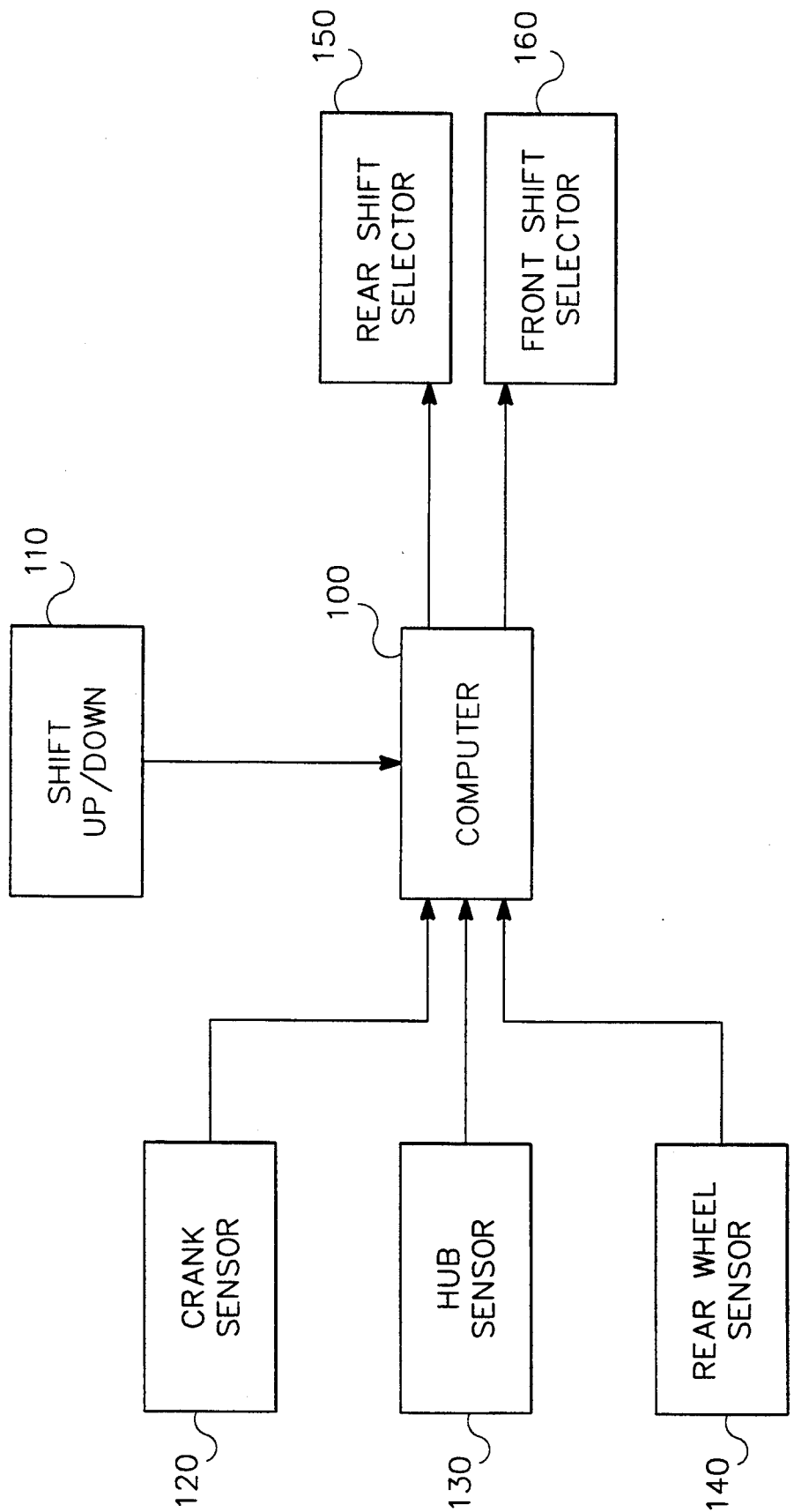
FIG. 1A is a schematic diagram of a computer-controlled shifting system in a preferred embodiment.
Figure 1B:
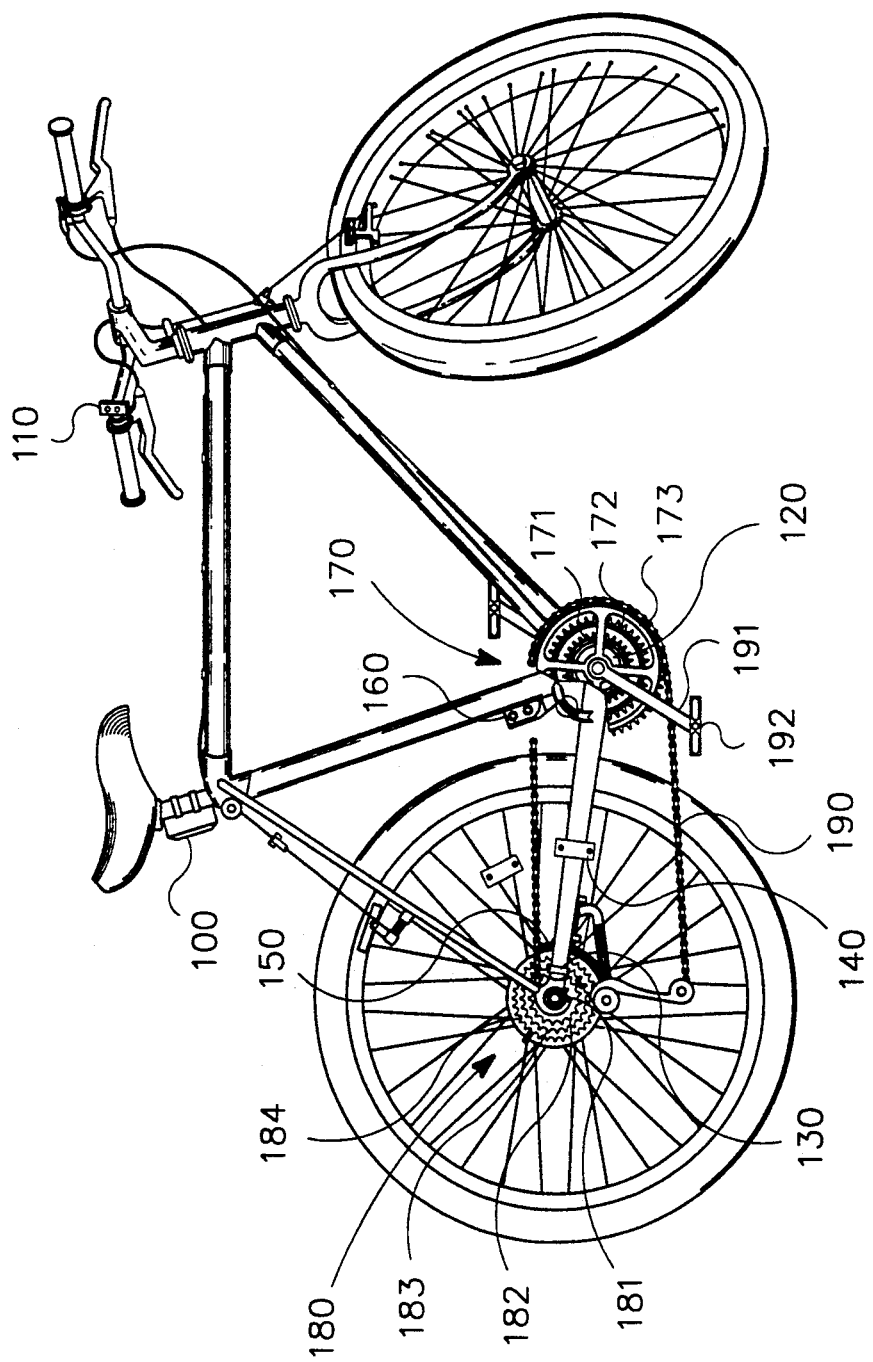
FIG. 1B shows the shifting system interfacing with a bicycle transmission system.

FIG. 1A is a schematic diagram of a computer-controlled bicycle shifting system in a preferred embodiment. The system comprises computer 100, shift buttons 110, crank sensor 120, hub sensor 130, rear wheel sensor 140, rear shift selector 150, and front shift selector 160. FIG. 1B shows the shifting system interfacing with a bicycle transmission system. The bicycle includes front gear assembly 170, rear gear assembly 180, transmission chain 190, pedal arms 191, and pedals 192. The front gear assembly 170 includes three gears 171, 172, and 173 with 30, 38, and 48 teeth, respectively. The rear gear assembly 180 includes four gears 181, 182, 183 and 184 with 12, 17, 23, and 32 gears, respectively. In operation, computer 100 inputs data from the shift buttons 110, crank sensor 120, hub sensor 130, and rear Wheel sensor 140 and outputs shift signals to the rear shift selector 150 and the front shift selector 160. The rear shift selector 150 effects the shifting of the chain 190 from one rear gear to another. The front shift selector 160 effects the shifting of the chain 190 from one front gear to another. In a preferred embodiment, crank sensor 120 sends a quadrature signal to the computer 100 each ⅛th of a revolution of the crank assembly (front gear assembly 170, pedal arms 191, and pedals 192). The hub sensor 130 sends a signal to the computer 100 for each revolution of the rear gear assembly 180. The rear wheel sensor 140 sends a signal to the computer 100 for each revolution of the rear wheel. The shift buttons 110 send a shift up or shift down signal to the computer 100 as the cyclist depresses the buttons. Based on these input signals, the computer 100 determines an appropriate bicycle gear and signals the front shift selector 160 and rear shift selector 150 to effect the shifting into the determined gear. In a preferred embodiment using the bicycle transmission of U.S. Pat. Ser. No. 5,073,152, the hub sensor 130 is positioned relative to shifting pawl 40 and selector 42 so that a hub signal is generated as the shifting pawl 40 exits the selector 42. This positioning ensures that the computer system can time the rear shifts to occur when the shifting pawl is not within the selector.

In a preferred embodiment, the computer 100 performs several functions: (1) determining the front and rear gears that are currently selected, (2) determining the wheel speed, hub position, and crank position and direction, (3) determining the crank direction of rotation and angular movement of the crank, (4) determining the positioning of the shifting pawl in relation to the shift selector, (5) shifting the front and rear gears to maintain a desired cadence, and (6) adjusting the desired cadence based on the shift up and down signals received from the cyclist. The computer is initialized with a predefined desired cadence. As the bicycle is pedalled, the computer determines the currently selected gear and monitors the wheel speed, hub position, and crank position and direction. When the actual wheel speed is not near the desired wheel speed, the computer selects a new gear and controls the shifting to that gear. The computer sends signals to the shift selectors to effect the shifting to the new gear. The computer periodically determines the currently selected gear based on the ratio of crank to hub speed. This periodic determination ensures that the computer knows what gear the bicycle is in not only at start-up, but also in the event a misshift occurs. A misshift occurs when the computer tries to shift to one gear but for some mechanical reason the bicycle is not shifted into that gear. The computer also determines the crank direction of rotation (direction the cyclist is pedalling) to ensure that the bicycle is shifted only when it is being pedalled in the forward direction. The cyclist adjusts the desired cadence by pressing the shift up and down buttons on the control panel.

Illegal Gear Shifts

To improve cyclist comfort, the system of the present invention uses the concept of an illegal gear shift. Table 1 is the gear table in a preferred embodiment. The gear table shows the number of teeth in the front and rear gear assemblies for each gear.

TABLE 1

| Gear | Front | Rear |
|------|-------|------|
| 1    | 30    | 32   |
| 2    | 38    | 32   |
| 3    | 30    | 23   |
| 4    | 48    | 32   |
| 5    | 38    | 23   |
| 6    | 30    | 17   |
| 7    | 48    | 23   |
| 8    | 38    | 17   |
| 9    | 30    | 12   |
| 10   | 48    | 17   |
| 11   | 38    | 12   |
| 12   | 48    | 12   |

An illegal shift is a shift from a first gear to a second gear such that the bicycle must transition through a third gear that is not between the first and second gears to get from the first to the second gear. An example will help illustrate illegal shifts. It is illegal to shift from gear 3 to gear 4 of Table 1. Gear 3 has a front to rear gear ratio of 30/23 and gear 4 has a gear ratio of 48/32. If the front gear assembly is shifted up one gear (front 30 to 38), then the bicycle will be in gear ratio 38/23, which is gear 5, which is outside the range of gears 3 and 4. Similarly, if the rear gear assembly is shifted up one gear (rear 23 to 17), then the bicycle will be in gear ratio 30/17, which is gear 6, which is again outside the range of gears 3 and 4. Thus, to shift from gear 3 to gear 4, the bicycle will temporarily be in gear 5 or gear 6, depending on whether the front gear or rear gear assembly is shifted first. Similarly, the shift from gear 3 to gear 2 is an illegal shift. However, the shift from gear 3 to gear 1 is a legal shift because by shifting the rear gear assembly down the bicycle transitions directly from gear 3 to gear 1. Similarly, the shift from gear 3 to gear 5 or gear 6 is a legal shift.

Table 2 shows for each gear the legal gears associated with a single up or down shift of the front or rear gear assemblies. For example, the legal single shifts for gear 6 are gears 3, 8, and 9. Gear 3 can be reached by shifting the rear assembly to the next lower gear (rear 17 to 23). Gear 1 can also be reached without transitioning through a gear that is not between gears 6 and 1. However, two shifts of the rear gear assembly are needed (rear 17 to 23 to 32). One skilled in the art would appreciate that legal shifts can be derived for other front and rear gear ratios. It should also be noted that an illegal shift can only occur when the transmission system has multiple gears on both the crank (front gear) and hub (rear gear) assemblies. If, for example, the crank assembly has only one gear, then any shift of the rear gear is necessarily legal.

TABLE 2

| Gear | Legal Gears |
|------|-------------|
| 1    | 2, 3        |
| 2    | 1, 4, 5     |
| 3    | 1, 5, 6     |
| 4    | 2, 7        |
| 5    | 2, 3, 7, 8  |
| 6    | 3, 8, 9     |
| 7    | 4, 5, 10    |
| 8    | 5, 6, 10, 11|
| 9    | 6, 11       |
| 10   | 7, 8, 12    |
| 11   | 8, 9, 12    |
| 12   | 10, 11      |

Ajustable Hysteresis

The present invention uses adjustable hysteresis when shifting to ensure that the shifting does not occur too often. When the bicycle is shifted into a new gear, the computer establishes a desired wheel speed and a shift up and a shift down wheel speed for the new gear. The desired wheel speed is attained when the bicycle is being pedalled at the desired cadence in the new gear. The shift up wheel speed indicates the wheel speed at which the computer will automatically shift into a higher gear, and the shift down wheel speed indicates the wheel speed at which that computer will automatically shift into a lower gear. The shift up wheel speed is set to be higher than the current wheel speed, and the shift down wheel speed is set to be lower than the current wheel speed. The setting of these shift up and shift down wheel speeds results in a hysteresis effect. When the current wheel speed passes the shift up wheel speed or shift down wheel speed, the computer generates a shift up or shift down signal if the crank and hub assemblies are properly positioned. In a preferred embodiment, the computer adjusts these shift up and shift down wheel speeds in certain situations to ensure a more uniform cadence. When a shift up occurs and the wheel speed increases past the desired wheel speed, the shift down wheel speed is increased to minimize the deviation from the desired cadence should the wheel speed subsequently decrease. Similarly, when a shift down occurs and the wheel speed decreases past the desired wheel speed, the shift up wheel speed is decreased to minimize the deviation from the desired cadence should the wheel speed subsequently increase.

In a preferred embodiment, the computer maintains spoke time as an indicator of wheel speed. The spoke time is the time (in milliseconds) for one revolution of the wheel. The shift up and shift down points are maintained as spoke times. The shift points are set on every shift and may be reset when the current spoke time equals the desired spoke time for the current gear. When a shift up occurs, the shift up point is set to halfway between the desired spoke time of the current gear and the desired spoke time of the next higher legal gear and the shift down point is set to the desired spoke time of the next lower legal gear. After the shift up, when the spoke time decreases (as the wheel speed increases), then the spoke time will become equal to or less than the desired spoke time for the current gear. At this point, the computer resets the shift down point to halfway between the desired spoke time of the current gear and the desired spoke time of the next lower legal gear. After this resetting, the shift up and down points are halfway between the desired spoke time for the current gear and the desired spoke times for the next legal gear above and below, respectively. After a shift down, the shift up and down points are set and reset in an analogous manner.

Figure 2C:
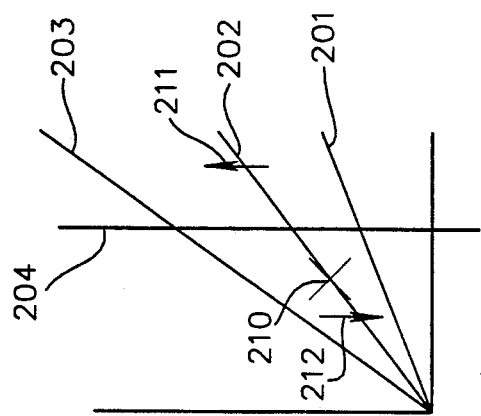
FIGS. 2A through 2E illustrate setting and adjusting of the shift points.
Figure 2E:
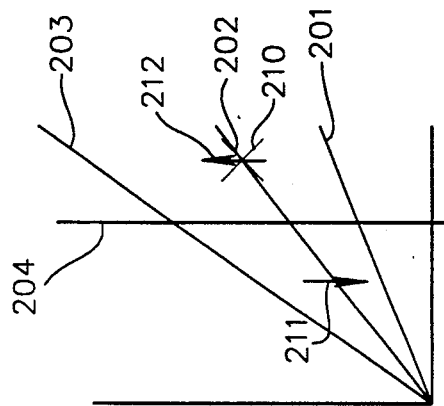
Figure 2B:
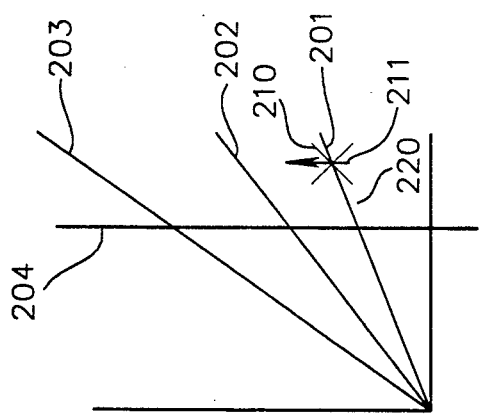
Figure 2D:
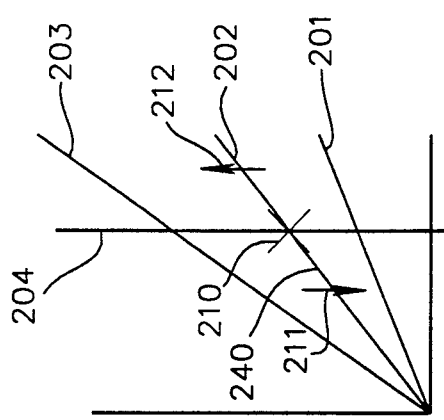
Figure 2A:
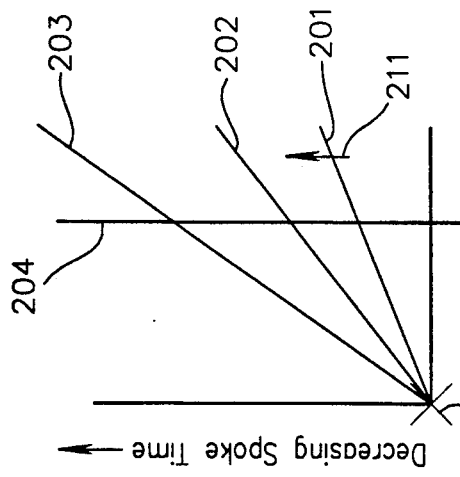

FIGS. 2A through 2E illustrate setting and resetting of the shift points after a shift up. The X-axis represents increasing cadence and the Y-axis represents decreasing spoke time (or increasing wheel speed). Lines 201, 202, and 203 graph the cadence Versus spoke time for three gears. In the preferred embodiment, these lines represent gears 1, 2, and 4, respectively. Line 204 represents the desired cadence. The X 210 represents the current state of the bicycle, the up arrow 211 represents the shift up point, and the down arrow 212 represents the shift down point. FIG. 2A shows the current state 210 and the shift up point 211 as the cyclist first begins to pedal in gear 1. The shift up point 211 is set at halfway between the desired spoke time for the current gear (the spoke time corresponding to the intersection of lines 201 and 204) and the desired spoke time for the net legal gear above (the spoke time corresponding to the intersection of lines 202 and 204). The shift down point (not shown in FIG. 2A) is set to infinity to inhibit down shifts from gear 1. FIG. 2B shows at embolden line 220 that as the cadence increases, the current spoke time becomes equal to or less than the spoke time at the shift up point 211, which triggers a shift up. FIG. 2C shows the state of the bicycle after the up shift. The X 210 indicates that the bicycle is now in the gear represented by line 202. The up arrow 211 indicates that the shift up point is set to a spoke time halfway between the desired spoke time for gear 2 and gear 4. The down arrow 212 indicates that the shift down point is set at the desired spoke time for gear 1. FIG. 2D shows that the shift down point is adjusted as the current spoke time becomes equal to or less than the desired spoke time for gear 2. The shift down point 211 is reset to halfway between the desired spoke time for gear 2 and gear 1. FIG. 2E shows that when the spoke time becomes equal to or less than the shift up point, then the system shifts to gear 4.

Cyclist Controlled Shifting

In a preferred embodiment, the control panel provides a shift up button and a shift down button to allow a cyclist to override the current computer selected gear. The computer adjusts the desired cadence in response to the shift up and shift down buttons. A shift up signal indicates that the cyclist wants to be in a higher gear when traveling at the current speed. Conversely, a shift down signal indicates that the cyclist wants to be in a lower gear when traveling at the current speed. Thus, a shift up signal lowers the desired cadence, and a shift down signal raises the desired cadence. When the computer receives a shift up or shift down signal, the system shifts the bicycle to the next legal higher or lower gear, sets the desired spoke time for the gear, and sets the shift up and down points. For example, if the desired cadence is 64, then the desired spoke time for gear 12 is 234 milliseconds, and the desired spoke time for gear 11 is 296 milliseconds. The shift spoke time for gears 11 and 12 is 265 [(234+296)/2] milliseconds. The shift spoke time refers to the spoke time that is halfway between the desired spoke times of two legal gears. If the bicycle is in gear 12 with a current spoke time of 240 when a shift down signal is received, then the computer sets the shift spoke time for gears 11 and 12 to 240. The cyclist may think of this as setting the speed at which the computer should automatically shift from gear 12 to gear 11 to the current speed. The computer calculates the desired spoke time for gears 11 and 12 such that the 240 is halfway between the desired spoke times for gears 11 and 12. In this example, the desired spoke time for gear 11 would be set at 268 and for gear 12 at 212, which corresponds to a desired cadence of 71.

Internally, the computer maintains a table of the desired spoke time for each gear. As described above, the desired spoke time for a gear corresponds to the desired cadence. When a shift up or down signal is detected, the system adjusts the desired spoke time table to reflect the new desired cadence. Table 3 shows the desired spoke times corresponding to a desired cadence of 64. As shown in Table 3, if the bicycle is in gear 7 and the cadence is 64, then the current spoke time is 448 milliseconds.

The desired spoke time for each gear is adjusted in the following manner when a shift up or down button is pressed. If the bicycle is in gear 3 with a current spoke time of 700 when the shift up button is pressed, the computer causes the bicycle to shift into the next higher legal gear, which is gear 5, and adjusts the desired spoke times as shown in Table 4. The new desired spoke times of Table 4 are generated by multiplying each of the spoke times in Table 3 by the current spoke time divided by the shift spoke time for gears 3 and 5 [i.e., 700/((723+566)/2)]. For example, the adjusted desired spoke time for gear 1 is 1000 (the desired spoke time at a cadence of 64) times 700/645, which equals 1085. The new desired cadence is 59 (i.e., 64*645/700), which results in a desired spoke time of 614 milliseconds for gear 5. The system also adjusts the shift up and shift down points based on the desired spoke times of Table 4.

TABLE 3

| Gear | Desired Cadence = 64 |
|---|---|
|  | Spoke Time |
| 1 | 1000 |
| 2 | 789 |
| 3 | 723 |
| 4 | 625 |
| 5 | 566 |
| 6 | 531 |
| 7 | 448 |
| 8 | 420 |
| 9 | 375 |
| 10 | 331 |
| 11 | 296 |
| 12 | 234 |

TABLE 4

| Gear | Desired Cadence = 59 |
|---|---|
|  | Spoke Time |
| 1 | 1085 |
| 2 | 856 |
| 3 | 785 |
| 4 | 678 |
| 5 | 614 |
| 6 | 576 |
| 7 | 486 |
| 8 | 456 |
| 9 | 407 |
| 10 | 359 |
| 11 | 321 |
| 12 | 254 |

If the spoke time decreases to 645 while still in gear 5 and a shift down button is pressed, the computer causes the bicycle to shift into the next lower gear, gear 3, and set the desired spoke times. The new desired spoke times can be generated by multiplying each of the current desired spoke times of Table 4 by the current spoke time divided by the shift spoke time for gears 3 and 5 [i.e., 645/((785+614)/2)]. Alternatively, the new desired spoke times can be generated by multiplying each of the desired spoke times for a cadence of 64 in Table 3 by the current spoke time divided by the shift spoke time for gears 3 and 5 of Table 3 [i.e., 645/((723+566)/2)]. The use of a standard table of spoke times (e.g., for a cadence of 64) for calculating the desired spoke time helps reduce the loss of arithmetic precision that may result from repeated division.

True Gear

In a preferred embodiment of the present invention, the computer system determines the actual gear the bicycle is in based on the hub angular speed and crank angular speed. The crank sensors generate 8 signals per revolution of the crank (one signal per one-eighth of a revolution), and the hub sensor generates 1 signal per revolution of the hub. The system counts the number of crank signals that are generated during 5 hub signals and from that count determines the current gear of the bicycle. This is referred to as the true gear. Table 5 shows the number of crank signals generated during 5 hub signals for each of the gears. For example, when in gear 5, 24.2 cranks signals are generated during 5 hub revolutions. Table 5 is generated by applying the following formula for each gear:

$$\frac{5 * \# \text{ of rear teeth}}{\# \text{ of front teeth}} * 8$$

In the case of gear 5, $$\frac{5 * 23}{38} * 8 = 24.2$$

When in gear 5, the system will count 24 crank signals most of the time, but sometimes will count 25 signals. The average signal count for gear 5 is 24.2. The system uses 5 hub revolutions because it generates a unique number(s) of crank signals for each gear. For example, if 19 or 20 crank signals are generated during 5 hub revolutions, then the bicycle is in gear 7. Because the number of crank signal is 19.2, sometimes 19 may be detected, and other times 20 may be detected when the bicycle is in gear 7. However, if 17 or 18 crank signals are detected, then the bicycle is in gear 8. If the system were to use only 4 hub revolutions, a unique number of cranks signals would not be generated for each gear. Table 5 also shows the number of crank signals generated during 4 hub revolutions for each gear. Note that if 15 crank signals are detected, then the bicycle could be either in gear 7 or 8. The system cannot consistently determine the true gear of the bicycle when counting only 4 hub revolutions. One skilled in the art would appreciate that a similar table could be developed for transmission systems with different gear ratios and when the hub and crank sensors generate different number of signals per revolution.

TABLE 5

| Gear | 5 Hub Revolutions | 4 Hub Revolutions |
| --- | --- | --- |
| 1 | 42.7 | 34.1 |
| 2 | 33.7 | 26.9 |
| 3 | 30.7 | 24.3 |

TABLE 5-continued

| Gear | 5 Hub Revolutions | 4 Hub Revolutions |
| --- | --- | --- |
| 4 | 26.7 | 21.3 |
| 5 | 24.2 | 19.4 |
| 6 | 22.7 | 18.1 |
| 7 | 19.2 | 15.3 |
| 8 | 17.9 | 14.3 |
| 9 | 16 | 12.8 |
| 10 | 14.2 | 11.3 |
| 11 | 12.6 | 10.1 |
| 12 | 10 | 8 |

In a preferred embodiment, the true gear is determined by using the number of crank signals counted as an index into Table 6. The entries in Table 6 for the corresponding number of crank signals is the true gear. For example, if 20 crank signals are detected, the system uses 20 as the index into Table 6 and retrieves the true gear, which is 7. A zero in an entry of Table 6 indicates that there is no gear ratio which will produce the indexed number of crank signals during 5 hub revolutions. For example, if 28 crank signals were detected, then the gear ratio would need to be between that of gear 3 and gear 4. Since there is no gear in-between, entry 28 in Table 6 has a zero entry.

TABLE 6

| Index = Crank Signals | Gear |
| --- | --- |
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 12 |
| 11 | 0 |
| 12 | 11 |
| 13 | 11 |
| 14 | 10 |
| 15 | 10 |
| 16 | 9 |
| 17 | 8 |
| 18 | 8 |
| 19 | 7 |
| 20 | 7 |
| 21 | 0 |
| 22 | 6 |
| 23 | 6 |
| 24 | 5 |
| 25 | 5 |
| 26 | 4 |
| 27 | 4 |
| 28 | 0 |
| 29 | 0 |
| 30 | 3 |
| 31 | 3 |
| 32 | 0 |
| 33 | 2 |
| 34 | 2 |
| 35 | 0 |
| 36 | 0 |
| 37 | 0 |
| 38 | 0 |
| 39 | 0 |
| 40 | 0 |
| 41 | 0 |
| 42 | 1 |
| 43 | 1 |

Ready to Shift

In a preferred embodiment, the system ensures that the bicycle is being pedalled in the forward direction before a shift is generated. As explained below in detail, the system determines whether the cyclist is pedalling in a forward or reverse direction. If the cyclist is not pedalling in the forward direction, then the system does not shift bicycle gears. For example, if the bicycle is gaining speed while traveling downhill but the cyclist is not pedalling, then the system will not attempt to shift the bicycle. The system also ensures that the previous shifts are complete before a new shift is generated. In a preferred embodiment, the hub sensor is positioned so that a signal is generated shortly after the shift pawl exits the shift selector. This positioning ensures that the previous shift was complete. Similarly, a sensor could be placed on the crank to signal when the shifting pawl exits the shift selector on the front gear assembly. Alternatively, the system could use the quadrature signal to determine that the crank has been pedalled at least one revolution in the forward direction, which would also ensure that the shift pawl has exited the shift selector.

Selector Control

In a preferred embodiment, the shift selector is the type described in U.S. Pat. No. 4,894,046, entitled "Control Unit for Chain Shifter," which is hereby incorporated by reference.

Figure 3:
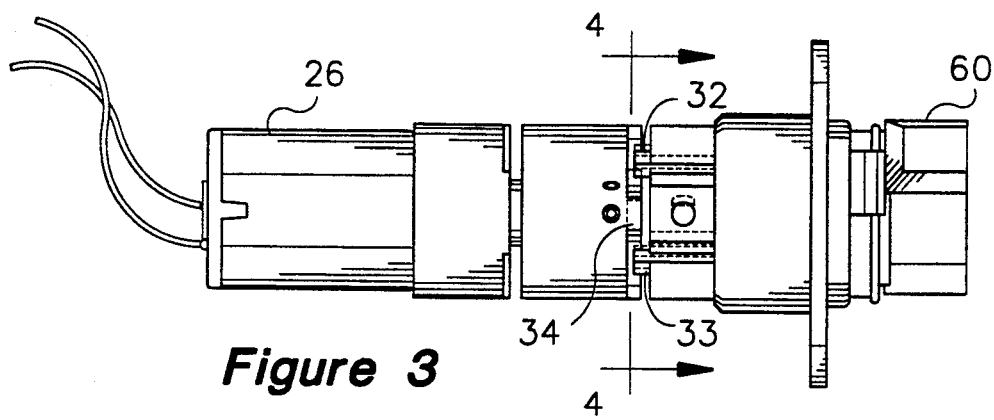
FIG. 3 is a side view of a preferred shift selector.

FIG. 3 shows a diagram of a preferred shift selector. The shift selector includes reversible motor 26, lobe 34, latch arms 32 and 33, and pawl guide 60. Driving the motor 26 in one direction causes pawl guide 60 to shift a gear assembly into a higher gear, and driving the motor 26 in the opposite direction causes pawl guide 60 to shift a gear assembly into a lower gear. When the motor is driven in the one direction, lobe 34 pushes against latch arm 33. The pushing of latch arm 33 causes pawl guide 60 to effect a shift. When the motor is driven in the opposite direction, lobe 34 pushes against latch arm 32. The pushing of latch arm 32 cause pawl guide 60 to effect a shift.

Figure 4:
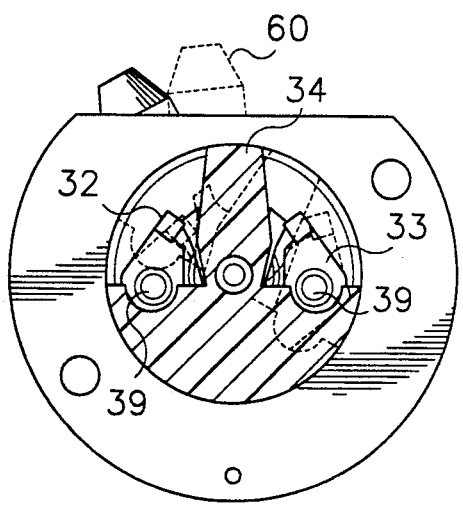
FIGS. 4 and 5 show the movement of the shift selector in a preferred embodiment.
Figure 5:
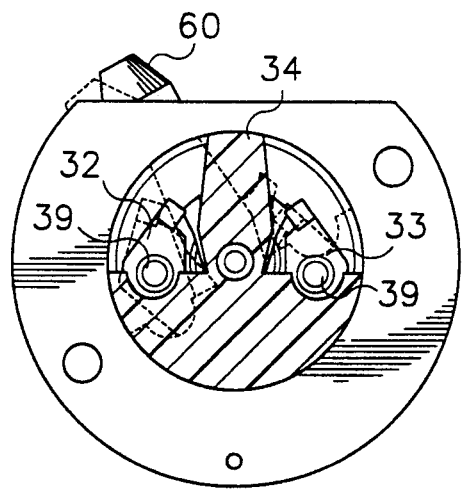

FIG. 4 shows motion of lobe 34 as it pushes against latch arm 33. Lobe 34 is typically positioned at a distance from both latch arms. As the motor is driven, lobe 34 rotates toward latch arm 33. When lobe 34 contacts latch arm 33, the latch arm pivots about pin 39. This motion is shown by the dashed lines. This pivoting causes the movement of pawl guide 60. After lobe 34 strikes the latch arm 33, it typically bounces away from latch arm 33 into a position in which it does not contact either latch arm 32 or 33. FIG. 5 shows the motion of lobe 34 as it pushes against latch arm 32.

Figure 6:
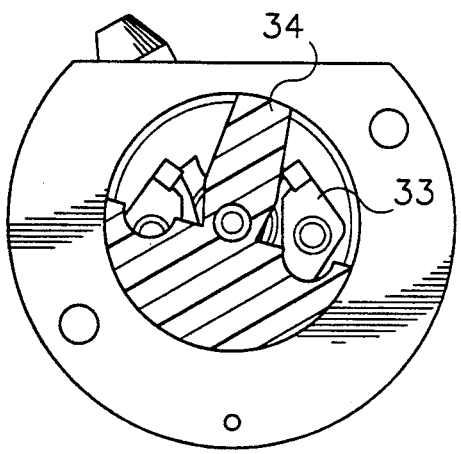
FIG. 6 shows the shift selector as a battery wears down in a preferred embodiment.
Figure 9:
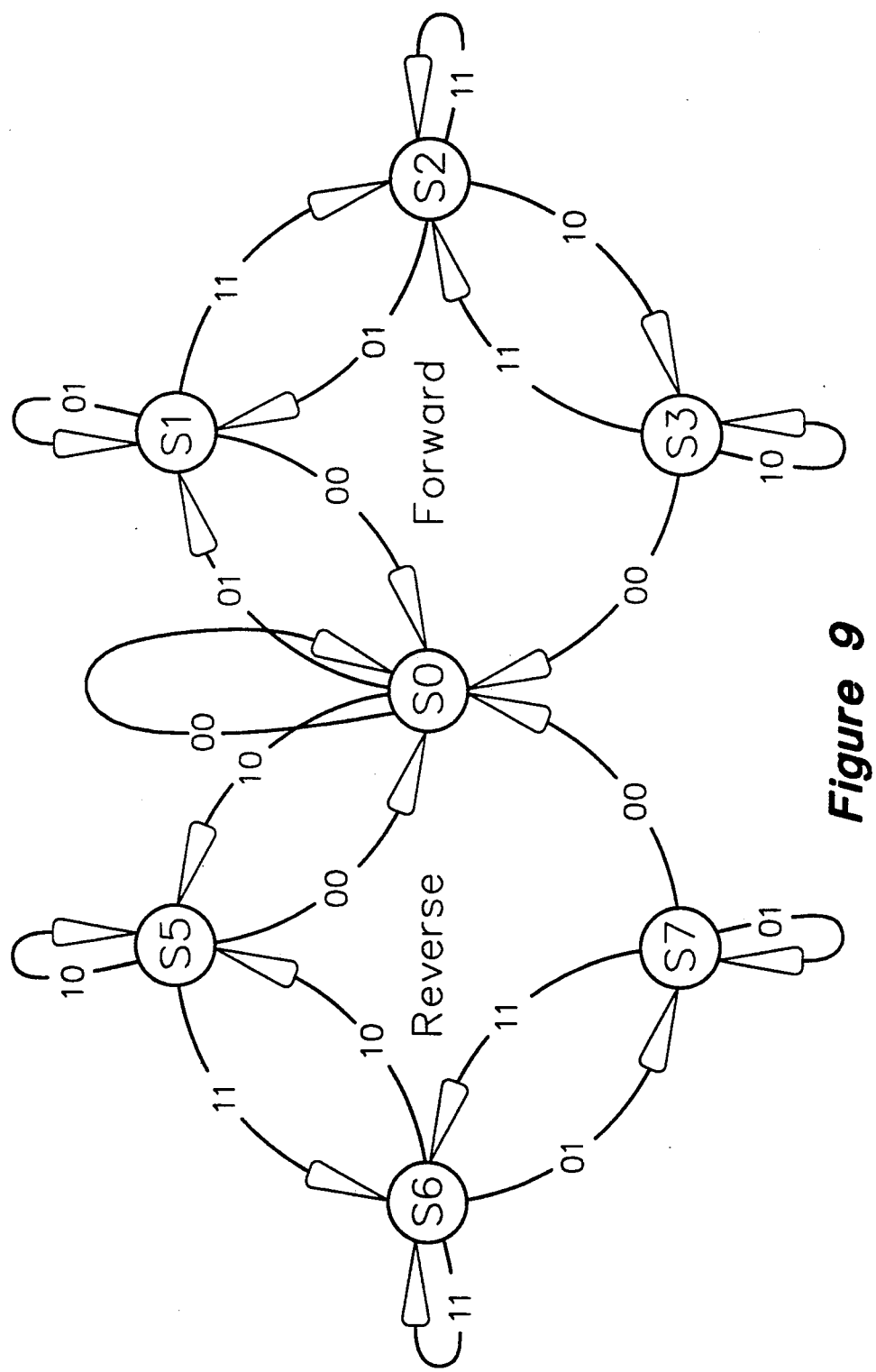
FIG. 9 is a state diagram for the states of the crank.

In certain situations, such as when the battery is low, lobe 34 strikes a latch arm with enough force to effect a shift, but instead of bouncing away from the latch arm, it may rest against the latch arm or be very close to the latch arm. When a subsequent attempt is made to shift in the same direction, the lobe 34 may not be able to strike the latch arm with enough force to effect a shift. FIG. 6 shows lobe 34 resting against latch arm 33 after a shift.

In a preferred embodiment, the present invention backs lobe 34 away from a latch arm before the motor is driven to effect a shift. For example, if lobe 34 is to strike latch arm 33 to effect a shift, motor 34 is first driven to move lobe 34 away from latch arm 33 and is then driven to move lobe 34 to strike latch arm 33. This backing off of lobe 34 allows the lobe to gain enough momentum to cause the latch arm to pivot. This backing off technique is preferably not used when a shift in one direction is followed by a shift in the other direction because the lobe is already away from the latch arm. This backing off technique effectively extends the useful life of the battery.

FIG. 7 shows the signal that drives the motor in a preferred embodiment. First, the motor is driven in the reverse direction for 5 milliseconds, as indicated by pulse 700 to back the lobe off the latch arm. Then, the motor is not driven for 20 milliseconds, as indicated by pulse 701 to allow the lobe to come to rest. Finally, the motor is driven in the forward direction for 30 milliseconds, as indicated by pulse 702 to shift the gear.

Description of System

Figure 10:
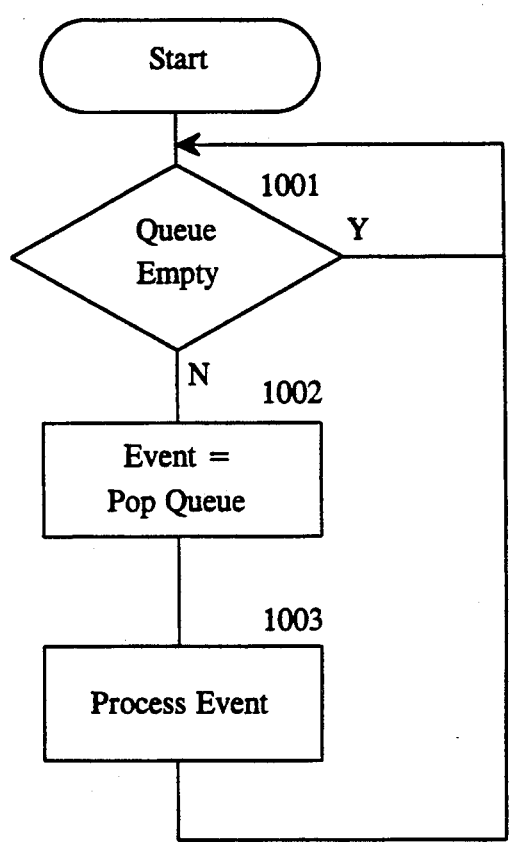
FIG. 10 is an overview of the main processing routine in a preferred embodiment.

FIGS. 10 through 35 are flow diagrams of computer methods in a preferred embodiment. FIG. 10 is an overview of the main processing routine. The preferred method uses the event driven processing loop of FIG. 10. The system generates events that are placed in a queue. The main processing routine pops the top event from the queue and invokes the ProcessEvent routine to process the event. The ProcessEvent routine pushes events onto the end of the queue. The system also pushes a time event onto the queue every 1 millisecond to indicate elapsed time. In steps 1001 through 1003 the system loops checking to see if the queue is empty. If the queue is not empty, the system pops the top event from the queue and invokes routine ProcessEvent. The system then loops back to check if the queue is empty. The system starts out with an initialization event which causes initialization of the system variables.

Table 7 lists the events that are generated and the conditions that generate the event. For example, a "Timer" event is generated (pushed onto the queue) once every millisecond. A "Hub" event is generated once for each revolution of the hub.

TABLE 7

| Event | Generated |
|---|---|
| Timer | once every millisecond |
| Spoke | once for each revolution of the rear wheel |
| Pedal | once for each ¼th revolution of the crank in the forward direction |
| Reverse | once for each ¼th revolution of the crank in the reverse direction |
| Hub | once for each revolution of the hub |
| UpButton | when the shift up button is released |
| DownButton | when the shift down button is released |
| UpShift | when an "UpButton" event is received and a shift up is allowed |
| DownShift | when a "DownButton" event is received and a shift down is allowed |
| Crank | once for every 10 consecutive "Pedal" events without an intervening "Reverse" event or front shift event |
| Wheel | once for every "Hub" event that occurs after 3 consecutive "Pedal" events without an intervening "Reverse" event or rear shift event |
| R | when a rear shift up is needed to shift from the current gear to the next gear |
| | when a rear shift down is needed to shift from the current gear to the next gear |
| F | when a front shift up is needed to shift from the current gear to the next gear |
| f | when a front shift down is needed to shift from the current gear to the next gear |

Table 8 lists variables used by the routine ProcessEvents.

TABLE 8

| Variables | Definition |
| --- | --- |
| SpokeTime | time in milliseconds of the last revolution of the rear wheel |
| SpokeClock | time in milliseconds since last signal from the rear wheel sensor |
| TrueGear | calculated gear that the bicycle is actually in |
| HubEventCount | number of "Hub" events since last calculation of TrueGear or last "Reverse" event |
| PedalEventCount | number of "Pedal" events since last calculation of TrueGear or last "Reverse" event |
| HubPedalCount | number of "Pedal" events since last rear shift or last "Reverse" event |
| PedalCount | number of "Pedal" events since last front shift or last "Reverse" event |
| InShiftCount | number of "Pedal" events remaining until last shift is complete |
| OldCalcGear | last calculated gear that the bicycle was actually in |
| NewCalcGear | current calculated gear that the bicycle is actually in |
| Matches | number of successive times that the calculated gear is consistent |
| NewGear | calculation of what gear the bicycle should be in |
| Gear | current gear that the bicycle is in |
| UpGear | nearest legal gear above the current gear |
| DownGear | nearest legal gear below the current gear |
| Uptime | desired spoke time of the next higher legal gear |
| MidTime | desired spoke time of the current gear |
| DnTime | desired spoke time of the next lower legal gear |
| UpPoint | spoke time at which the next shift up should occur |
| DnPoint | spoke time at which the next shift down should occur |

Figure 11:
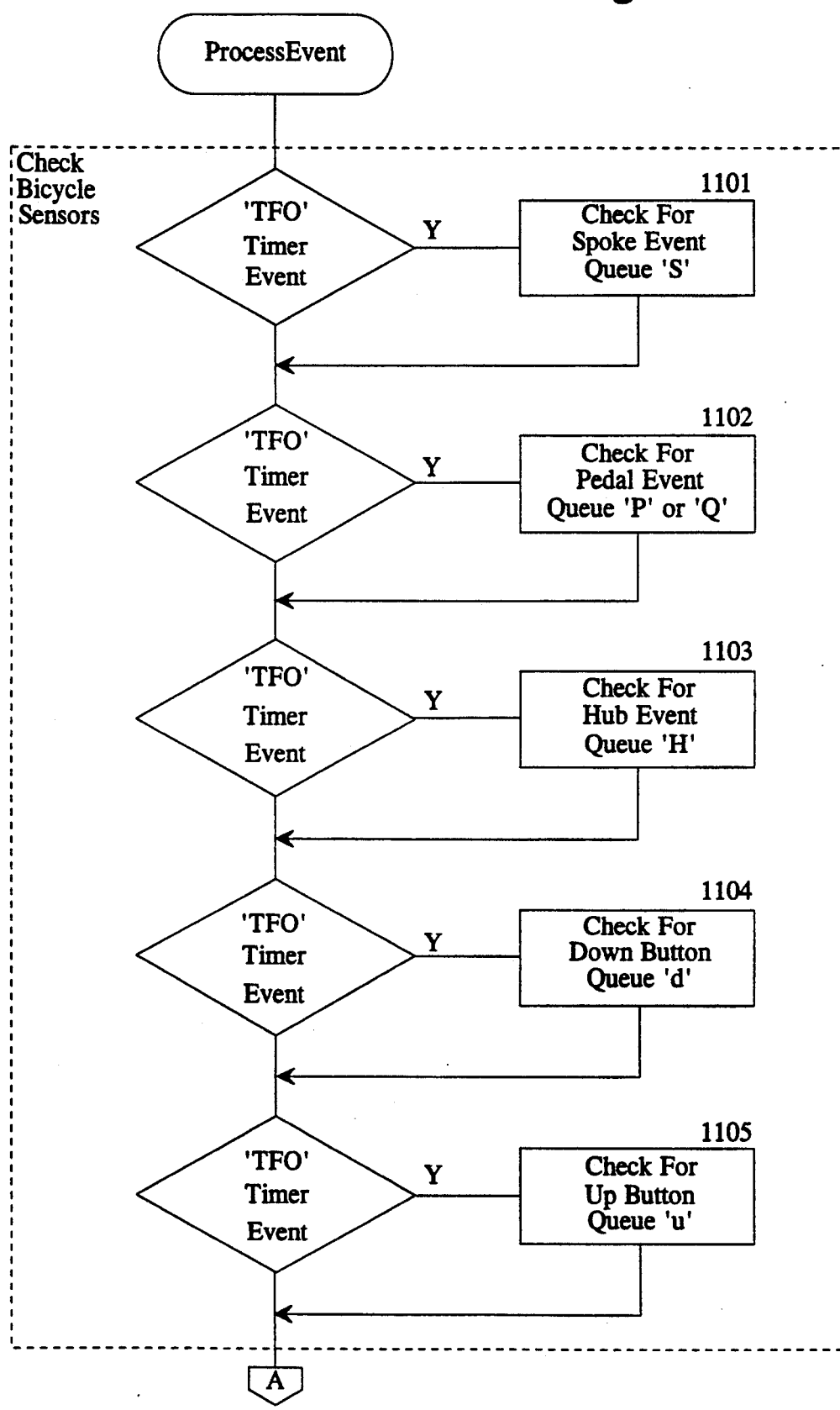
FIG. 11 is a flow diagram of the routine ProcessEvents in a preferred embodiment.
Figure 11:
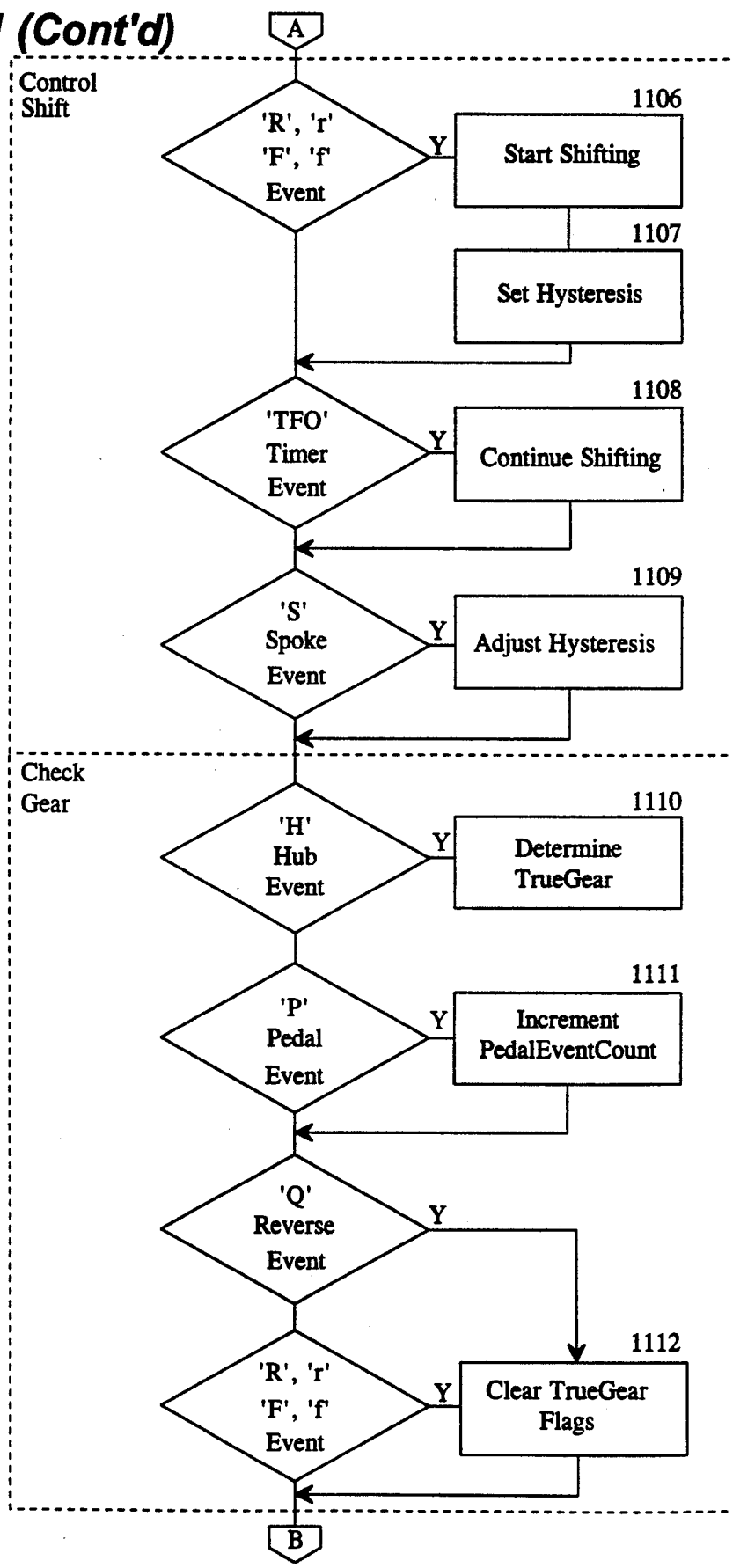
Figure 11:
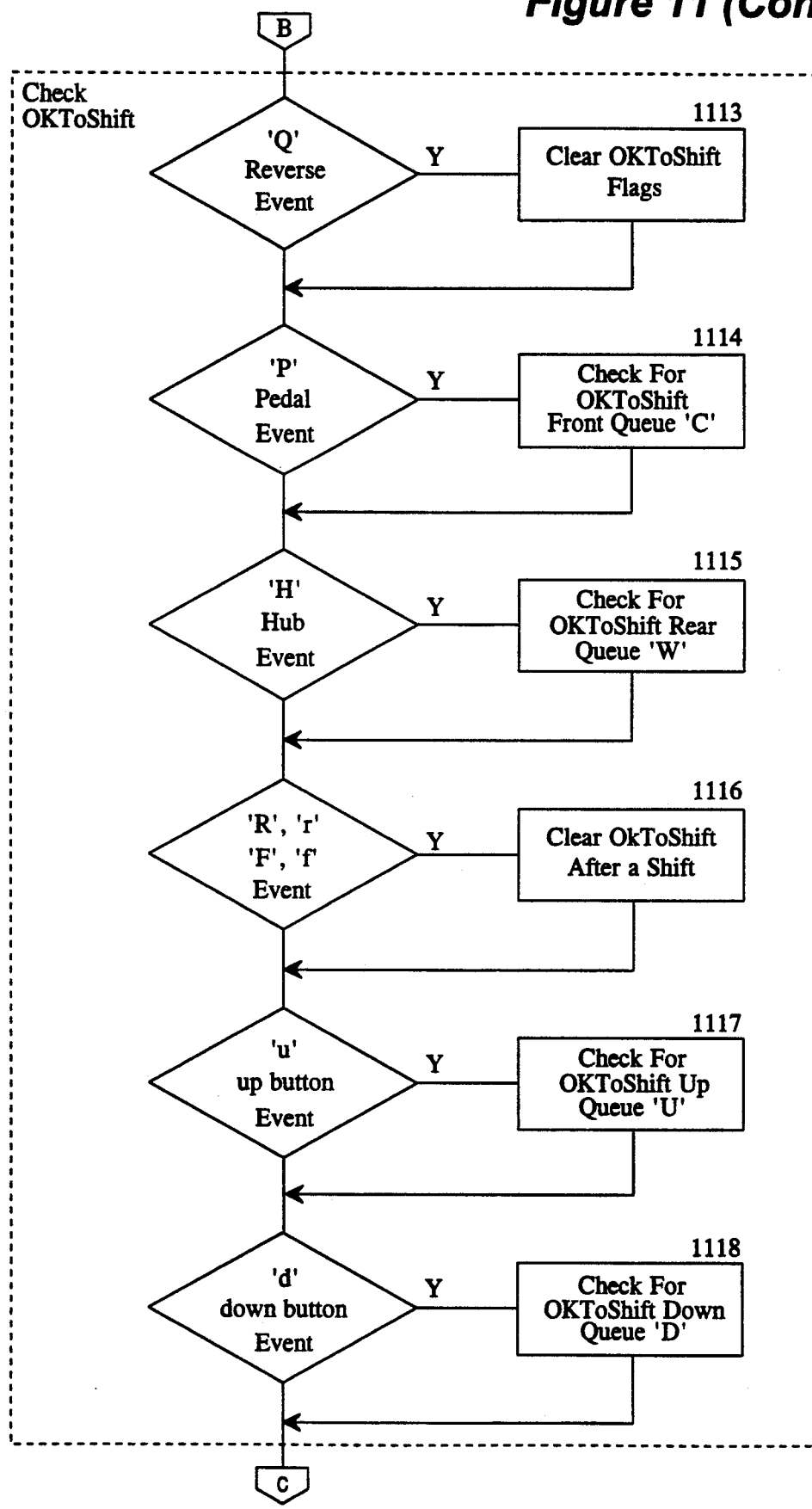
Figure 11:
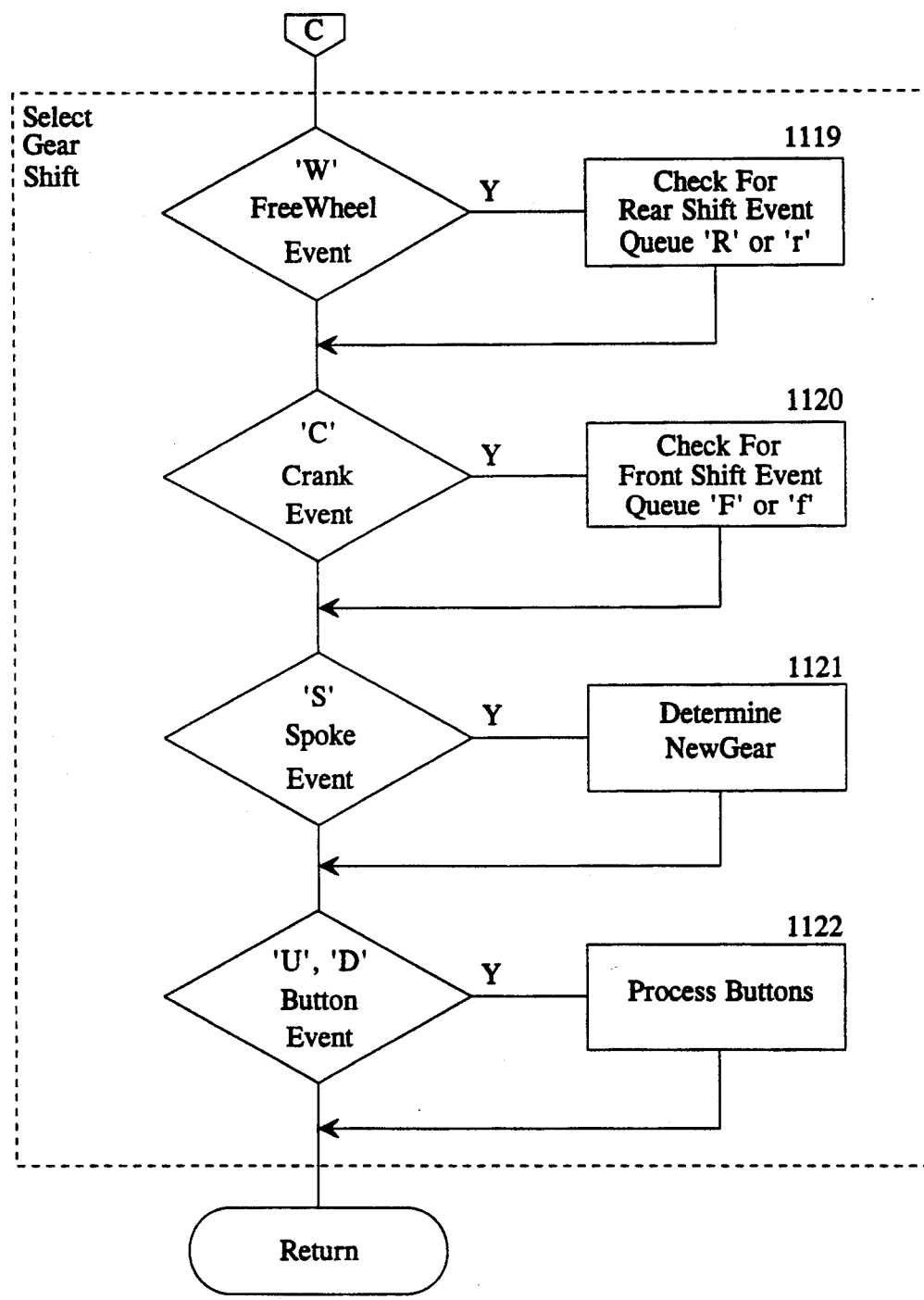

FIG. 11 is a flow diagram of the routine ProcessEvents. This routine inputs an event and processes the event by invoking various subroutines based on the event. The event names within the decision blocks (diamonds) to the left of steps 1101 through 1121 indicate that the step is performed (subroutine invoked) when that event is passed. For example, if a "Pedal" event is passed, the system performs steps 1105 and The subroutines invoked in steps 1101 through 1121 are described below in detail. Steps 1101 through 1105 are performed on a timer event and check the various bicycle sensors. In step 1101, which is performed on a "Timer" event, the system updates the variable SpokeClock to indicate the time since the last rear wheel signal was detected, detects whether a wheel signal is being generated, and generates a "Spoke" event and updates the variable SpokeTime when a wheel signal is detected. The wheel signal is generated by the rear wheel sensor and indicates a revolution of the rear wheel. In step 1102, which is performed on a "Timer" event, the system determines whether the crank is being pedalled in the forward or reverse direction and generates a "Pedal" or "Reverse" event every ⅛th revolution of the crank. In step 1103, which is preformed on a "Timer" event, the system detects whether a hub signal is being generated and generates a "Hub" event when a hub signal is detected. The hub signal is generated by the hub sensor and indicates a revolution of the hub. In step 1104, which is performed on a "Timer" event, the system detects whether the shift up button has been released and generates an "UpButton" event when the cyclist depresses the shift up button. In step 1105, which is performed on a "Timer" event, the system detects whether the shift down button has been released and generates a "DownButton" event when the cyclist depresses the shift down button.

In steps 1106 through 1109, the system controls the shifting of the bicycle. The system starts shifting on a "F," "f," "R," or "r" event (shift event) and continues the shifting process for a predetermined time interval. In step 1106, which is performed on an "F," "f," "R," or "r" event, the system sets some flags to indicate the start of a shift. In step 1107, which is performed on an "F," "f," "R," or "r" event, the system sets the shift up and shift down points based on the desired spoke time of the new gear. The process of setting the shift up and shift down points is referred to as setting the hysteresis. In step 1108, which is performed on a "Timer" event, the system controls the shifting process over a predetermined time interval based on the flags set in step 1106. In step 1109, which is performed on a "Spoke" event, the system adjusts the shift up or shift down point (adjust the hysteresis) when the current spoke time first passes through the desired spoke time for the current gear.

In steps 110 through 1112, the system determines the true gear of the bicycle based on the number of "Pedal" events generated during 5 "Hub" events. In step 1110 which is performed on a "Hub" event, the system counts the number of "Hub" events that have occurred since the last true gear calculation, and when the number equals 5 the system calculates the true gear based on the number of "Pedal" events counted in step 1111. In step 1111, which is performed on a "Pedal" event, the system counts the number of "Pedal" events that are generated during 5 "Hub" events. In step 1112, which is performed on a "Reverse" event and on an "F," "f," "R," or "r" event, the system zeroes out various flags which resets the calculation of the true gear. The system calculates a true gear only when the cyclist pedals in the forward direction.

In steps 1113 through 1118, the system determines if the bicycle can be shifted. The system ensures that the cyclist is pedalling in the forward direction before it effects a front or rear shift. If the front gears of the bicycle can be shifted, the system generates a "Crank" event. If the rear gears of the bicycle can be shifted, the system generates a "Wheel" event. In a preferred embodiment, the front gear can be shifted when 10 "Pedal" events are generated without a "Reverse" event being generated. The rear gear can be shifted when a "Hub" event is generated and there have been at least 3 "Pedal" events generated without a "Reverse" event being generated. In step 1113, which is performed on a "Reverse" event, the system clears the count of "Pedal" events to restart the counting when the cyclist starts pedalling in the forward direction. In step 1114, which is performed on a "Pedal" event, the system counts the number of "Pedal" events and generates a "Crank" event when the count is equal to 10. In step 1115, which is performed on a "Hub" event, the system generates the "Wheel" event when the number of "Pedal" events since the last "Hub" event or "Reverse" event is greater than 3. In step which is performed on a "R," "r," "F," or "f" event, the system on a front shift clears the count of "Pedal" events since the last front shift or "Reverse"

event and inhibits further shifting until the front shift is complete. The system on a rear shift clears the count of "Pedal" events since the last rear shift or "Reverse" event and inhibits further shifting until the rear shift is complete. In step 1117, which is performed on an "Up-Button" event, the system generates an "UpShift" event when not already in the maximum gear and when the last shift has completed. In step 1121, which is performed on a "DownButton" event, the system generates a "DownShift" event when not already in the minimum gear and when the last shift has completed.

In steps 1119 through 1122, the system selects the next gear to shift into. The system determines whether the current spoke time is outside the shift up and shift down points. If the spoke time is outside these points, the system determines the optimum gear for the spoke time. When the next "Crank" or "Wheel" event occurs, the system generates a front or rear shift event as appropriate to shift the bicycle in the direction of the optimum gear. In step 1119, which is performed on a "Wheel" event, the system generates a rear shift event ("R" or "r" event) when the bicycle should be shifted into a new gear and a rear shift is needed to shift to the new gear. Similarly, in step 1120, which is performed on a "Crank" event, the system generates a front shift event ("F" or "f") when the bicycle should be shifted into a new gear and a front shift is needed to shift to the new gear. In step 1121, which is performed on a "Spoke" event, the system determines if the current spoke time is outside the shift up and shift down points and determines the optimum new gear for the bicycle. In step 1122, which is performed on an "UpShift" and a "DownShift" event, the system determines the next legal up or down gear, adjusts the desired spoke times for each of the gears, and sets the shift up and down points to be equal, which allows step 1121 to determine that the current spoke time is outside the shift up and shift down points and to effect a shift up or down.

Figure 12:
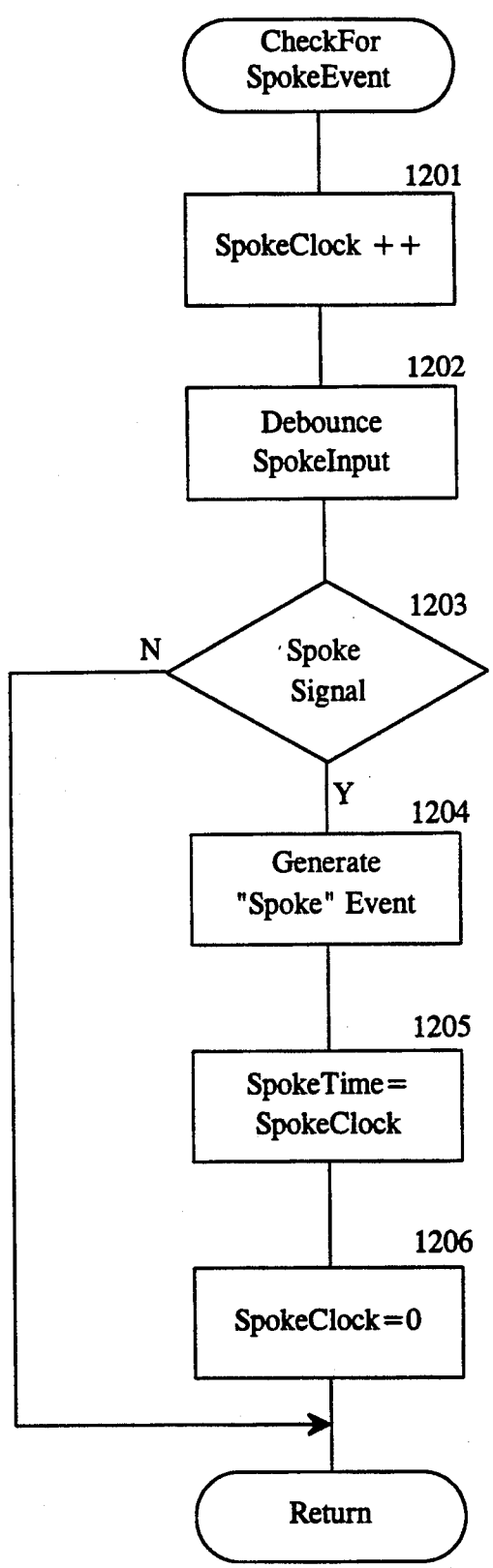
FIG. 12 is a flow diagram of the routine CheckForSpokeEvent in a preferred embodiment.

FIG. 12 is a flow diagram of the routine CheckForSpokeEvent. This routine is performed on a "Timer" event. The system updates the variable SpokeClock to indicate the time since the last wheel signal was detected, detects whether a wheel signal is being generated, and generates a "Spoke" event and updates the variable SpokeTime when a wheel signal is detected. In step 1201, the system increments the variable SpokeClock, which contains the time since the last wheel signal was detected. In step 1202, the system reads and debounces the wheel signal. In step 1203, if the system detects a wheel signal, then the system continues at step 1204, else the system returns. In step 1204, the systems generates a "Spoke" event. In step 1205, the system sets variable SpokeTime to SpokeClock. Variable SpokeTime contains the spoke time of the last revolution of the wheel. In step 1206, the system sets SpokeClock to zero to restart the timing and returns.

Figure 13:
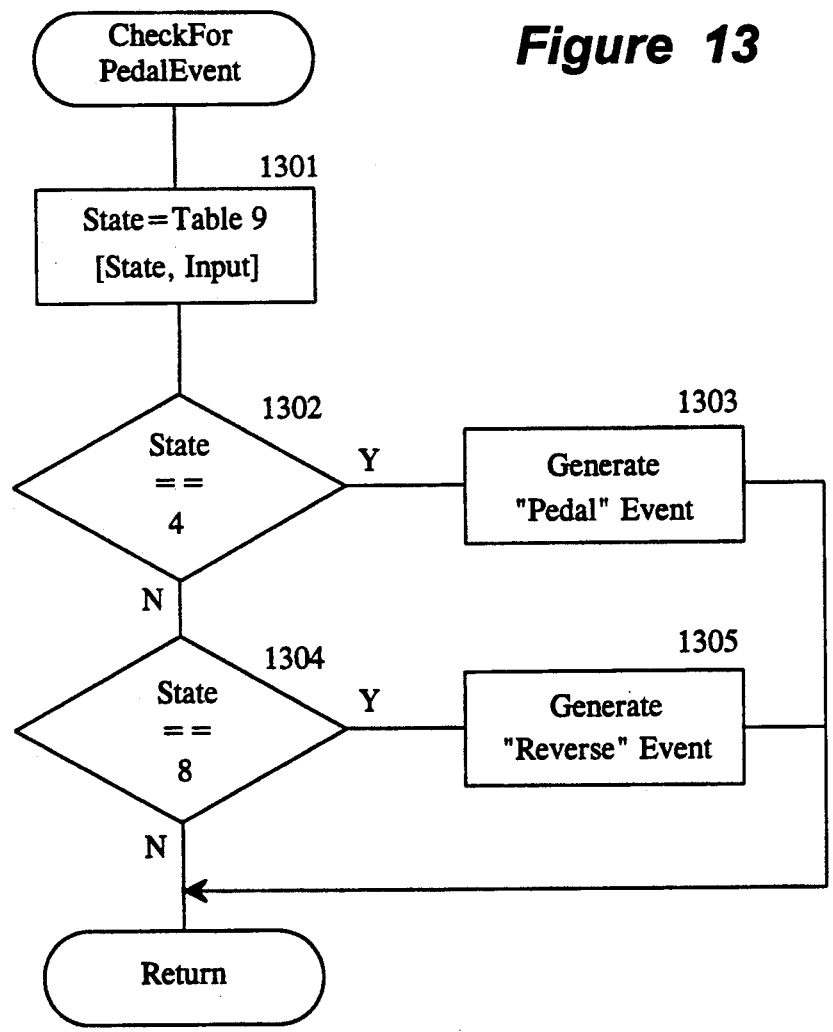
FIG. 13 is a flow diagram of the routine CheckForPedalEvent in a preferred embodiment.

FIG. 13 is a flow diagram of the routine CheckForPedalEvent. This routine is performed on a "Timer" event. The system determines whether the crank is being pedalled in the forward or reverse direction and generates a "Pedal" or "Reverse" event every ⅛th revolution of the crank.

In a preferred embodiment, as shown in FIG. 8A, two optical sensors 801, 802 and an eight-bladed rotor 403 are used to determine the direction of pedalling. The optical sensors 801, 802 are mounted on the bicycle frame and the rotor 803 is mounted on the crank assembly. As the crank is pedalled, each optical sensor generates a signal when a blade passes by the sensor. FIG. 8A shows the location of the sensors 801, 802 relative to the rotor 803. As shown, the sensors A 801 and B 802 are subtended by an angle of 78.75 degrees. This angle results in the signals from the sensors forming a quadrature (that is, the signals are out of phase by 90°). One skilled in the art would appreciate that other subtending angles would produce a quadrature signal. FIG. 8B shows the signals from sensors A and B when the crank is being pedalled in the forward direction for one complete revolution. Signal 804 is generated by sensor A and signal 805 is generated by sensor B.

FIG. 8C shows the output of sensors A and B when the bicycle is being pedalled in the forward and reverse directions. A "0" indicates that a blade is not in front of the corresponding sensor, and a "1" indicates that a blade is in front of the corresponding sensor. The system of the present invention determines the direction of pedalling based on the output received from sensors A and B. For example, if the output is "00" followed by "10," then the bicycle is being pedalled in the reverse direction. Conversely, if the output is "11" followed by "10," then the bicycle is being pedalled in the forward direction.

The system in a preferred embodiment determines the direction of pedalling through the use of a state machine. FIG. 8D is a state diagram for the states of the crank. The nodes represent the states and the arcs represent the quadrature input that causes a transition from one state to the next. The system starts out in state 0 and enters state 0 whenever the input is inconsistent with the current state. For example, if a "11" is followed by a "00," then an input was missed. When the cyclist is pedalling in the forward direction, the state machine cycles through states 0, 1, 2, and 3. When the cyclist is pedalling in the reverse direction, then the state machine cycles through state 0, 5, 6, and 7.

TABLE 9

| State | Input | | | |
|---|---|---|---|---|
| | 00 | 01 | 10 | 11 |
| 0 | 0 | 1 | 5 | 0 |
| 1 | 0 | 1 | 0 | 2 |
| 2 | 0 | 1 | 3 | 2 |
| 3 | 4 | 0 | 3 | 2 |
| 4 | 0 | 1 | 5 | 0 |
| 5 | 0 | 0 | 5 | 6 |
| 6 | 0 | 7 | 5 | 6 |
| 7 | 0 | 7 | 0 | 6 |
| 8 | 0 | 1 | 5 | 0 |

Table 9 is a tabular representation of the state diagram of FIG. 8D including states 4 and 8. States 4 and 8 are used internally to indicate that a "Pedal" or "Reverse" event should be generated. The table entries contain the next state based on the current state (row index) and the quadrature input (column index). For example, if the current state is 2 and the input is 10, then the next state is 3. The system of the present invention uses Table 9 to implement the state machine.

In step 1301, the system sets the new state by setting variable State to the value in Table 9 indexed by variable State and the quadrature input. For example, if the current state is 1 and the quadrature input is 11, then variable State is set to 2 (Table [1, 11]). In step 1302, if the new state is 4, then the system generates a "Pedal" event in step 1303 and returns, else the system continues at step 1304. State 4 is an intermediate state that the system uses as an indication that the crank has completed ⅛th revolution in the forward direction. In step 1304, if the new state is 8, then the system generates a "Reverse" event in step 1305 and returns, else the system returns. State 8 is an intermediate state that the system uses as an indication that the crank has completed ⅛th a revolution in the reverse direction.

Figure 14:
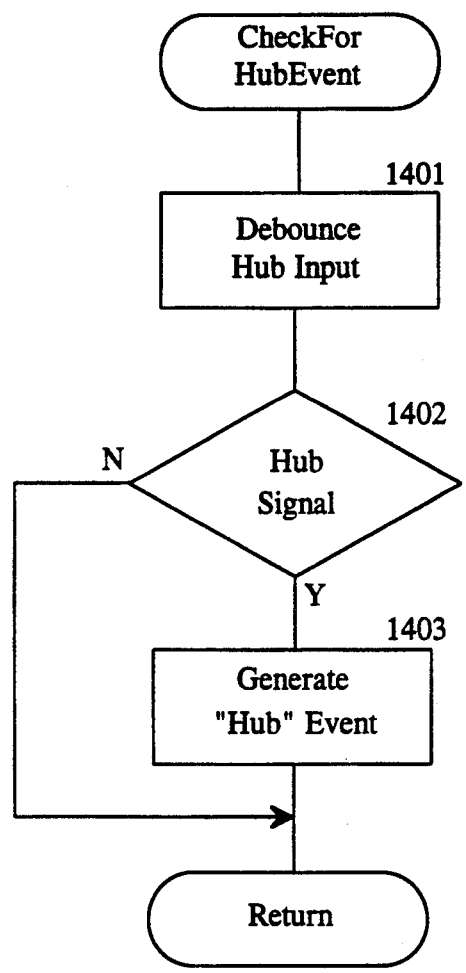
FIG. 14 is a flow diagram of the routine CheckForHubEvent in a preferred embodiment.

FIG. 14 is a flow diagram of the routine CheckForHubEvent. The routine is performed on a "Timer" event. The system generates a "Hub" event when a hub signal is detected. In step 1401, the system reads and debounces the hub sensor input. In step 1402, if the system detects a hub signal, then the system continues at step 1403, else the system returns. In step 1403, the system generates a "Hub" event and returns.

Figure 15:
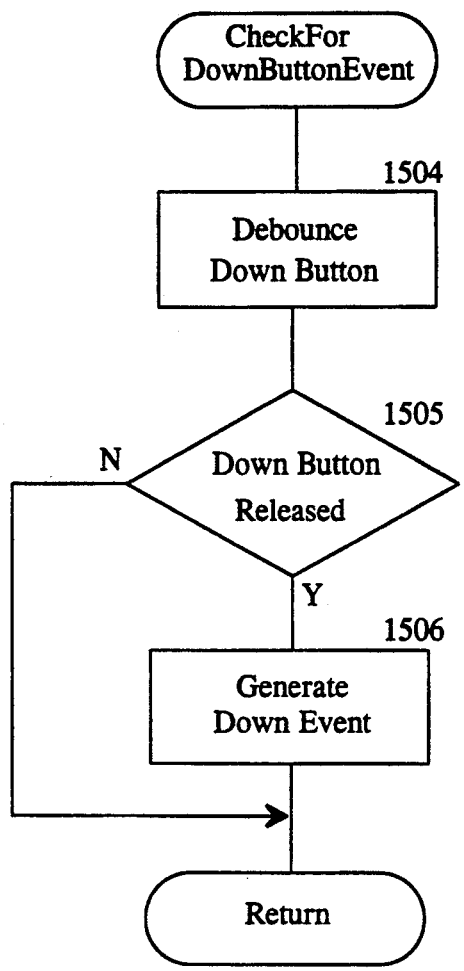
FIG. 15 is a flow diagram of the routine CheckForDownButtonEvent in a preferred embodiment.

FIG. 15 is a flow diagram of the routine CheckForDownButtonEvent. This routine is performed on a "Timer" event. The system generates a "Down" event when the cyclist depresses the shift down button. In step 1501, the system reads and debounces the down button. In step 1502, if the down button is released, the system continues at step 1503, else the system returns. In step 1503, the system generates a "Down" event and returns.

Figure 16:
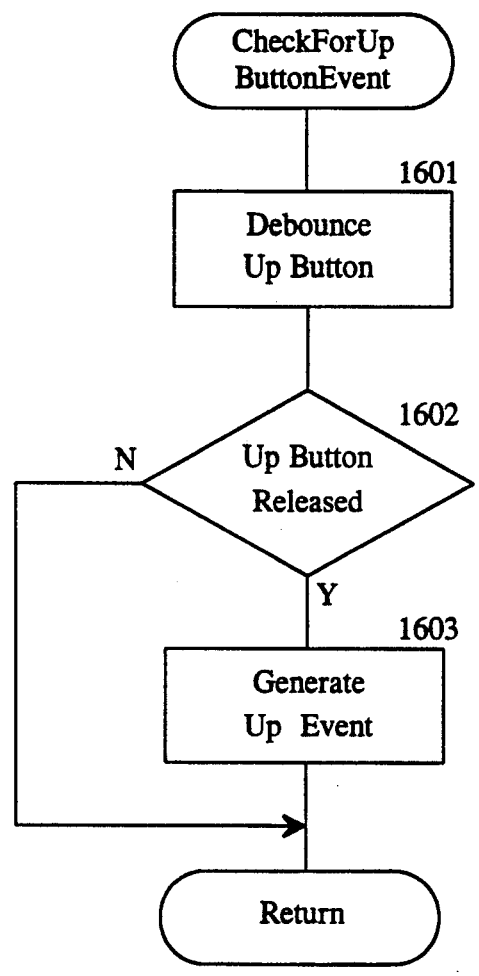
FIG. 16 is a flow diagram of the routine CheckForUpButtonEvent in a preferred embodiment.

FIG. 16 is a flow diagram of the routine CheckForUpButtonEvent. This routine is performed on a "Timer" event. The system generates an "Up" event when the cyclist depresses the shift up button. In step 1601, the system reads and debounces the up button. In step 1602, if the up button is released, then the system continues at step 1603, else the system returns. In step 1603, the system generates an "Up" event and returns.

Figure 17:
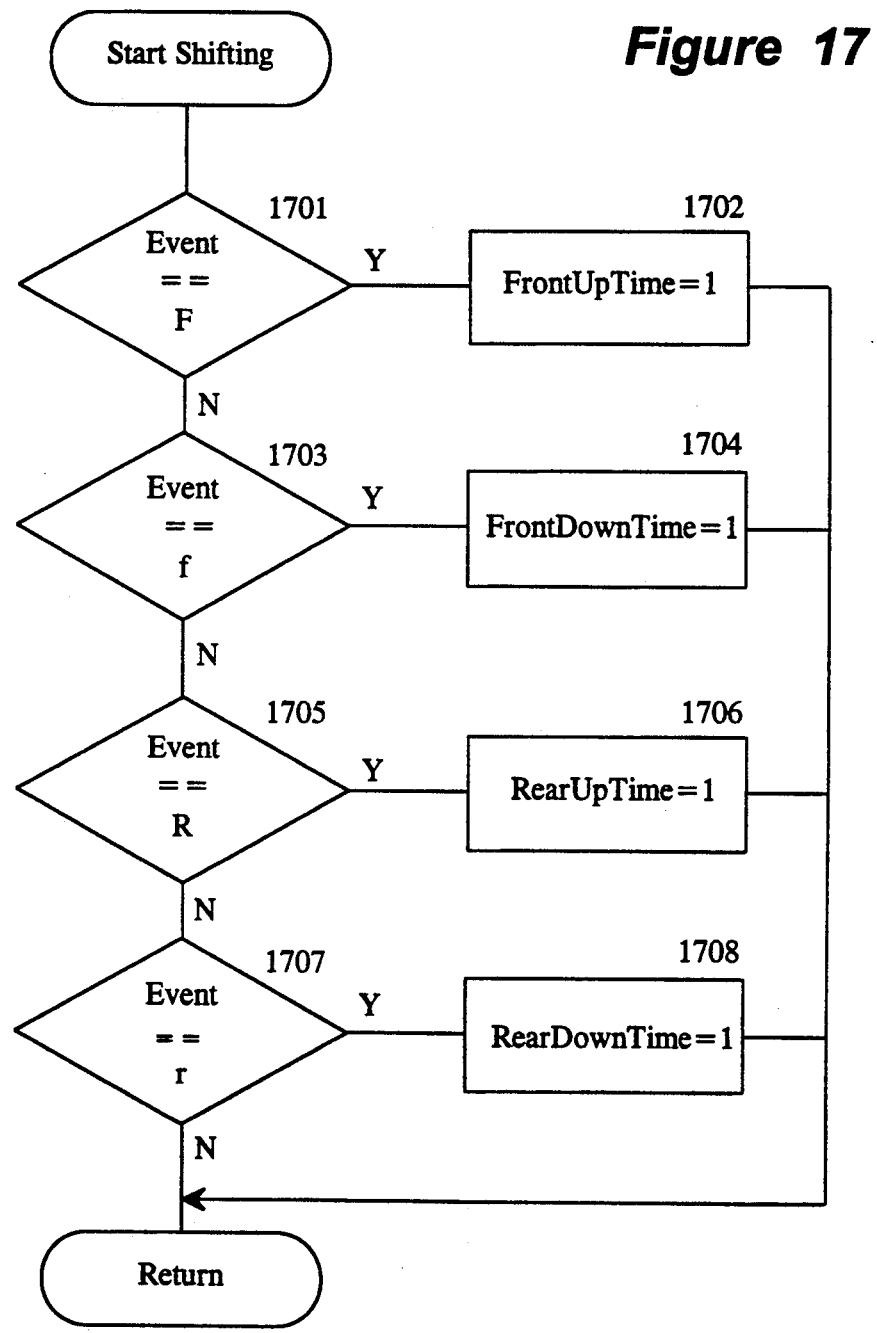
FIG. 17 is a flow diagram of the routine StartShifting in a preferred embodiment.

FIGS. 17, 18, 19 and 20 are flow diagrams of the routines that control the sending of the shift signals to the front and rear shift selectors and adjusting the hysteresis. FIG. 17 is a flow diagram of the routine StartShifting. This routine is performed on an "F," "f," "R," or "r" event. The system sets some flags to indicate the start of a shift. The routine sets a timer flag, which indicates to the routine ContinueShifting that a shift is in progress. In step 1701, if the event is "F," then the system sets variable FrontUpTime to in step 1702 and returns, else the system continues at step 1703. In step 1703, if the event is "f," then the system sets variable FrontDownTime to 1 in step 1704 and returns, else the system continues at step 1705. In step 1705, if the event is "R," then the system sets variable RearUpTime to 1 in step 1706 and returns, else the system continues at step 1707. In step 1707, if the event is "r," then the system sets variable RearDownTime to 1 in step 1708 and returns, else the system returns.

Figure 18:
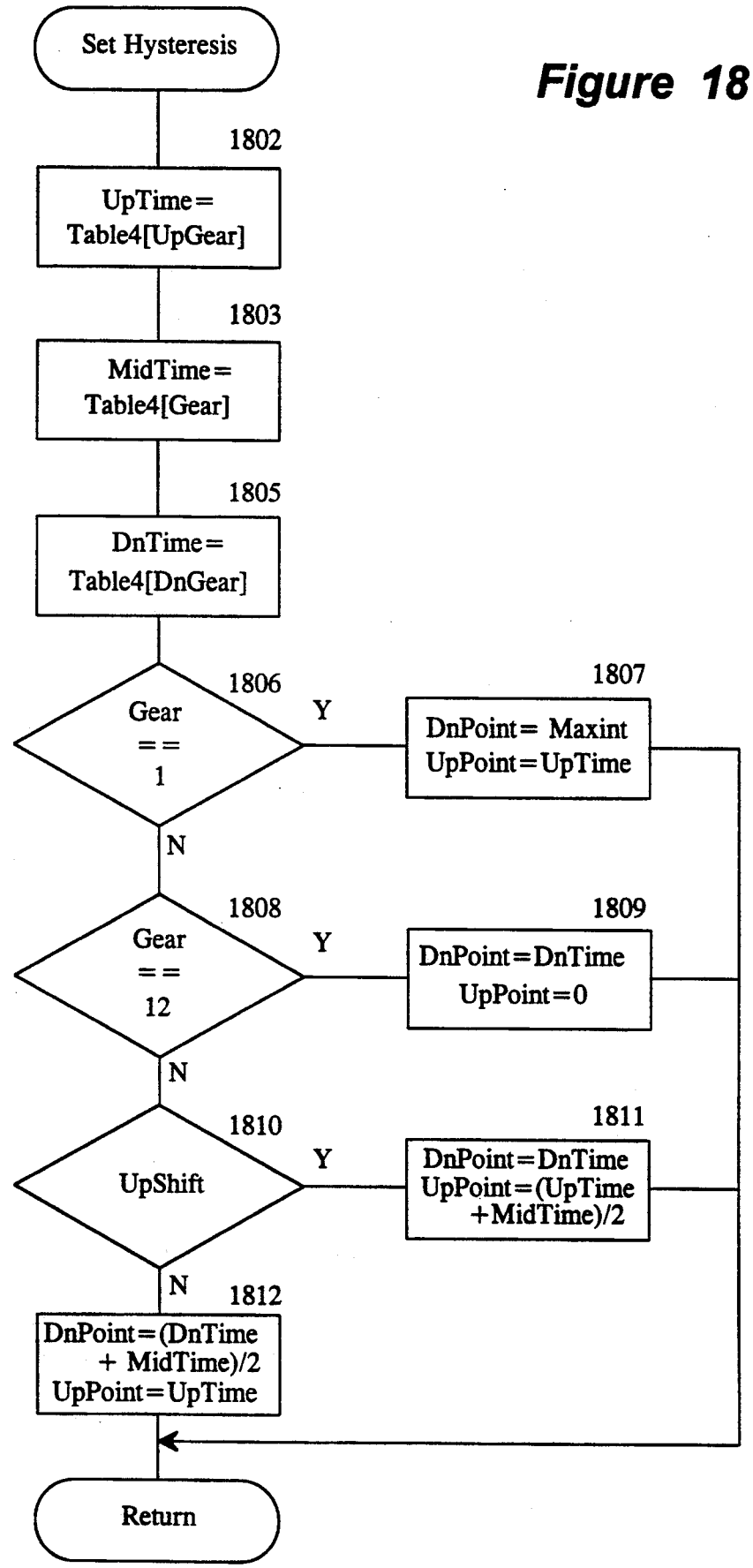
FIG. 18 is a flow diagram of the routine SetHysteresis in a preferred embodiment.

FIG. 18 is a flow diagram of the routine SetHysteresis. This routine is performed on an "F," "f," "R," or "r" event. The system sets the shift up and shift down points based on the desired spoke time of the new gear. On a shift up, the system sets the shift down point equal to the desired spoke time of the gear shifted from and sets the shift up point equal to halfway between the desired spoke times of the gear shifted to and the next legal gear above the gear shifted to. On a shift down, the system sets the shift points in an analogous manner. The system maintains a spoke time table like the one shown in Table 4, which contains the desired spoke time for each of the gears. In step 1802, the system sets variable UpTime to the entry in Table 4 indexed by the variable UpGear. Variable UpGear contains the next legal gear above the current gear. Variable UpTime contains the spoke time of the next legal gear higher than the current gear. In step 1803, the system sets variable MidTime equal to the entry Table 4 indexed by the variable Gear. Variable Gear contains the current gear that the bicycle is in. Variable MidTime contains the spoke time of the current gear. In step 1805, the system sets variable DnTime to the entry in Table 4 indexed by the variable DnGear. Variable DnGear contains the next legal gear below the current gear. Variable DnTime contains the spoke time of the next legal gear lower than the current gear. In steps 1806 through 1812, the system sets the shift up and down points. In step 1806, if the variable Gear is equal 1, to then no shift down is allowed and the system continues at step 1807, else the system continues at step 1808. In step 1807, the system sets variable DnPoint to the maximum integer to indicate that no down shift is allowed, sets variable UpPoint to the variable UpTime to indicate that the next shift up point is the desired spoke time for the next higher legal gear, and returns. In step 1808, if the variable Gear is equal to 12, then no shift up is allowed and the system continues at step 1809, else the system continues at step 1810. In step 1809, the system sets the variable DnPoint equal to the variable DnTime to indicate that the next shift down point is at the desired spoke time for the next lower legal gear, sets the variable UpPoint equal to 0 to indicate that no shift up is allowed, and returns. In step 1810, if the current event is an up shift indicated by an "F" or an "R" event, then the system continues at step else the system continues at step 1812. In step 1811, the system sets the variable DnPoint equal to variable Dntime, sets the variable UpPoint equal to the sum of variables UpTime and MidTime divided by 2, and returns. In step 1812, the system sets the variable DnPoint equal to the sum of variables DnTime and MidTime divided by 2, sets the variable UpPoint to the variable Uptime, and returns.

Figure 19:
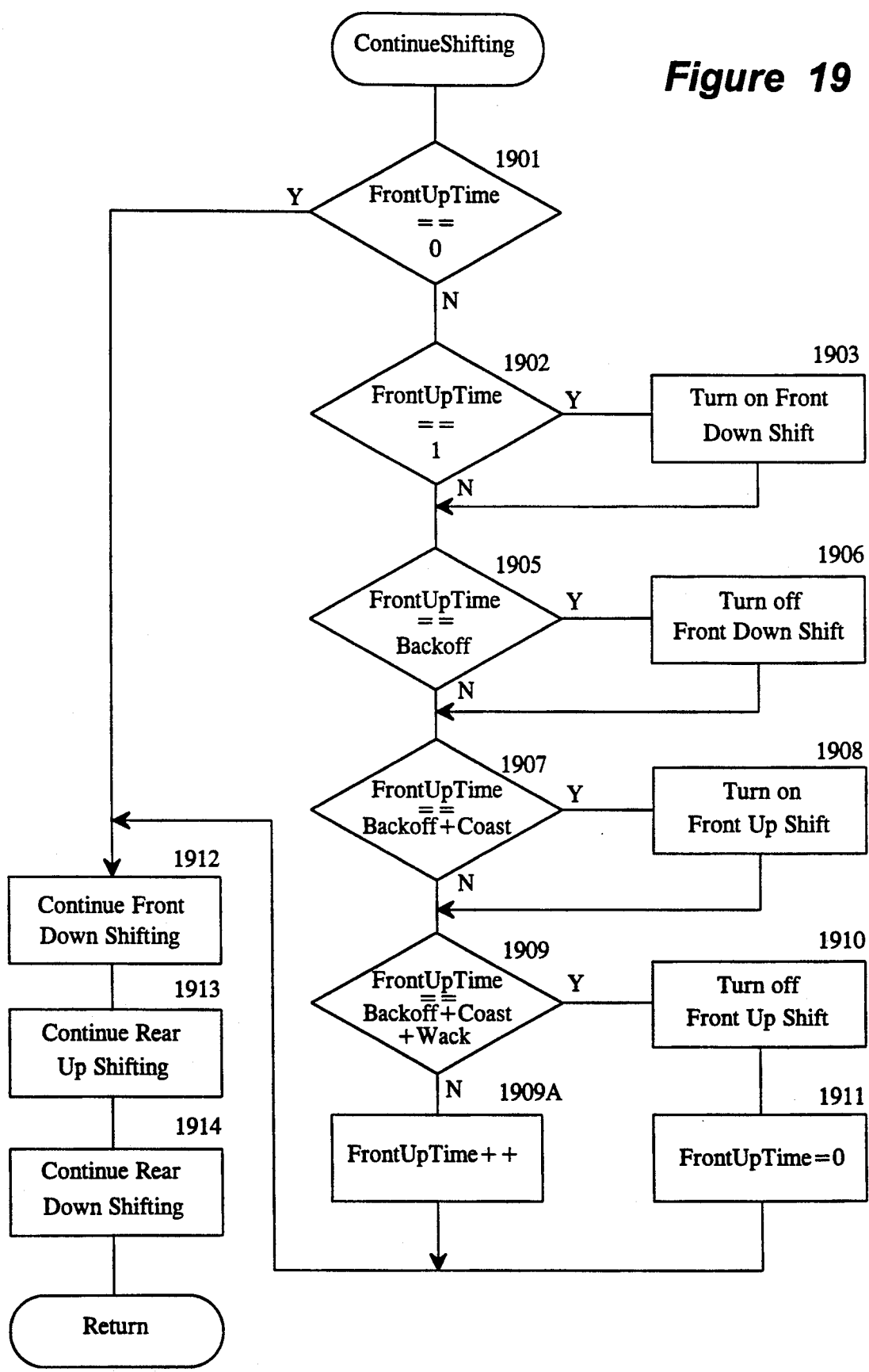
FIG. 19 is a flow diagram of the routine ContinueShifting in a preferred embodiment.

FIG. 19 is a flow diagram of the routine ContinueShifting. This routine is performed on a "Timer" event. This routine controls the shifting process over a predetermined time interval based on the flags set in step 1108. Steps 1901 through 1911 represent the processing to continue shifting the front gear. Steps 1912, 1913, 1914 represent the processing to continue shifting the front gear down, rear gear up, and the rear gear down, respectively. Although not shown in detail, steps 1912, 1913, and 1914 are analogous to steps 1901 through 1911. In a preferred embodiment, the system turns the selector in the down shift direction for awhile, then removes the power for awhile, and finally powers the selector in the up shift direction. This allows the selector lobe to gain momentum before the up shift latch is engaged. In an alternate embodiment, if the previous shift was a down shift, then there is no need to power in the down shift direction because the selector lobe is already located away from the up shift latch arm. In step 1901, if the variable FrontUpTime is equal to 0, then a shift is not in progress and the system continues at step 1912, else the system continues at step 1902. In step 1902, if the variable FrontUpTime equals 1, then a shift is just starting and the system continues at step 1903, else the system continues at step 1905. In step 1903, the system turns on the front shift down signal, Which energizes the motor of the shift selector in the down shift direction. In step 1905, if the variable FrontUpTime is equal to the constant BackOff, then the back off process is done and the system turns off the front down shift in step 1906. The constant BackOff contains the number of milliseconds that the selector lobe should be backed off from the up shift latch arm. In step 1907, if the variable FrontUpTime equals to the constant BackOff plus the constant Coast, then the system is ready to power the shift up and the system turns on the front up shift in step 1908, which energizes the motor of the shift selection in the up shift direction. The constant Coast contains the number of milliseconds that the selector is to be not powered after backing off and before powering the shift. In step 1909, if the variable FrontUpTime equals the constant BackOff plus the constant Coast plus the constant Wack, then the shift is complete and the system turns off the front up shift in step 1910 and resets variable FrontUpTime to 0 in step 1911 to indicate that the shift is complete, else the system continues at step 1909A. In step 1909A, the system increments the variable FrontUpTime to track the length of time shifting signals are powered. In steps 1912, 1913, and 1914, the system continues the shifting for the front gear down, the rear gear up, and the rear gear down, and the system returns.

Figure 20:
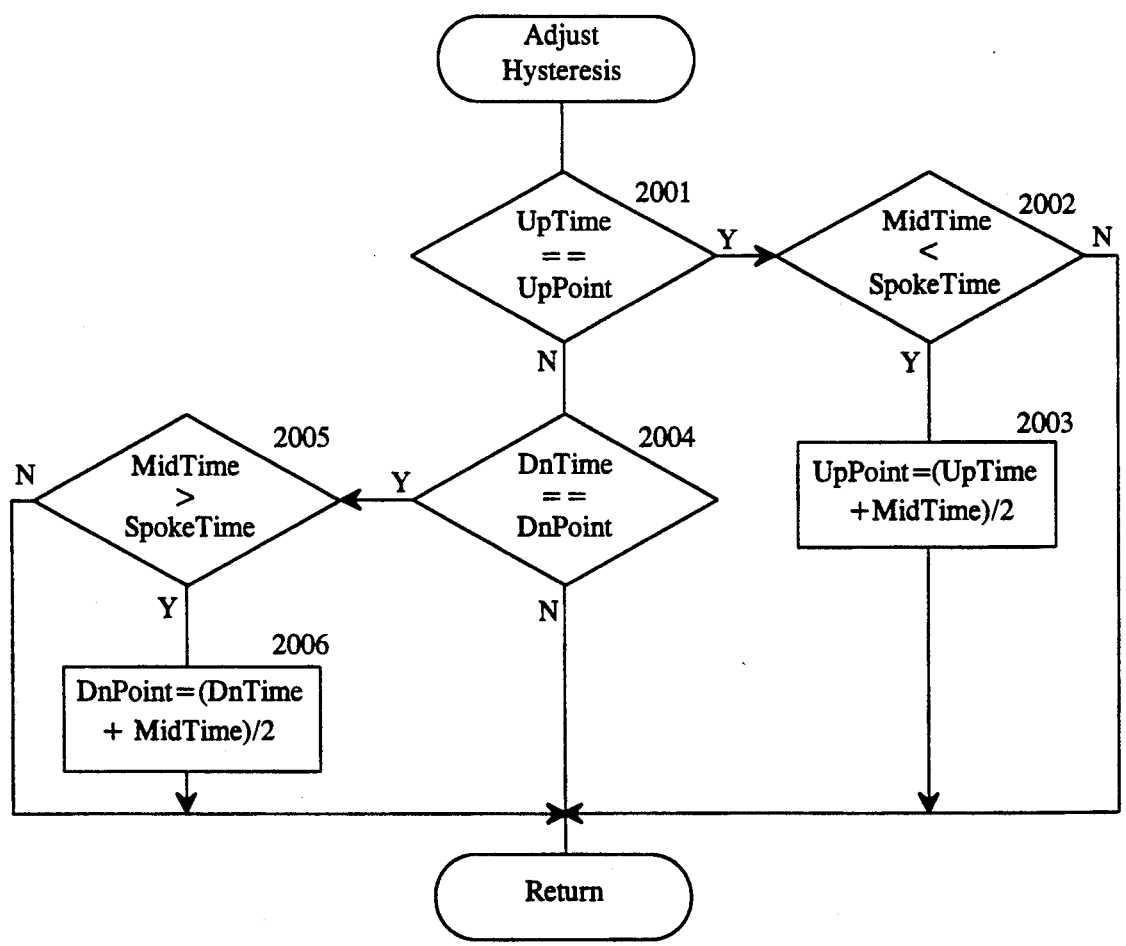
FIG. 20 is a flow diagram of the routine AdjustHysteresis in a preferred embodiment.

FIG. 20 is a flow diagram of the routine AdjustHysteresis. This routine is performed on a "Spoke" event. The system adjusts the shift up or shift down point when the current spoke time first passes through the desired spoke time for the current gear. In step 2001, if the variable UpTime equals variable UpPoint, then the last shift was a done shift and the system continues at step 2002, else the system continues at step 2004. In step 2002, if the variable MidTime is less than the variable SpokeTime, then it is time to tighten the shift up point and the system continues at step 2003, else the system returns. In step 2003, the system sets the variable UpPoint to the sum of variables Uptime and MidTime divided by 2 and returns. In step 2004, if the variables DnTime equals variable DnPoint, then the last shift was on up shift and the system continues at step 2005, else the system returns. In step 2005, if the variable MidTime is greater than the variable SpokeTime, then it is time to tighten the shift down point and the system continues at step 2006, else the system returns. In step 2006, the system sets the variable DnPoint equal to the sum of variables DnTime and MidTime divided by 2 and returns.

Figure 21:
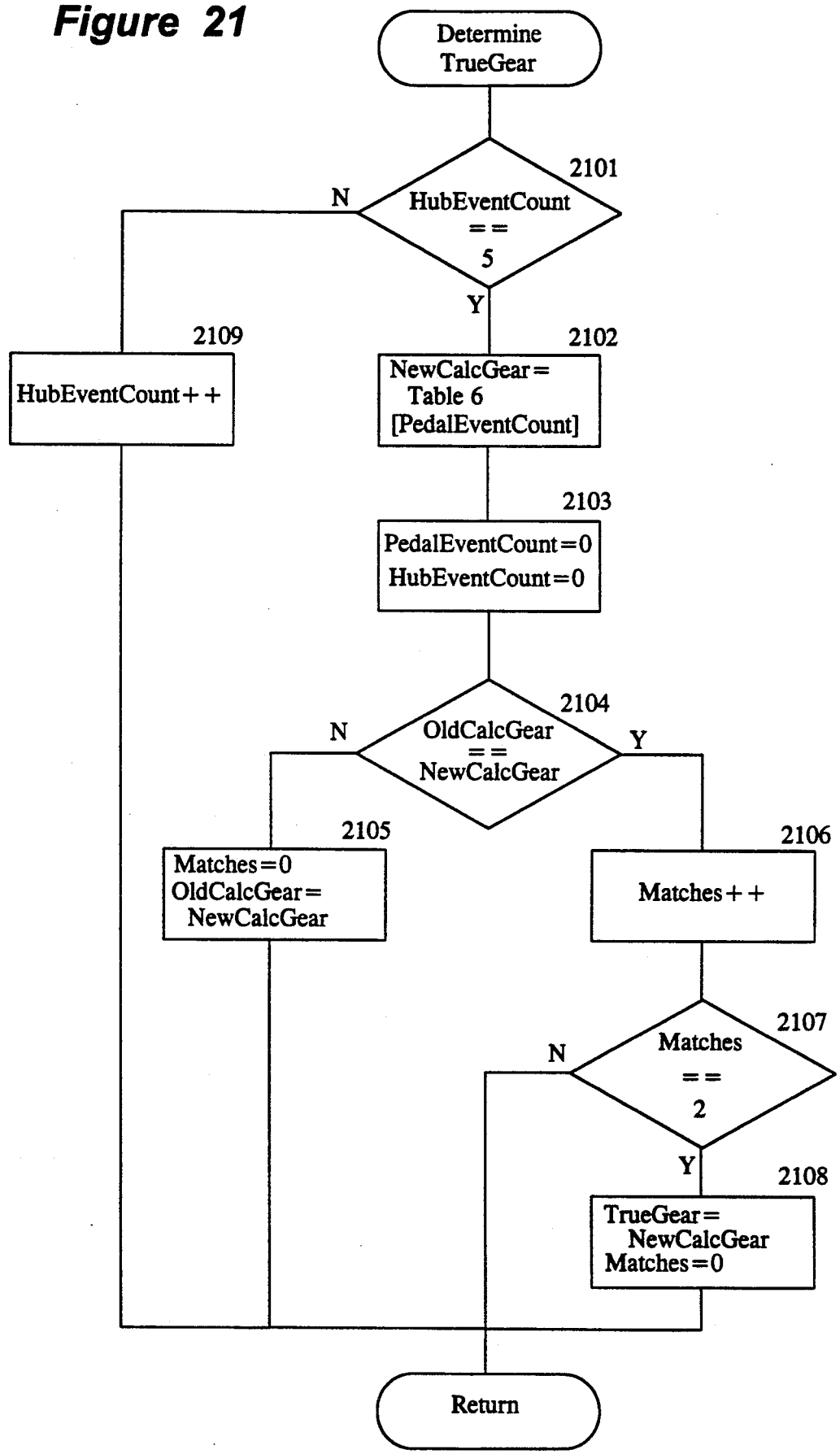
FIG. 21 is a flow diagram of the routine DetermineTrueGear in a preferred embodiment.
Figure 22:
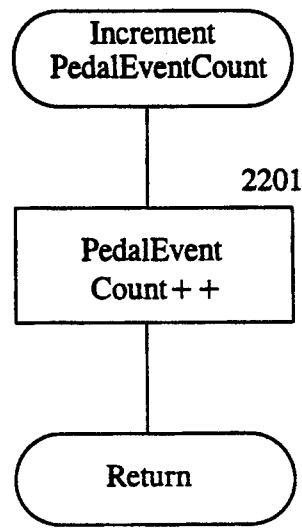
FIG. 22 is a flow diagram of the routine IncrementPedalEventCount in a preferred embodiment.
Figure 23:
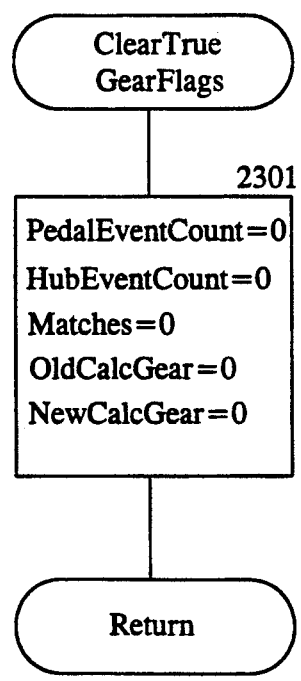
FIG. 23 is a flow diagram of the routine ClearTrueGearFlags in a preferred embodiment.

FIGS. 21 through 23 are flow diagrams of routines to determine what gear the bicycle is actually in. FIG. 21 is a flow diagram of the routine DetermineTrueGear. The routine is performed on a "Hub" event. The system counts the number of "Hub" events that have occurred since the last true gear calculation, and when the number equals 5, calculates the true gear based on the number of "Pedal" events counted in routine IncrementPedalEventCount. The system sets variable TrueGear to the calculated gear when three consecutive calculations result in the same calculated gear. In a preferred embodiment, the system counts the number of "Pedal" events that occur during a certain number of "Hub" events. Based on the number of "Pedal" events, the system determines the current gear. As discussed above, the system uses the count of "Pedal" events as index into Table 6 to determine the true gear.

In step 2101, if variable HubEventCount equals 5, then the system is ready to determine the true gear and the system continues at step 2102, else the system continues at step 2109. In step 2102, the system sets variable NewCalcGear equal to the value in Table 6 indexed by the PedalEventCount. In step 2103, the system sets the variables PedalEventCount and HubEventCount to 0 to restart the count of 5 "Hub" events and corresponding "Pedal" events. In step 2104, if the variable OldCalcGear equals variable NewCalcGear, then the last two gear calculations are consistent and the system continues at step 2106, else the system continues at step 2105. In step 2105, the system sets variable Matches to 0 and variable OldCalcGear to variable NewCalcGear and returns. Variable Matches contains the number of successive times that the calculated gear is consistent with the previous calculated gear. In step 2106, the system increments the variable Matches. In step 2107, if variable Matches equal two, then the last three gear calculations yielded consistent results and the system continues at step 2108, else the system returns. In step 2108, the system sets variable TrueGear to variable NewCalcGear and variable Matches to 0 to restart the matching process and returns. In step 2109, the system increments the variable HubEventCount and returns.

FIG. 22 is a flow diagram of the routine IncrementPedalEventCount. This routine is performed on a "Pedal" event. The system counts the number of "Pedal" events that are generated during 5 "Hub" events. In step 2201, the system increments the variable PedalEventCount and returns.

FIG. 23 is a flow diagram of the routine ClearTrueGearFlags. This routine is performed on a "Reverse" event. The system zeroes out various flags which resets the calculation of the true gear. In step 2301, the system sets the variables PedalEventCount, HubEventCount, Matches, OldCalcGear, and NewCalcGear to zero and returns.

FIGS. 24 through 29 are flow diagrams of routines to determine whether it is appropriate to shift. It is appropriate to shift when the bicycle is being pedalled in the forward direction. In a preferred embodiment, it is appropriate to shift the front gear when the crank has completed at least one and a quarter revolution since the last front shift or last pedalling in reverse. This ensures not only that the bicycle is being pedalled in the forward direction, but also that the last front shift has completed. One complete revolution is needed to ensure that the front shift has completed. Alternatively, a sensor could be positioned on the crank indicate when the crank has passed a point that indicates a shift complete. It is appropriate to shift the rear gear when the crank has completed at least ⅛ of a revolution since the last shift or last pedalling in reverse.

Figures 24, 25:
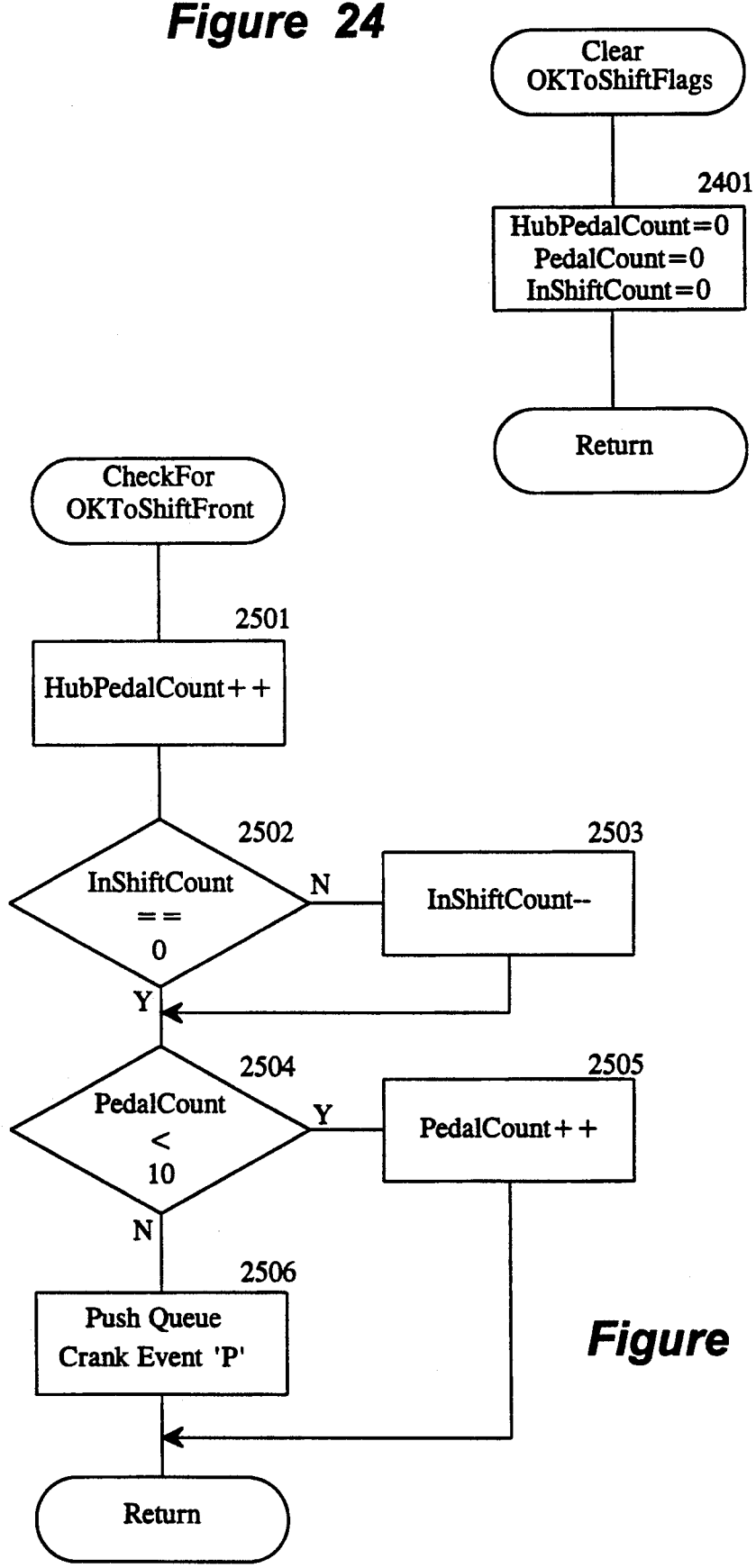
FIG. 24 is a flow diagram of the routine ClearOkToShiftFlags in a preferred embodiment.
FIG. 25 is a flow diagram of the routine CheckForOKToShiftFront in a preferred embodiment.

FIG. 24 is a flow diagram of the routine ClearOkToShiftFlags. This routine is performed on a "Reverse" event. The system clears the count of "Pedal" events to restart the counting when the cyclist starts pedalling in the forward direction. In step 2401, the system sets the variables HubPedalEvent and PedalCount to 0 and variable InShiftCount to 10 and returns.

FIG. 25 is a flow diagram of the routine CheckForOKToShiftFront. This routine is performed on a "Pedal" event. The system counts the number of "Pedal" events and generates a "Crank" event when the count is equal to 10 and the last shift has completed. In step 2501, the system increments the variable HubPedalCount. This variable contains the number of "Pedal" events since the last pedalling in reverse or last rear shift. The variable HubPedalCount is set to zero in routines ClearTrueGearFlags, ClearOKToShiftFlags, and ClearOKToShiftAfterAShift. In step 2502, if the variable InShiftCount is equal to 0, then the system continues at step 2504, else the system continues at step 2503. In step 2503, the system decrements variable InShiftCount. In step 2504, if the variable PedalCount is less than 10, then the system continues at step 2505, else the system continues at step 2506. Variable PedalCount contains the number of "Pedal" events that has occurred since the last pedalling in reverse or last front shift. The variable PedalCount is set to zero in routines ClearTrueGearFlags, ClearOKToShiftFlags, and ClearOKToShiftAfterAShift. In step 2505, the system increments variable PedalCount and returns. In step 2506, the system generates a "Crank" event and returns.

Figure 26:
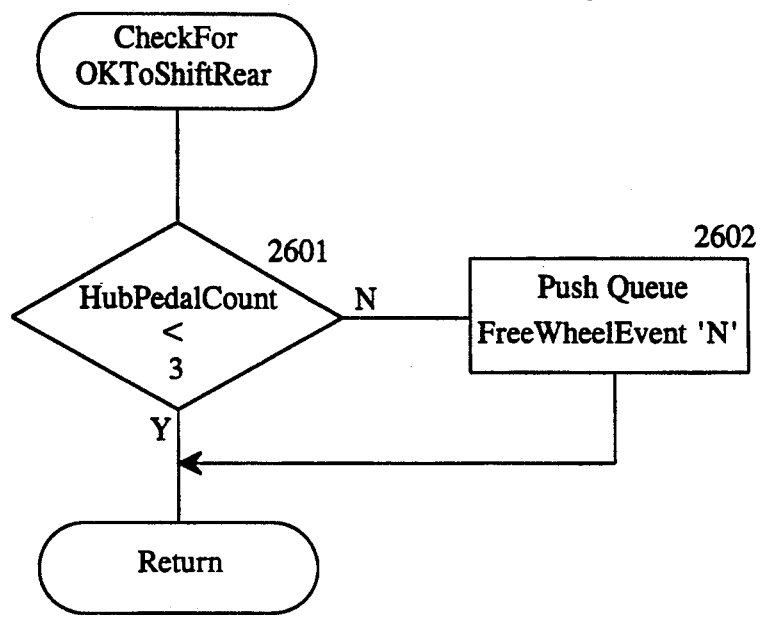
FIG. 26 is a flow diagram of the routine CheckForOKToShiftRear in a preferred embodiment.

FIG. 26 is a flow diagram of the routine CheckForOKToShiftRear. This routine is performed on a "Hub" event. The system generates a "Wheel" event when the number of "Pedal" events since the last rear shift or "Reverse" event is greater than 3. In step 2601, if the variable HubPedalCount is greater than 3, then the system returns, else the system continues at step 2602. In step 2602, the system generates a "Wheel" event and returns.

Figure 27:
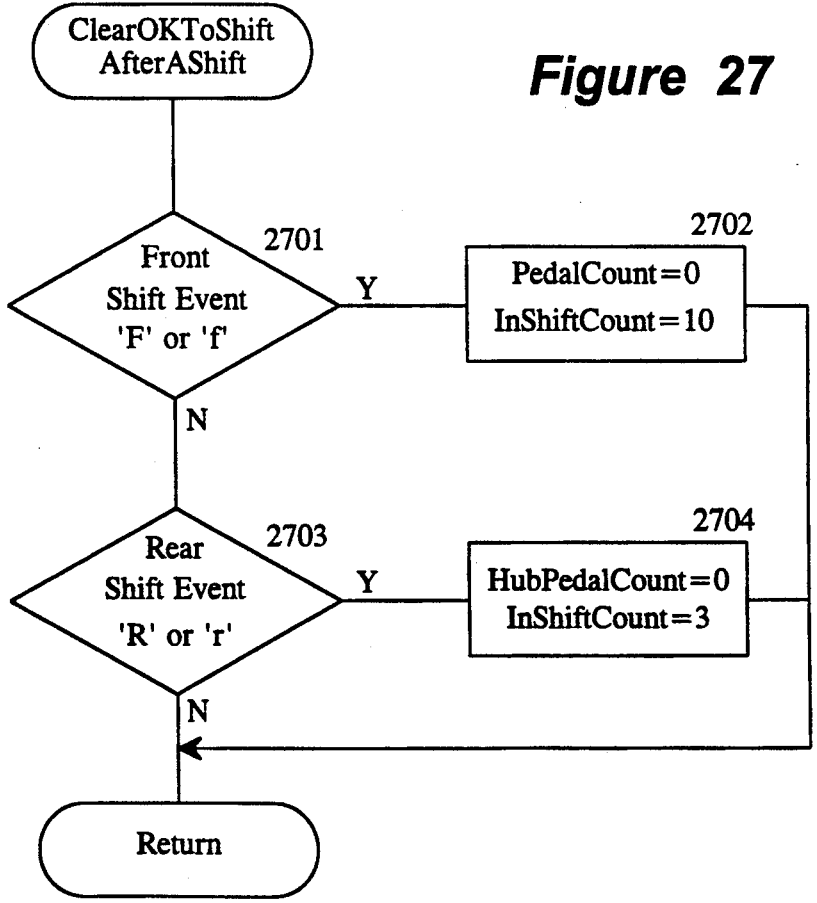
FIG. 27 is a flow diagram of routine ClearOKToShiftAfterShift in a preferred embodiment.

FIG. 27 is a flow diagram of routine ClearOKToShiftAfterShift. This routine is performed on a "F," "f," "R," or "r" event. This routine initializes variables PedalCount and InShiftCount after a front shift and variables HubPedalCount and InShiftCount after a rear shift. In step 2701, if the event is "F" or "f," then the system continues at step 2702, else the system continues at step 2703. In step 2702, the system sets variable PedalCount to 0 and variable InShiftCount to 10 and returns. In step 2703, if the event is an "R" or "r," then the system continues at step 2704, else the system returns. In step 2704, the system initializes variable HubPedalCount to 0 and variable InShiftCount to 3 and returns.

Figure 28:
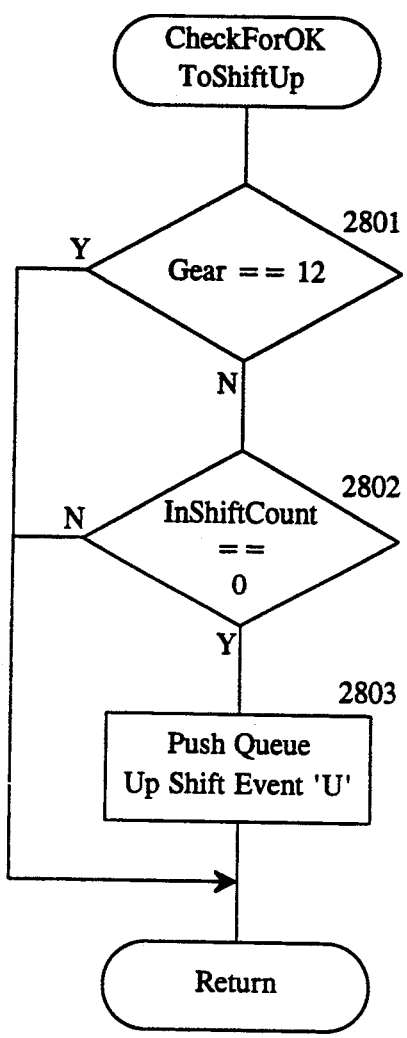
FIG. 28 is a flow diagram of routine CheckForOKToShiftUp in a preferred embodiment.

FIG. 28 is a flow diagram of routine CheckForOKToShiftUp. This routine is performed on a "UpButton" event. This routine generates a "UpShift" event when the bicycle is not in the highest gear and variable InShiftCount equals 0. In step 2801, if the bicycle is in the highest gear, then the system returns, else the system continues at step 2802. In step 2802, if the variable InShiftCount equal 0, then the system continues at step 2803, else the system returns. In step 2803, the system generates an "UpShift" event and returns.

Figure 29:
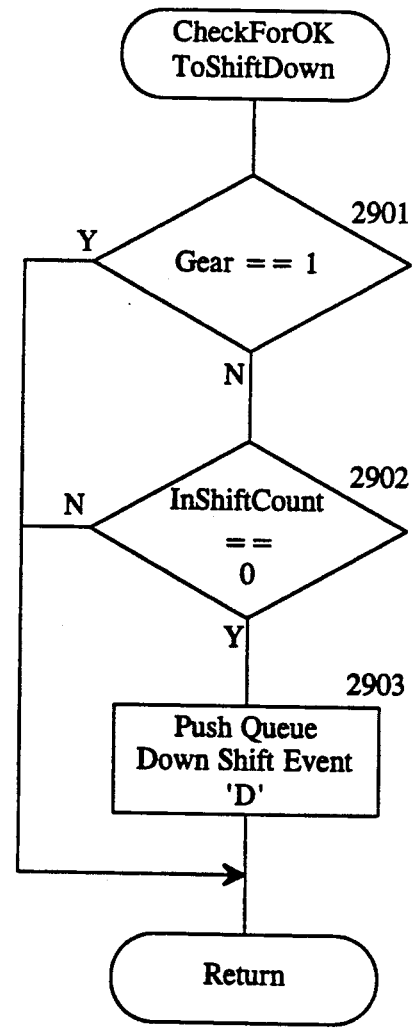
FIG. 29 is a flow diagram of routine CheckForOKToShiftDown in a preferred embodiment.

FIG. 29 is a flow diagram of routine CheckForOKToShiftDown. This routine is performed on a "DownButton" event. This routine generates a "DownShift" event when the bicycle is not in the lowest gear and variable InShiftCount equals 0. In step 2901, if the bicycle is in the lowest gear, then the system returns, else the system continues at step 2902. In step 2902, if the variable InShiftCount equal 0, then the system continues at step 2903, else the system returns. In step 2903, the system generates a "DownShift" event and returns.

FIGS. 34, 35, 36, and 37 are flow diagrams of routines to perform functions relating to determining a legal gear shift. These routines are invoked by the routines of FIGS. 30, 31, 32, and 33, which select a new gear when appropriate. Both these routines access the data structure of Table 10. Table 10 shows legal shifting actions that are needed to shift the bicycle from one gear to another gear and indicates the legal gears. The "F," "f," "R," "r," "B," and "b" entries indicate what shifting action is needed to get from the current gear to another gear. The actions are a front shift up, a front shift down, a rear shift up, a rear shift down, or both front and rear shifts up or down are needed. For example, if the current gear is 6 and the other gear is 10, then the action is "F," which indicates that the front gear must be shifted up to get from gear 6 to gear 10. The "0" action indicates an illegal shift. For example, if the current gear is gear 6 and the next gear is 7, then the action is "0," which indicates that it is illegal to shift from gear 6 to gear 7. The "+" indicates that the shift is illegal but that it would be better to shift to the next gear rather than stay in the current gear. For example, if the current gear is 6 and the next gear is 4, ten the action is "+," which indicates that it is illegal to shift from gear 6 to gear 4. However, the "+" also indicates that it would be better to shift the bicycle to gear 3, rather than stay in gear 6 because the desired spoke time for gear 3 is closer to the desired spoke time of gear 4 than is the desired spoke time of gear 6.

TABLE 10

| Current Gear | Next Gear | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | 0 | F | R | F | B | R | B | B | R | B | B | B |
| 2 | f | 0 | 0 | F | R | R | B | R | B | B | R | B |
| 3 | r | 0 | 0 | 0 | F | R | F | B | R | B | B | B |
| 4 | f | f | 0 | 0 | 0 | + | R | R | R | R | R | R |
| 5 | b | r | f | 0 | 0 | 0 | F | R | R | B | R | B |
| 6 | r | r | r | + | 0 | 0 | 0 | F | R | F | B | B |
| 7 | b | b | f | r | f | 0 | 0 | + | R | R | R | R |
| 8 | b | r | b | r | r | f | 0 | 0 | 0 | F | R | B |
| 9 | r | r | r | r | r | r | + | 0 | 0 | 0 | F | F |
| 10 | b | b | b | r | b | f | r | f | · 0 | 0 | 0 | R |
| 11 | b | r | b | b | r | b | r | r | f | 0 | 0 | F |
| 12 | b | b | b | r | b | r | b | f | r | f | 0 | |

Figure 34:
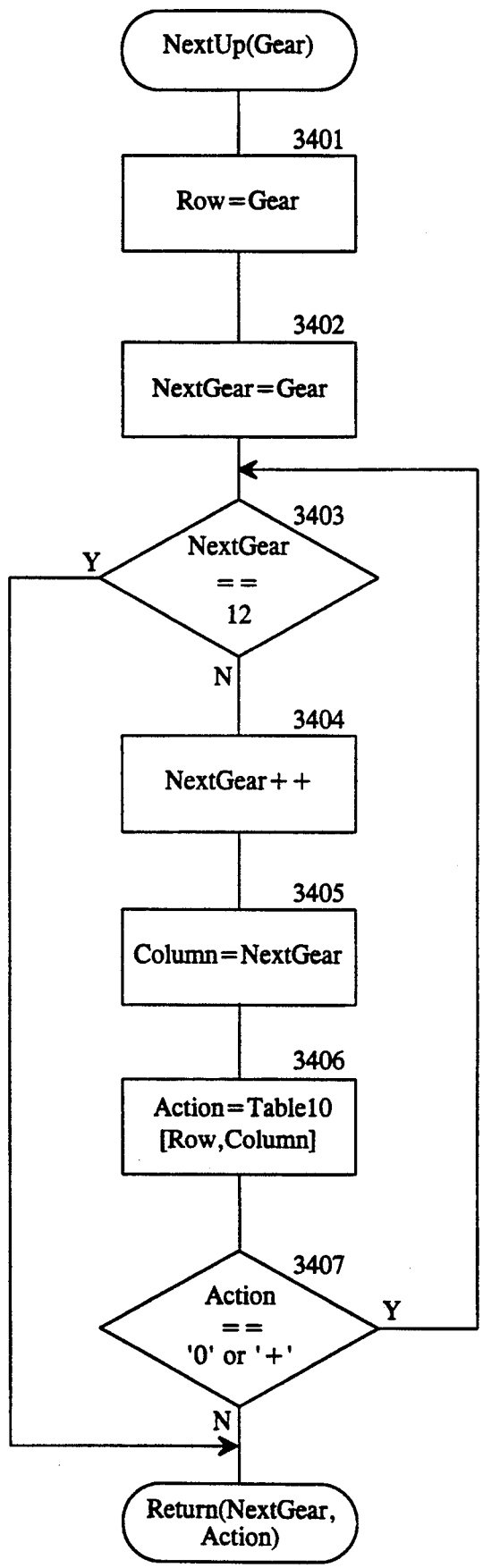
FIG. 34 is a flow diagram of the routine NextUp in a preferred embodiment.

FIG. 34 is a flow diagram of the routine NextUp. This routine determines the next higher legal gear from the current gear in variable Gear and returns the next higher legal gear in variable NextGear and the action needed to get to that gear in variable Action. In step 3401, the system sets variable Row to the variable Gear. In step 3402, the system sets the variable NextGear to the variable Gear. In step 3403, if the variable NextGear equals 12, then there is no higher legal gear and the system returns, else the system continues at step 3404. In step 3404, the system increments the variable NextGear. In step 3404, the system sets variable Column to variable NextGear. In step 3406, the system sets the variable Action to the value in Table 10 indexed by variables Row and Column. In step 3407, if the variable Action equals "0" or a "t," then an illegal shift is required and the system loops to step 3403 to check the next higher gear, else the system returns.

Figure 35:
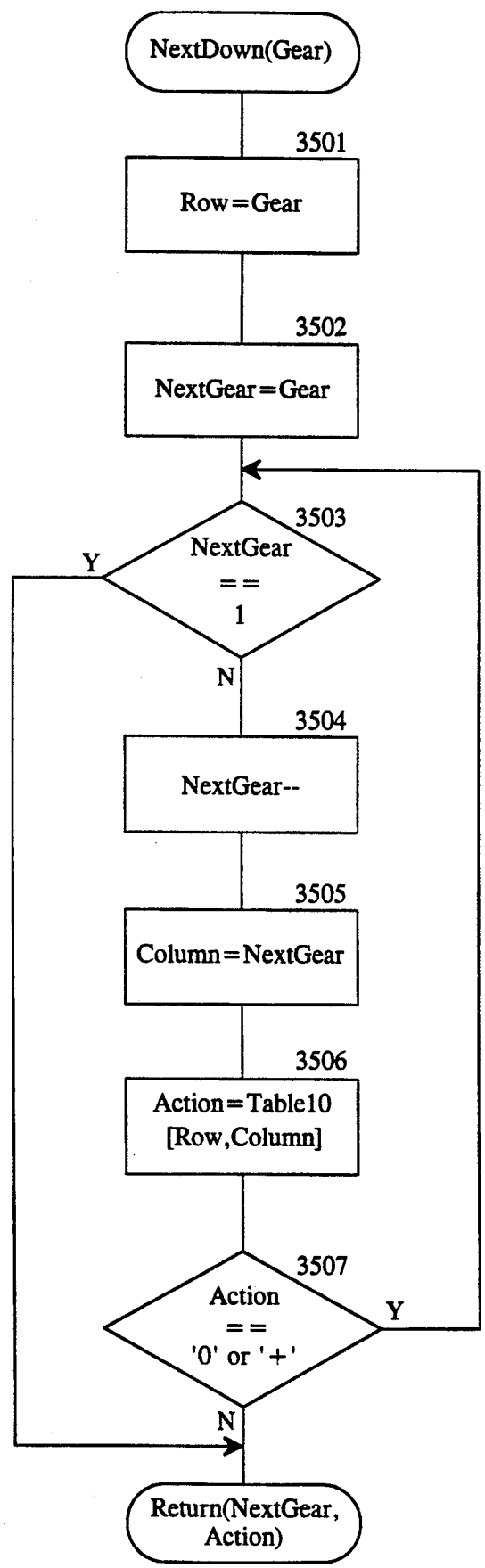
FIG. 35 is a flow diagram of the routine NextDown in a preferred embodiment.

FIG. 35 is a flow diagram of the routine NextDown. This routine is analogous to routine NextUp in that it determines the next legal gear below the current gear.

Figure 36:
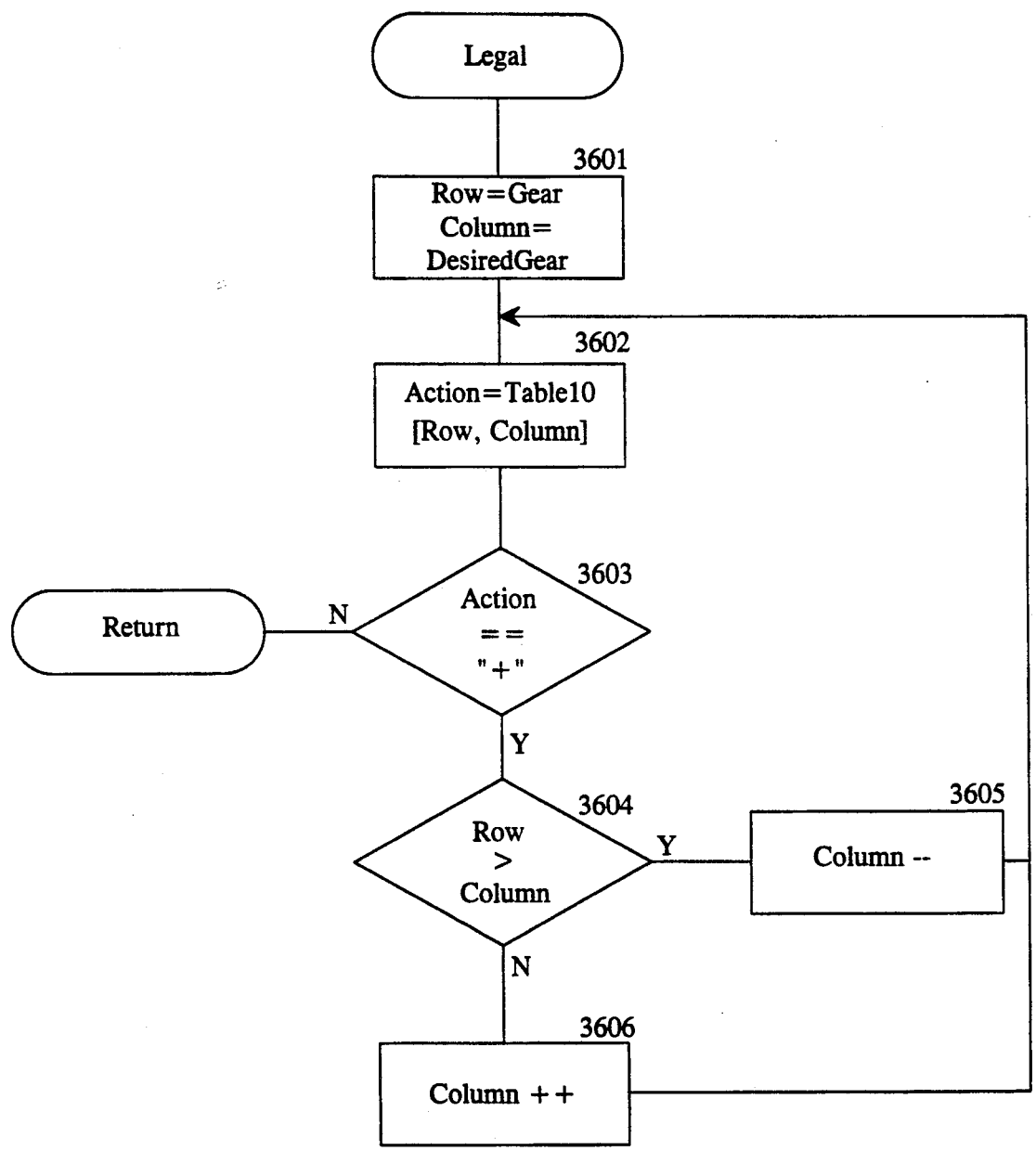
FIG. 36 is a flow diagram of the routine Legal in a preferred embodiment.

FIG. 36 is a flow diagram of the routine Legal. The routine inputs a gear and a desired gear to shift to and returns the action needed to shift. If the action in Table 10 indicates a "+," then the routine returns the action needed to get to the legal gear that is closer to the gear than the desired gear. In step 3601, the system sets variable Row to variable Gear and variable Column to variable DesiredGear. In step 3602, the system retrieves the action from Table 10 indexed by variables Row and Column. In step 3603, if the action is a "+," then the system determines the next legal action and continues at step 3604, else the system returns. In step 3604, if th variable Row is greater than the variable Column, then a shift down is needed and the system decrements variable Column in step 3605 and loops to step 3602, else the system increments variable Column in step 3606 and loops to step 3602.

Figure 37:
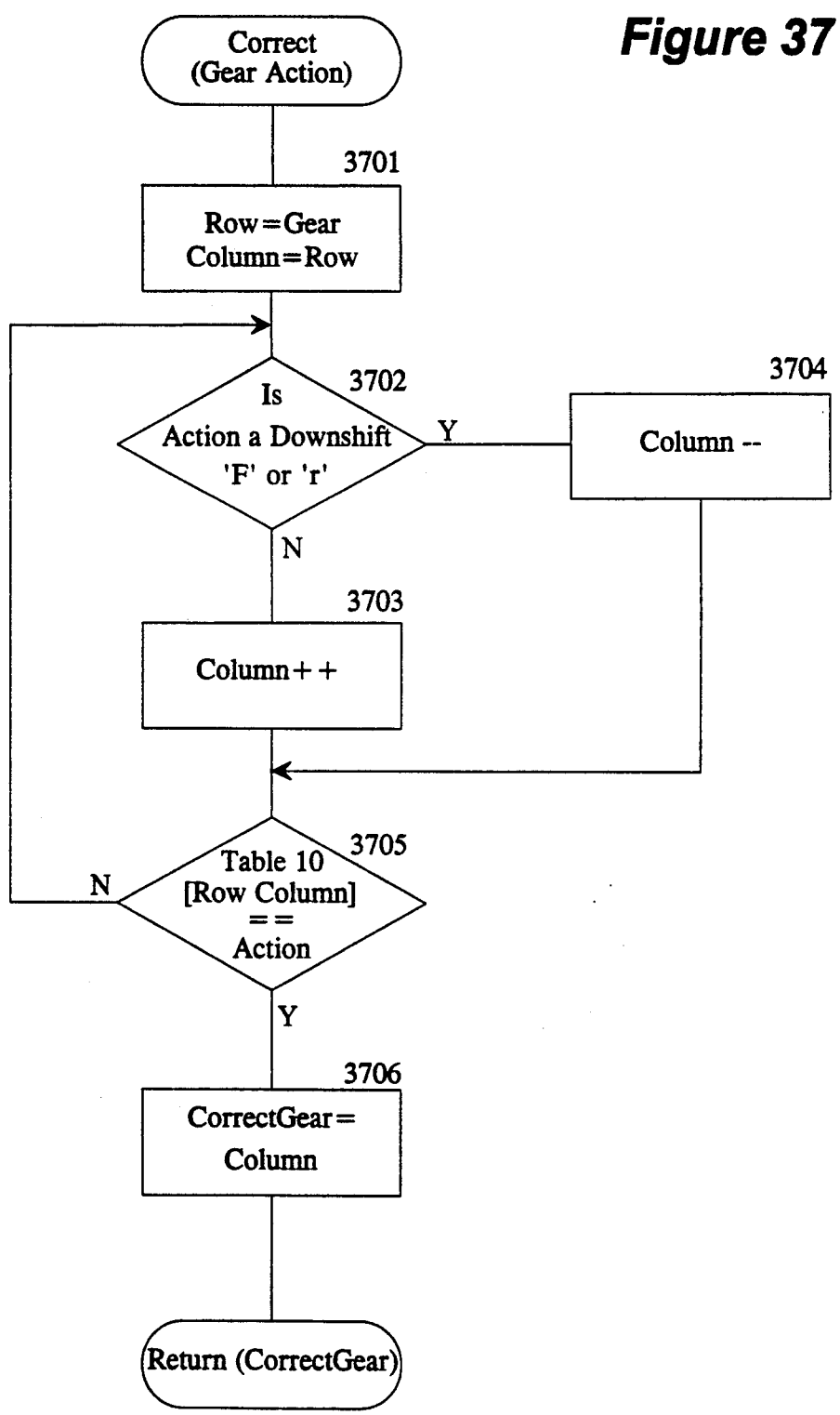
FIG. 37 is a flow diagram of the routine Correct in a preferred embodiment.

FIG. 37 is a flow diagram of the routine Correct. The routine inputs a gear and an action and determines which gear the bicycle will be in after the action is performed. For example, if the bicycle is in gear 6, an "R" action will shift the bicycle to gear 9 as seen in Table 10. In step 3701, the system sets variables Row and Column to the variable Gear. In step 3702, if the action is a down shift, then the system decrements the variable Column in step 3704 and continues at step 3705, else the system increments the variable Column in step 3703 and continues at step 3705. In seep 3705, if Table 10 indexed by variables Row and Column equals the input action, then the system sets the variable CorrectGear in step 3706 and returns, else the system loops to step 3702.

Figure 30:
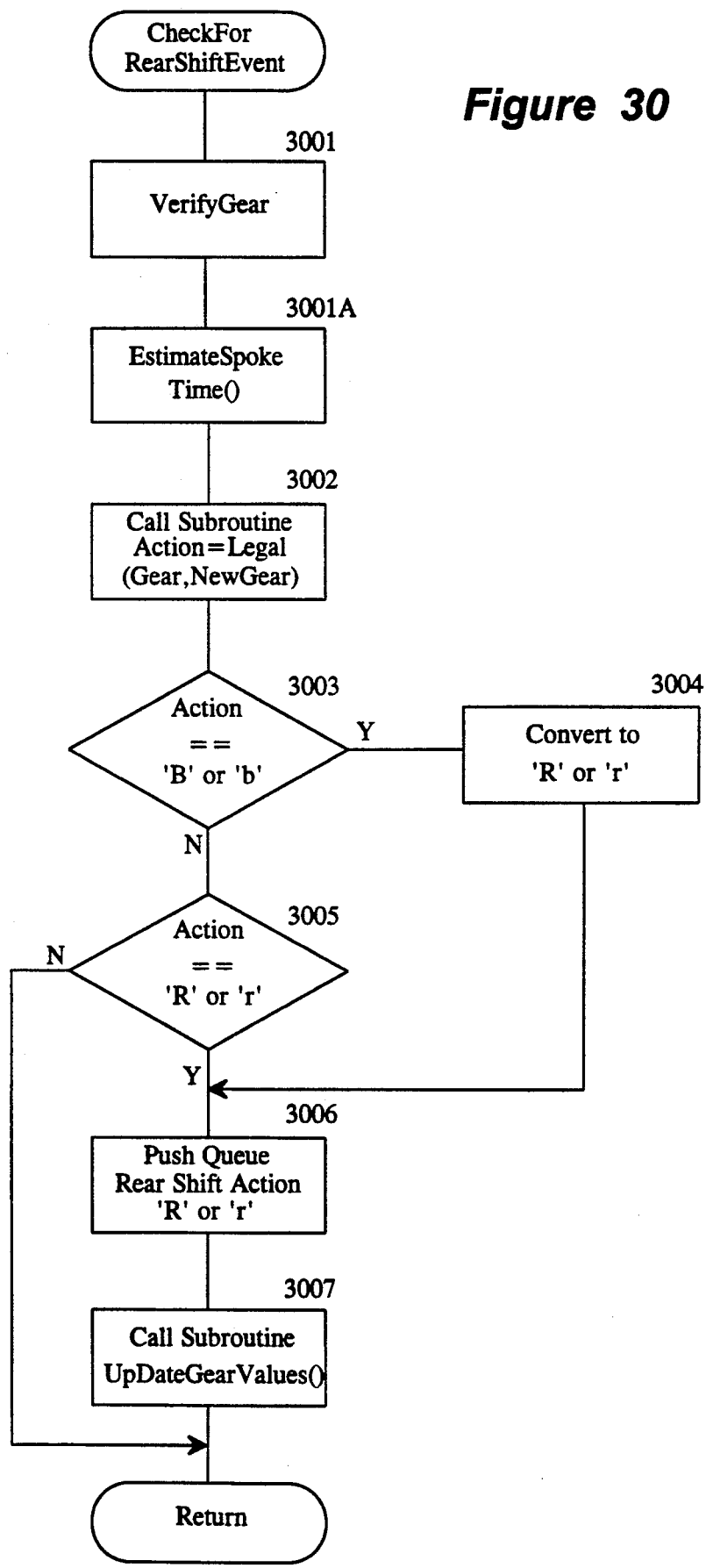
FIG. 30 is a flow diagram of the routine CheckForRearShiftEvent in a preferred embodiment.

FIGS. 30, 31, 32, and 33 are flow diagrams of routines to select a new bicycle gear. FIG. 30 is a flow diagram of the routine CheckForRearShiftEvent. This routine is performed on a "Wheel" event. The system generates a rear shift event ("R" or "r" event) when the bicycle should be shifted into a new gear and a rear shift is needed to shift to the new gear. In step 3001, the system invokes routine VerifyGear to internally correct the current gear when the bicycle is actually in a gear other than the system expected. In step 3001A, the system invokes routine EstimateSpokeTime to update the variable NewGear when the time since the last event that caused the spoke time to be set is greater than the last spoke time. In step 3002, the system invokes routine Legal to determine what action is needed to shift from the current gear to the new gear and sets the variable Action. In step 3003, if the variable Action is "B" or "b," then the system resets the variable Action to an "R" or "r" in step 3004 and continues at step 3006, else the system continues at step 3005. The system converts a "B" or "b" action to an "R" or "r" action which allows an "R" or "r" event to be generated. In step 3005, if the variable Action is "R" or "r," then the system continues at step 3006, else the system returns because a rear shift is not needed. In step 3006, the system generates a rear shift event. In step 3007, the system invokes routine UpdateGearValues to set the variables, Gear, UpGear, and DownGear and returns.

Figure 30A:
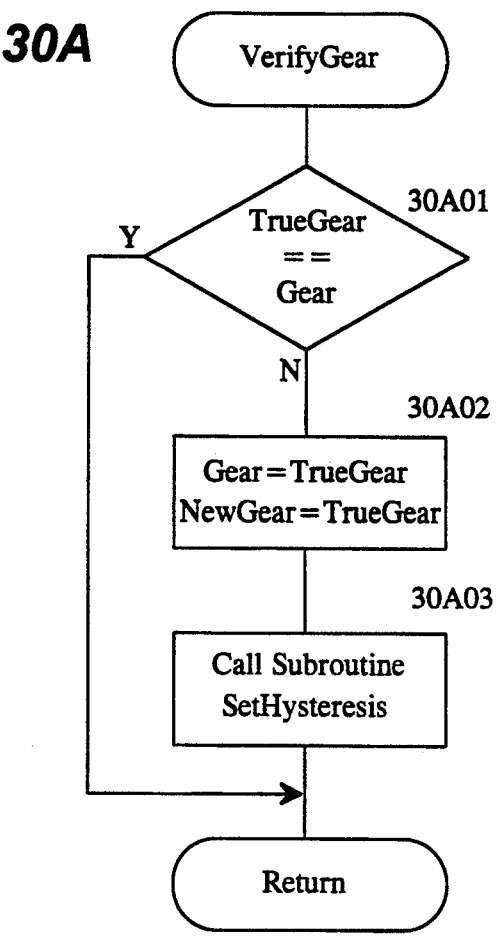
FIG. 30A is a flow diagram of routine VerifyGear in a preferred embodiment.
Figure 30B:
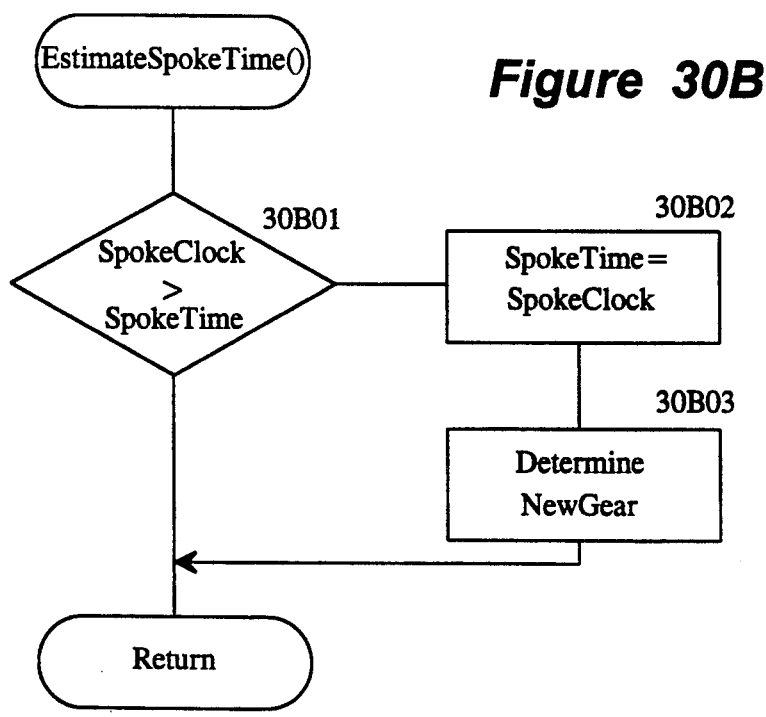
FIG. 30B is a flow diagram of routine EstimateSpokeTime in a preferred embodiment.
Figure 30C:
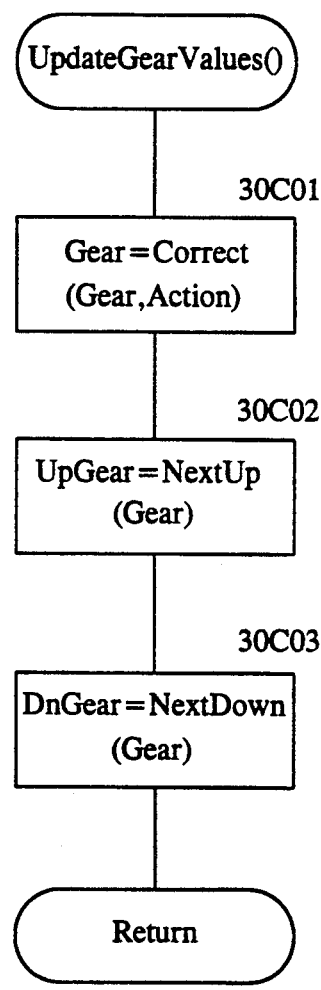
FIG. 30C is a flow diagram of routine UpdateGearValues, in a preferred embodiment.

FIGS. 30A, 30B, and 30C are flow diagrams of routines that are invoked to support the determination of a new gear. FIG. 30A is a flow diagram of routine VerifyGear. This routine internally corrects the current gear because the bicycle is actually in a gear other than the system expected. In step 30A01, if the variable Gear is not equal to the variable TrueGear, then a misshift may have occurred and the bicycle is in a gear other than what the system expected and the system continues at step 30A02, else the system returns. In step 30A02, the system sets the variables Gear and NewGear equal to the variable TrueGear. The variable NewGear contains the gear the bicycle should actually be in. In step 30A03, the system invokes routine SetHysteresis to reset the shift up and shift down points to correspond to the true gear and returns.

FIG. 30B is a flow diagram of routine EstimateSpokeTime. This routine updates the variable NewGear when the time since the last event that caused the spoke time to be set is greater than the last spoke time. In step 30B01, if the variable SpokeClock is greater than variable SpokeTime, then the system continues at step 30B02, else the system returns. In step 30B02, the system sets the variable SpokeTime equal to the variable SpokeClock. In step 30B03, the system invokes routine DetermineNewGear to determine a new gear for the spoke time and the system returns.

FIG. 30C is a flow diagram of routine UpdateGearValues. This routine updates variables Gear, UpGear, and DnGear to reflect the new gear. In step 30C01, the system sets variable Gear to the value returned by routine Correct, which is the actual gear that the action will cause the bicycle to shift to. In step 30C02, the system sets the variable UpGear to the value returned by routine NextUp, which is the next legal gear above the current gear. In step 30C03, the system sets the variable DnGear to the value returned by routine NextDn, which is the next legal gear below the current gear and the system returns.

Figure 31:
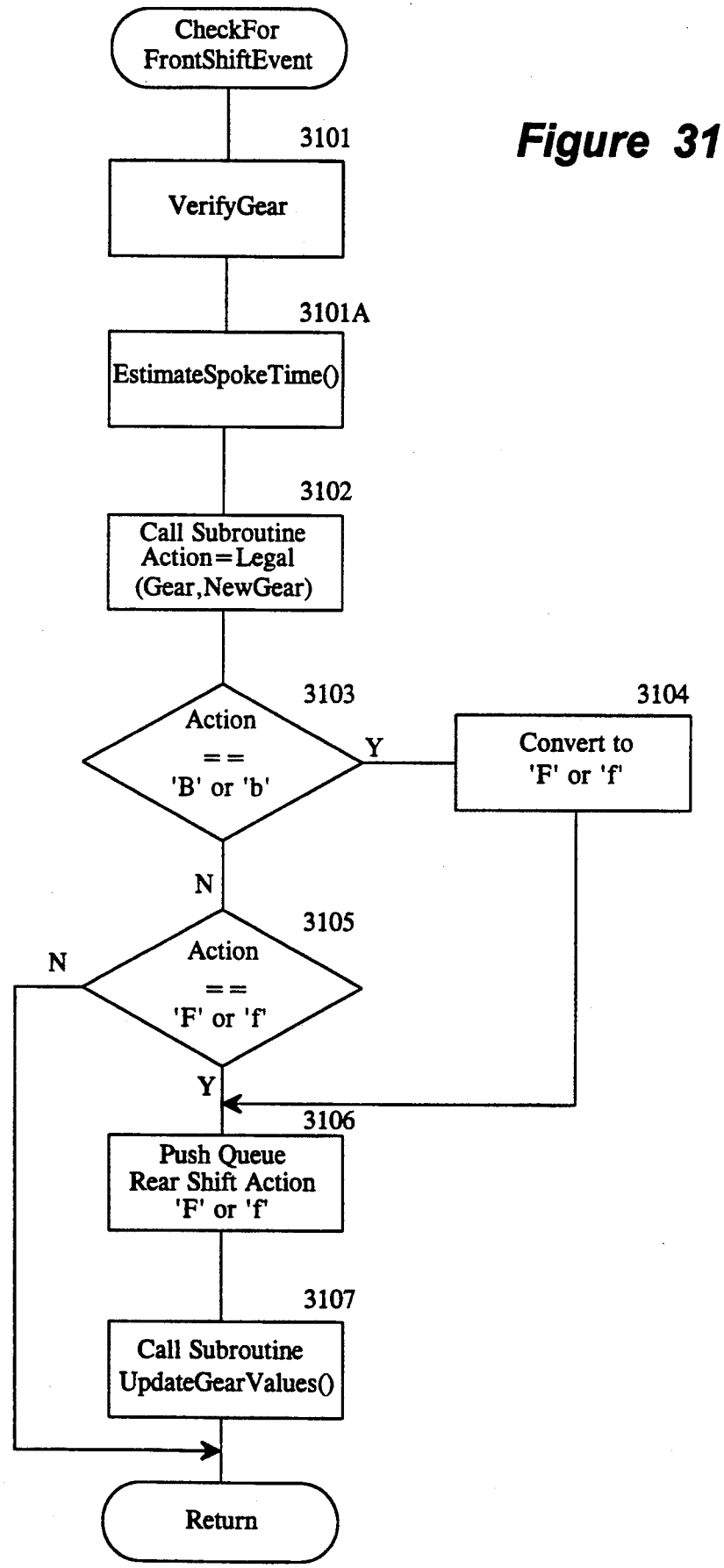
FIG. 31 is a flow diagram of routine CheckForFrontShiftEvent in a preferred embodiment.

FIG. 31 is a flow diagram of routine CheckForFrontShiftEvent. This routine is performed on a "Crank" event. This routine is analogous to the CheckForRearShiftEvent as described above, except that front shift events rather than rear shift events are generated.

Figure 32:
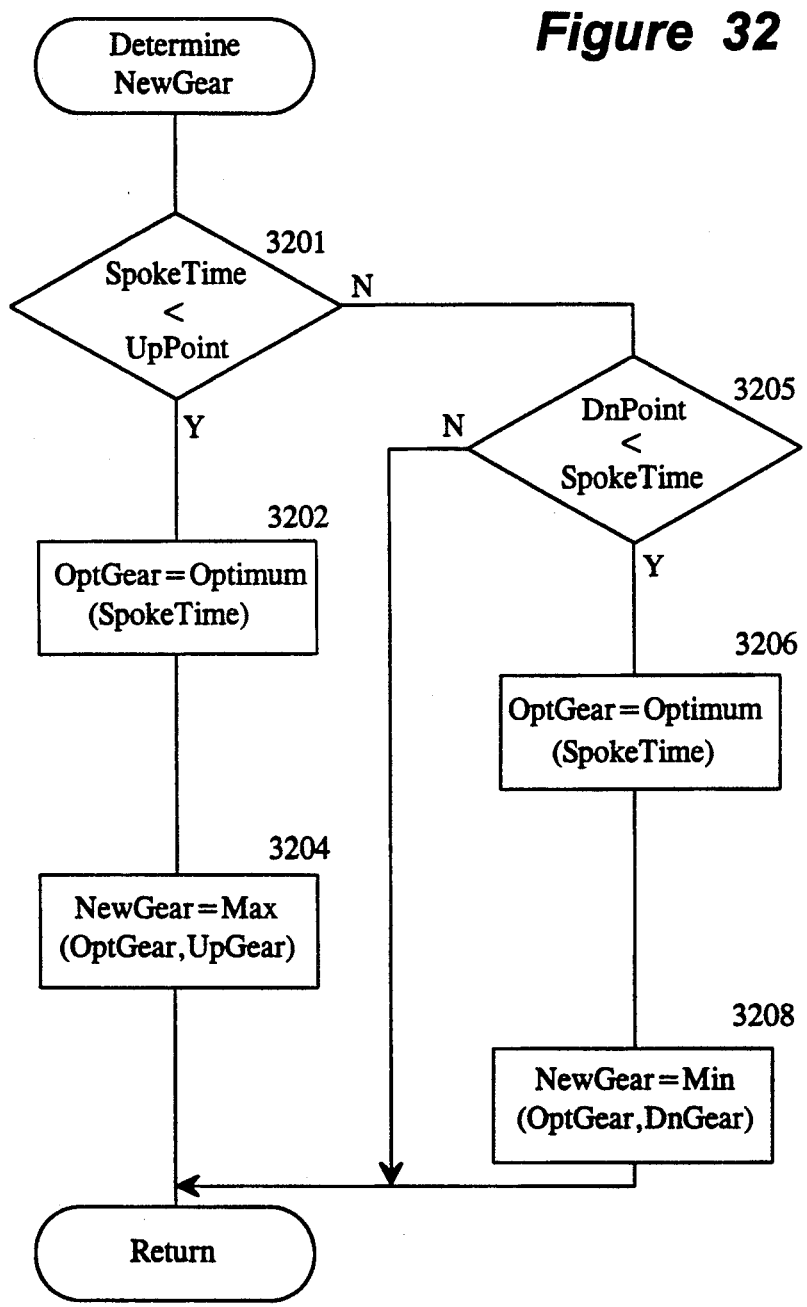
FIG. 32 is a flow diagram of the routine DetermineNewGear in a preferred embodiment.

FIG. 32 is a flow diagram of the routine DetermineNewGear. This routine is performed on a "Spoke" event. The system determines if the current spoke time is outside the shift up and shift down points and determines the new gear for the bicycle. The routine sets the variable NewGear to the new gear. In step 3201, if the variable SpokeTime is less than the variable UpPoint, then the current spoke time is less than the shift up spoke time and the system continues at step 3202, else the system continues at step 3205. In step 3202, the system sets variable OptGear to the value returned by the routine Optimum, which is the gear with a desired spoke time that is closest to the current spoke time. In step 3204, the system sets the variable NewGear equal to the maximum of the variables OptGear and UpGear and returns. The variable NewGear indicates the gear that the bicycle should be shifted to. The routines CheckForRearShiftEvent and CheckForFrontShiftEvent check variable NewGear to determine if a shift is needed. In step 3205, if the variable DnPoint is less than the variable SpokeTime, then the current spoke time is greater than the shift down spoke time and the system continues at step 3206, else the system returns. In step 3206, the system sets variable OptGear to the value returned by routine Optimum, which is the gear with a desired spoke time that is closest to the current spoke time. In step 3208, the system sets the variable NewGear equal to the minimum of the variables OptGear and DnGear and returns.

Figure 32A:
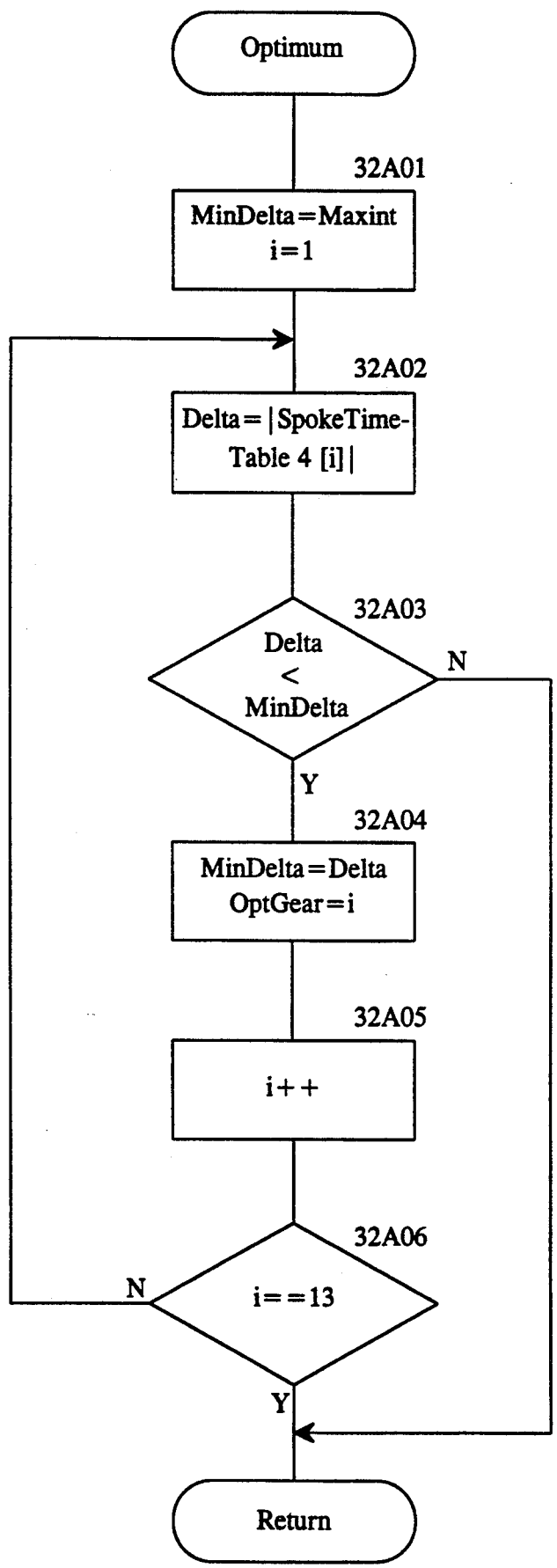
FIG. 32A is a flow diagram of the routine Optimum in a preferred embodiment.

FIG. 32A is a flow diagram of the routine Optimum. This routine is passed a spoke time and returns the gear that has the closest desired spoke time to the passed spoke time. In step 32A01, the system sets variable MinDelta equal to the maximum integer and sets variable i to 1. In step 32A02, the system sets the variable Delta to the absolute value of variable SpokeTime minus the spoke time in the Table 4 entry indexed by the variable i. In step 32A03, if the variable Delta is less than the variable MinDelta, then the entry indexed by variable i is closer to the passed spoke time than the previous entries checked and the system continues at step 32A04, else the system returns. In step 32A04, the system sets the variable MinDelta to the variable Delta and sets the variable OptGear equal to the variable i. In step 32A05, the system increments the variable i. In step 32A06, if the variable i equals 13 then all the entries have been processed and the system returns, else the system loops to step 32A02.

Figure 33:
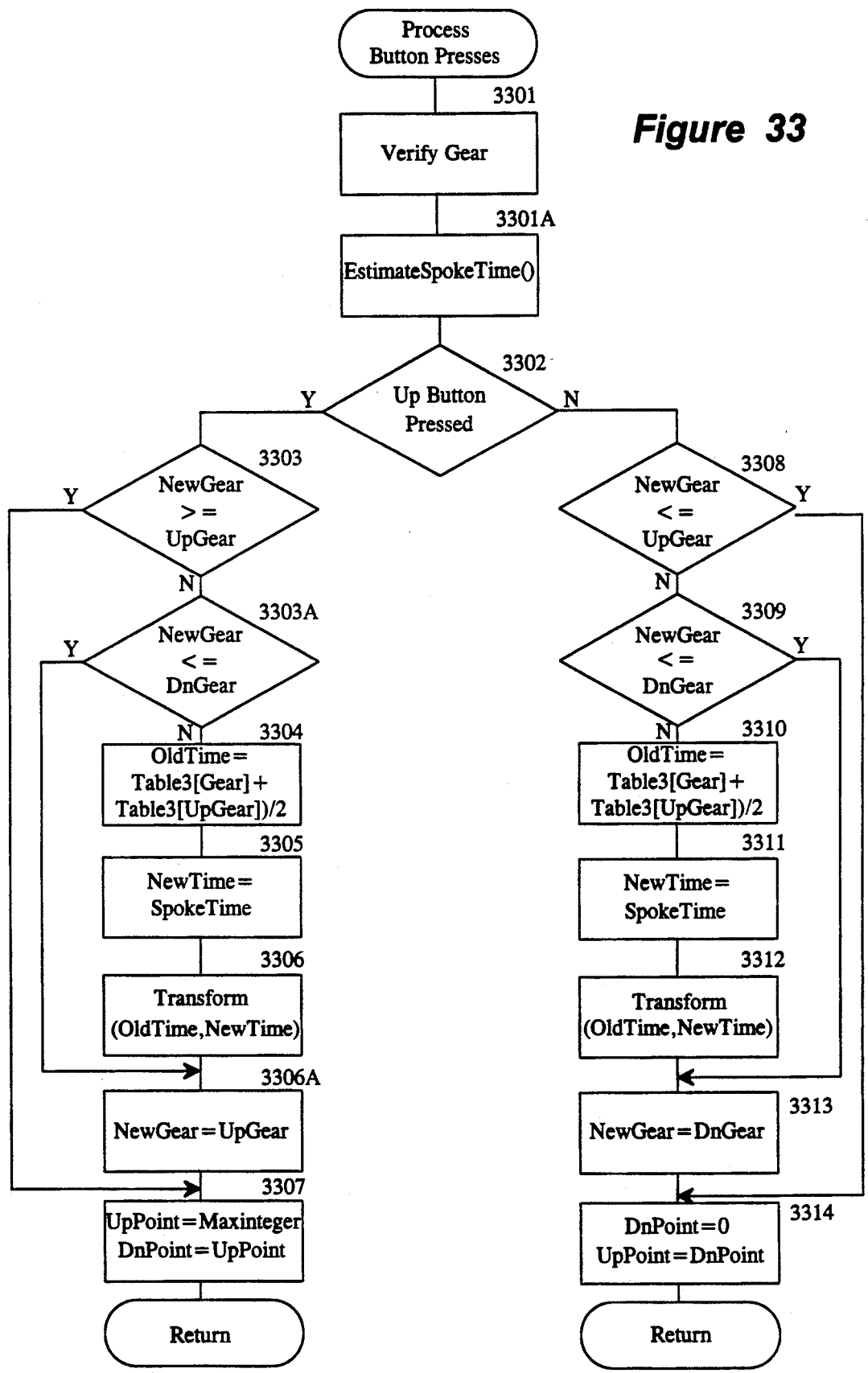
FIG. 33 is a flow diagram of routine ProcessButton in a preferred embodiment.

FIG. 33 is a flow diagram of routine ProcessButton. This routine is performed on either an "UpShift" or a "DownShift" event. This routine, in response to a shift up or shift down button, determines whether a shift is already pending. If a shift is pending (the new gear is outside the range of up gear and down gear), then the routine shifts in the direction of the button pressed. If a shift is not pending, the routine adjusts desired spoke times in Table 4. In step 3301, the system invokes routine Verify. In step 3301A, the system invokes routine EstimateSpokeTime to update the variable NewGear, if necessary. In step 3302, if the up button was pressed, then the system continues at step 3303, else the system continues at step 3308. In steps 3303 through 3307, the system processes the "UpShift" event. In step 3303, if the variable NewGear is greater than or equal to variable UpGear, then a shift is pending and the system continues at step 3307, else the system continues at step 3303A. In step 3303A, if variable NewGear is less than or equal to variable DnGear, then a shift is pending and the system continues at step 3306A, else the system continues at step 3304. In step 3304, the system sets the variable OldTime equal to the sum of entries of the standard spoke time table (Table 3) indexed by the variables Gear and UpGear divided by 2, which is the shift up spoke time. In step 3305, the system sets variable NewTime equal to variable SpokeTime. In step 3306, the system invoke routine Transform to adjust the desired spoke times in the spoke time table. In step 3306A, the system sets the variable NewGear equal to the variable UpGear to indicate that an up shift is to occur. In step 3307, the system sets the variables UpPoint and DownPoint equal to a maximum integer, which causes the routine DetermineNewGear to set a new gear. In steps 3308 through 3314, the system processes a "Down" event. The processing is analogous to the processing of steps 3301 through 3307, except that the variable OldTime is set to the average of the spoke time for the current gear and the gear below and that the system sets the variable NewGear equal to the variable DnGear and the variables DnPoint and UpPoint and UpPoint equal to 0 to effect a down shift.

Figure 33A:
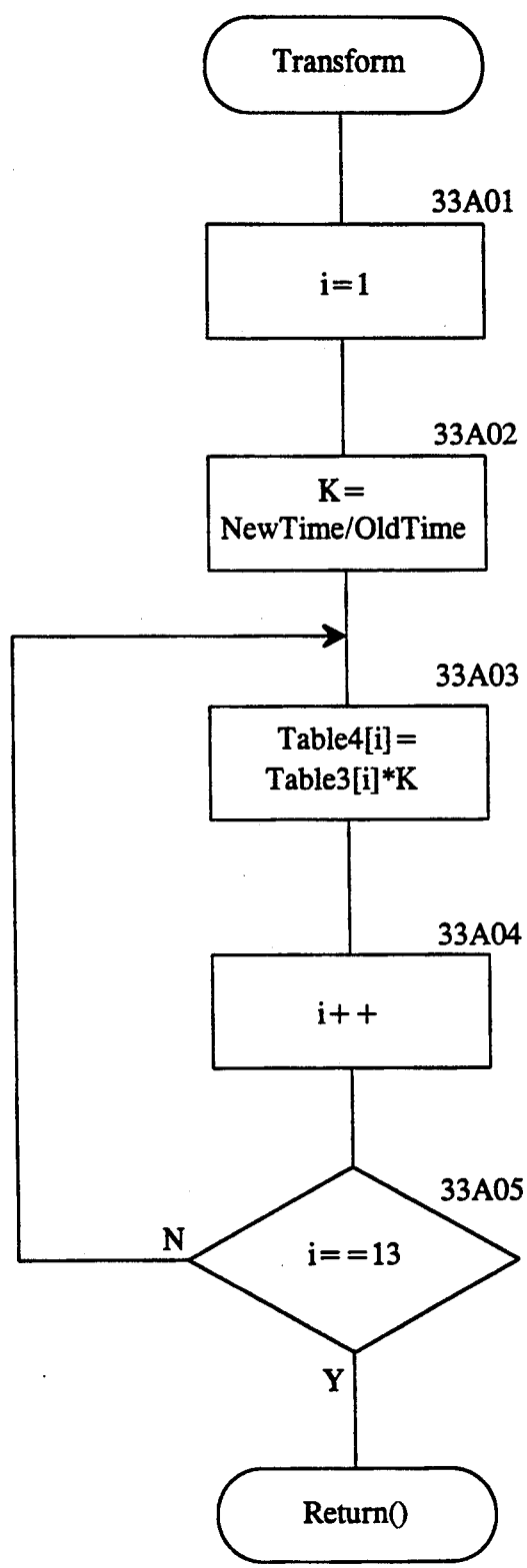
FIG. 33A is a flow diagram of the routine Transform in a preferred embodiment.

FIG. 33A is a flow diagram of the routine Transform. This routine updates the spoke time table (Table 4) based on the passed variables OldTime and NewTime. In step 33A01, the system sets variable i equal to 1 to index the first desired spoke time. In step 33A02, the system sets the variable K to the variable NewTime divided by OldTime. In step 33A03, the system sets the entry in the spoke time table (Table 4) indexed by variable i to the entry in the standard spoke time table (Table 3) indexed by the variable i multiplied by the variable K In step 33A04, the system increments the variable i. In step 33A05, if the variable i is equal to P013, then all the values in the SpokeTime Table have been updated and the system returns, else the system loops to step 33A03.

Although the present invention has been described in terms of preferred embodiments, it is not intended that the invention be limited to these embodiments. Modifications within the spirit of the invention will be apparent t those skilled in the art. The scope of the present invention is defined by the claims that follow.

I claim:

1. A method in a computer-controlled device legal gear shifting system for shifting gears, the device having a front gear assembly and a rear gear assembly, the front gear assembly having a plurality of front gears with varying number of teeth, the rear gear assembly having a plurality of rear gears with varying number of teeth, the device having a front shift mechanism for shifting from one front gear to another and having a rear shift mechanism for shifting from one rear gear to another, the device having a plurality of device gears, each device gear associated with a front gear and a rear gear combination, the device gears being ordered by gear ratios, the gear ratios being the ratio of the number of teeth in the associated front gear to the number of teeth in the associated rear gear, the system having a computer operatively connected to the front and rear shift mechanisms for shifting from one device gear to another, the method comprising the steps of:

determining a current device gear, the current device gear being defined by the front gear and the rear gear currently selected;

determining a next device gear wherein when shifting from the current device gear to the next device gear, the device does not shift into a gear that is not between the current device gear and the next device gear; and controlling the front and rear shift mechanisms to effect a shift from the current device gear to the next device gear.

2. A method in a computer-controlled device shifting system for determining a next device gear in which to shift, the device having a plurality of device gears ordered by gear ratios, the method comprising the steps of:

determining the current device gear selected;

determining legal device gears associated with the current device gear, a legal device gear being a device gear that can be shifted into from the current device gear without shifting into another device gear that has a gear ratio that the next device gear; and selecting the next device gear from the determined legal device gears.

3. The method of claim 2 wherein the device includes a front gear assembly with a plurality of front gears, each front gear having a plurality of teeth, the front gears being ordered by number of teeth, and a rear gear assembly with a plurality of rear gears, each rear gear having a plurality of teeth, the rear gears being ordered by number of teeth, wherein the gear ratio is the ratio of the number of teeth in a front gear to the number of teeth in a rear gear, wherein each device gear has an associated front gear and a rear gear, and wherein the determined legal device gears associated with the current device gear include only those device gears whose associated front gear is ordered next to the current front gear or whose associated rear gear is ordered next to the current rear gear.

4. The method of claim 3 wherein the step of selecting the next device gear includes the steps of determining a desired range of device speeds for the current device gear and selecting the next device gear when the current device speed is outside that range.

5. A method in a computer-controlled shifting system for a multigeared device for shifting from a current device gear to a new device gear, the device having a current speed, the method comprising the steps of shifting the device into a current device gear;

setting a shift speed;

while the device is in the current device gear, adjusting the shift speed; and shifting into a new device gear based on the shift speed and the current speed.

6. The method of claim 5 wherein the step of setting a shift speed sets the shift speed to greater than the current speed.

7. The method of claim 6 wherein the step of shifting into a new device gear shifts when the current speed becomes greater than or equal to the shift speed.

8. The method of claim 6 wherein the step of adjusting the shift speed resets the shift speed when the current speed becomes less than or equal to a desired speed for the current device gear.

9. The method of claim 8 wherein the desired speed is based on a user selection.

10. The method of claim 6 wherein the step of adjusting the shift speed sets the shift speed closer to the current speed.

11. The method of claim 5 wherein the step of setting a shift speed sets the shift speed to less than the current speed.

12. The method of claim 11 wherein the step of shifting into a new device gear shifts when the current speed becomes less than or equal to the shift speed.

13. The method of claim wherein the step of adjusting the shift speed resets the shift speed when the current speed becomes greater than or equal to a desired speed for the current device gear.

14. The method of claim 13 wherein the desired speed is based on a user selection.

15. The method of claim wherein the step of adjusting the shift speed sets the shift speed closer to the current speed.

16. A method in a computer-controlled shifting system for a multigeared device for shifting from a current device gear to a new device gear to maintain a desired cadence, the device gears being ordered from a low gear to a high gear, the device having a current speed, the system for shifting down when the current speed decreases to a shift down speed and for shifting up when the current speed increases to a shift up speed, the method comprising the steps of:

when the current speed decreases to the shift down speed, shifting into a new device gear that is lower than the current device gear;

setting the shift up speed to be greater than the current speed;

setting the shift down speed to be less than the current speed; and resetting the shift up speed to closer to the current speed when the current speed decreases to a predefined speed based on the desired cadence; and when the current speed increases to the shift up speed, shifting into a new device gear that is higher than the current device gear;

setting the shift up speed to be greater than the current speed;

setting the shift down speed to be less than the current speed; and resetting the shift down speed to closer to the current speed when the current speed increases to a predefined speed based on the desired cadence.

17. The method of claim 16 wherein when the current speed decreases to the shift down speed, the shift up speed is set to the speed when the device is in the current device gear and being pedalled at the desired cadence and the shift down speed is set to the average of the speed when the device is in the new device gear and being pedalled at the desired cadence and the speed when the device is in a device gear lower than the new device gear and being pedalled at the desired cadence.

18. The method of claim 17 wherein the shift up speed is reset to the speed that is the average of the speed when the device is the new device gear and being pedalled at the desired cadence and the speed when the device is in the current device gear and being pedalled at the desired cadence.

19. The method of claim 16 wherein the shift up speed is reset when the current speed decreases to the speed when the device is in the new device gear and being pedalled at the desired cadence.

20. The method of claim 16 wherein when the current speed increases to the shift up speed, the shift down speed is set to the speed when the device is in the current device gear and being pedalled at the desired cadence and the shift up speed is set to the average of the speed when the device is in the new device gear and being pedalled at the desired cadence and the speed when the device is in a device gear higher than the new device gear and being pedalled at the desired cadence.

21. The method of claim 20 wherein the shift down speed is reset to the speed that is the average of the speed when the device is the new device gear and being pedalled at the desired cadence and the speed when the device is in the current device gear and being pedalled at the desired cadence.

22. The method of claim 16 wherein the shift down speed is reset when the current speed increases to the speed when the device is in the new device gear and being pedalled at the desired cadence.

23. A method in a computer system for determining a current device gear of a multigeared device, the device having a first gear assembly and a second gear assembly, the computer system having a first sensor for detecting the angular movement of the first gear assembly and a second sensor for detecting the angular movement of the second gear assembly, the first gear assembly having a specified number of gears, the second assembly having specified number of gears, the current device gear indicating a currently selected gear for the first gear assembly and a currently selected gear for the second gear assembly, the method comprising the steps of:

during a specified interval, determining an angle of movement of the first gear assembly and a corresponding angle of movement of the second gear assembly; and determining the current device gear based on the determined angles of movement of the first and second gear assemblies.

24. The method of claim 23 wherein the first sensor generates a first signal each time the first gear assembly rotates through a predetermined first-sensor angle and wherein the second sensor generates a second signal each time the second gear assembly rotates through a second predetermined second-sensor angle, the method including the steps of:

selecting a number of second signals to define the specified interval;

counting the number of first signals generated during the specified interval;

for each device gear, calculating the number of first signals that are generated during the specified interval; and determining the device gear in which the calculated number of first signals most closely corresponds to the counted number of first signals wherein the determined device gear represents the current device gear.

25. The method of claim 24 wherein the selected number of second signals is selected such that the counted number of first signals corresponds to a unique device gear.

26. The method of claim 25 including the step of generating a table containing a plurality of entries, the table indexed by a count of first signals, wherein each entry contains an identifier of the unique device gear corresponding to the indexed count of first signals, whereby the current device gear is determined by retrieving the entry from the table indexed by the counted number of first signals.

27. The method of claim 24 wherein the device has a crank assembly and a hub assembly and the first gear assembly is the crank assembly and the second gear assembly is the hub assembly.

28. A method in a computer-controlled bicycle shifting system for shifting a bicycle, the method comprising the steps of:
determining a new bicycle gear;
determining whether the bicycle is being pedalled in the forward direction; and
shifting to the new bicycle gear when the bicycle is being pedalled in the forward direction.

29. The method of claim 28 wherein the bicycle has a crank assembly, wherein the shifting system includes a crank sensor operatively connected to the computer, the crank sensor for generating a quadrature signal indicating the angular rotation of the crank assembly, and wherein the step of determining whether the bicycle is being pedalled in the forward direction includes the steps of:
sending a quadrature signal from the crank sensor to the computer; and
detecting the direction of pedalling based on the quadrature signal sent from the crank sensor.

30. The method of claim 29 wherein the step of shifting to the new bicycle gear shifts the crank assembly only after the crank assembly has been rotated in the forward direction for a predetermined angular distance.

31. The method of claim 29 wherein the bicycle has a hub assembly and wherein the step of shifting to the new bicycle gear shifts the hub assembly only after the crank assembly has been rotated in the forward direction for a predetermined angular distance.

32. A method in a computer-controlled bicycle shifting system for overriding a computer-generated bicycle gear election, the system having a computer and a shifting mechanism, the computer for generating a bicycle gear selection to maintain a desired cadence and for controlling the shifting mechanism to shift the bicycle into the generated bicycle gear selection, the method comprising the steps of:
detecting a signal indicating that the computer-generated bicycle selection is to be overridden;
determining an overriding bicycle gear selection;
controlling the shifting mechanism to shift the bicycle into the overriding bicycle gear; and
resetting the desired cadence to a new desired cadence based on a current bicycle speed and the determined overriding bicycle gear selection.

33. The method of claim 32 wherein the computer maintains a shift up and a shift down bicycle speed indicating the bicycle speeds at which the computer will automatically shift from a current bicycle gear to a higher and lower bicycle gear, respectively, and wherein the step of resetting the desired cadence to a new desired cadence includes the steps of:
determining the current bicycle speed;
when the overriding bicycle gear is higher than the current bicycle gear, multiplying the desired cadence by the shift up bicycle speed divided by the current bicycle speed; and
when the overriding gear is lower than the current bicycle gear, multiplying the desired cadence by the shift down bicycle speed divided by the current bicycle speed.

34. The method of claim 32 wherein the system includes a cyclist operated shift up and shift down indicator operatively connected to the computer and wherein the step of determining the overriding bicycle gear selection includes the steps of:
when the cyclist indicates a shift up, selecting a bicycle gear that is higher than the current bicycle gear; and
when the cyclist indicates a shift down, selecting a bicycle gear that is lower than the current bicycle gear.

35. A method of controlling a bicycle shift selector, the shift selector for shifting gears of a bicycle, the shift selector having a reversible motor, a pair of latch arms, a lobe positioned between the latch arms and driven by the motor, wherein when the motor is turned in a first direction the lobe strikes a latch arm which effects a shift of the bicycle to a first gear and wherein when the motor is turned in a second direction the lobe strikes the other latch arm which effects a shift of the bicycle to a second gear, the method comprising the steps of:
when shifting into the first gear,
turning the motor in the second direction for a period of time that is not sufficient to effect a shift of the bicycle into the second gear; and
turning the motor in the first direction for a period of time that is sufficient to effect a shift into the first gear.

36. The method of claim 35 wherein the bicycle is in a current gear, wherein the first gear is higher than the current gear, and wherein the second gear is lower than the current gear.

37. The method of claim 35 wherein the bicycle is in a current gear, wherein the first gear is lower than the current gear, and wherein the second gear is higher than the current gear.

38. The method of claim 35 after the motor is turned in the second direction for a period of time, delaying for a period of time before the turning of the motor in the first direction.

39. The method of claim 35 wherein the step of turning the motor in the second direction is suppressed when the last shift of the bicycle was effected by turning the motor in the second direction.

40. A gear shifting system for shifting gears on a bicycle, comprising:
a front gear assembly having a plurality of front gears with varying number of teeth;
a rear gear assembly having a plurality of rear gears with varying number of teeth;
a chain coupled to the front gear assembly for engaging any one of the front gears and to the rear gear assembly for engaging any one of the rear gears;
a front shift mechanism for shifting the chain from engaging one front gear to engaging another;
a rear shift mechanism for shifting the chain from engaging one rear gear to engaging another, wherein the bicycle has a plurality of bicycle gears, each bicycle gear associated with a front gear and a rear gear combination, the bicycle gears being ordered by gear ratios, the gear ratios being the ratio of the number of teeth in the associated front gear to the number of teeth in the associated rear gear; and a computer operatively connected to the front and rear shifting mechanisms, wherein the computer determines a current bicycle gear, the current bicycle gear being defined by the front gear and the rear gear currently engaged by the chain, the computer determines a next bicycle gear wherein when shifting from the current bicycle gear to the next bicycle gear, the bicycle does not shift into a gear that is outside the range of the current bicycle gear and the next bicycle gear, and the computer controls the front and rear shift mechanisms to effect a shift from the current bicycle gear to the next bicycle gear.

41. A computer-controlled shifting system for a multigeared bicycle for shifting from a current bicycle gear to a new bicycle gear, comprising:

means for determining a current speed of the bicycle, the cadence indicating the pedalling rate;

means for shifting the bicycle into a current bicycle gear;

means for setting a shift speed;

means for resetting the shift speed when the bicycle is in the current bicycle gear; and means for shifting into a new bicycle gear when the current speed approaches the shift speed.

42. A system for determining a current bicycle gear of a multigeared bicycle, the bicycle having a first gear assembly and a second gear assembly, comprising:

a first sensor for generating a first signal indicating the angular movement of the first gear assembly;

a second sensor for generating a second signal indicating the angular movement of the second gear assembly; and a computer for receiving the first and second signals, for determining angle of movement of the first gear assembly and the angle of movement of the second gear assembly during an interval, and for determining the current bicycle gear based on the determined angles of movement of the first and second gear assemblies.

43. A bicycle shifting system for shifting a multigeared bicycle, comprising:

means for determining a new bicycle gear;

means for determining whether the bicycle is being pedalled in the forward direction; and means for shifting to the new bicycle gear when the bicycle is being pedalled in the forward direction.

44. The bicycle shifting system of claim 43 wherein the bicycle has a crank assembly, further comprising a crank sensor for generating a quadrature signal indicating the angular rotation of the crank assembly, wherein the means for determining whether the bicycle is being pedalled in the forward direction receives a quadrature signal from the crank sensor and detects the direction of pedalling based on the quadrature signal received from the crank sensor.

45. A bicycle shifting apparatus, the bicycle having a rear wheel, a hub, a crank, a front gear assembly, and a rear gear assembly, comprising:

a rear wheel sensor for detecting the speed of the rear wheel;

a hub sensor for detecting angular movement of the hub;

a crank sensor for detecting angular movement of the crank;

a front gear selector operatively connected to the front gear assembly for shifting front gears;

a rear gear selector operatively connected to the rear gear assembly for shifting rear gears; and a computer for receiving input from the rear wheel sensor, the hub sensor, and crank sensor and controlling the front gear selector and the rear gear selector to effect the shifting of the bicycle.

* * * * *

UNITED STATES PATENT AND TRADEMARK OFFICE
CERTIFICATE OF CORRECTION

PATENT NO.    : 5,261,858
DATED         : November 16, 1993
INVENTOR(S)   : David L. Browning It is certified that error appears in the above-identified patent and that said Letters Patent is hereby corrected as shown below:

In column 26, claim 2, line 34, after "ratio that" and before "the next", please insert --is not between the gear ratio of the current device gear and--.

In column 27, claim 13, line 22, after "claim" and before "wherein", please insert "11".

In column 27, claim 15, line 28, after "claim" and before "wherein", please insert "11".

Signed and Sealed this

Seventh Day of June, 1994

*Attest:*

BRUCE LEHMAN

*Attesting Officer*        Commissioner of Patents and Trademarks

(12) EX PARTE REEXAMINATION CERTIFICATE (5148th)
United States Patent
Browning

(10) Number: US 5,261,858 C1
(45) Certificate Issued: Jul. 19, 2005

(54) METHOD AND SYSTEM FOR COMPUTER-CONTROLLED BICYCLE GEAR SHIFTING

(75) Inventor: David L. Browning, Bainbridge Island, WA (US)

(73) Assignee: Browning Automatic Transmissions Limited Partnership, Bainbridge Island, WA (US)

Reexamination Request:
No. 90/006,489, Dec. 17, 2002

Reexamination Certificate for:
Patent No.: 5,261,858
Issued: Nov. 16, 1993
Appl. No.: 07/901,549
Filed: Jun. 19, 1992

Certificate of Correction issued Jun. 7, 1994.

(51) Int. Cl.[7] ............................................. F16H 59/00
(52) U.S. Cl. .......................................... 474/69; 474/78
(58) Field of Search ............................. 474/69–80, 18; 280/236, 238, 260, 261; 364/424.01, 424.04, 424.05

(56) References Cited

U.S. PATENT DOCUMENTS

| | | | |
|---|---|---|---|
| 3,919,891 A | * | 11/1975 | Stuhlmuller et al. .......... 474/70 |
| 5,059,158 A | | 10/1991 | Bellio et al. |
| 5,213,548 A | * | 5/1993 | Colbert et al. ................ 474/71 |
| 5,254,044 A | * | 10/1993 | Anderson ..................... 474/70 |
| 5,728,017 A | | 3/1998 | Bellio et al. |

* cited by examiner

*Primary Examiner*—Thomas R. Hannon

(57) ABSTRACT

A method and system for computer-controlled shifting of a bicycle is provided. In preferred embodiments, the present invention provides a computer system that detects speed, hub speed, and crank speed, determines the optimum bicycle gear selection to maintain a desired cadence, and shifts the bicycle to the optimum bicycle gear. The computer also inputs a shift up and shift down signals from the cyclist to override the computer-selected gear. When the cyclist indicates a shift up or down, the computer adjusts the desired cadence. The computer determines the gear selection to ensure a uniform transition from the current gear to the next gear. The computer ensures that when shifting from the current gear to the next gear, the bicycle does not transition through a gear that is not between the current and next gears.

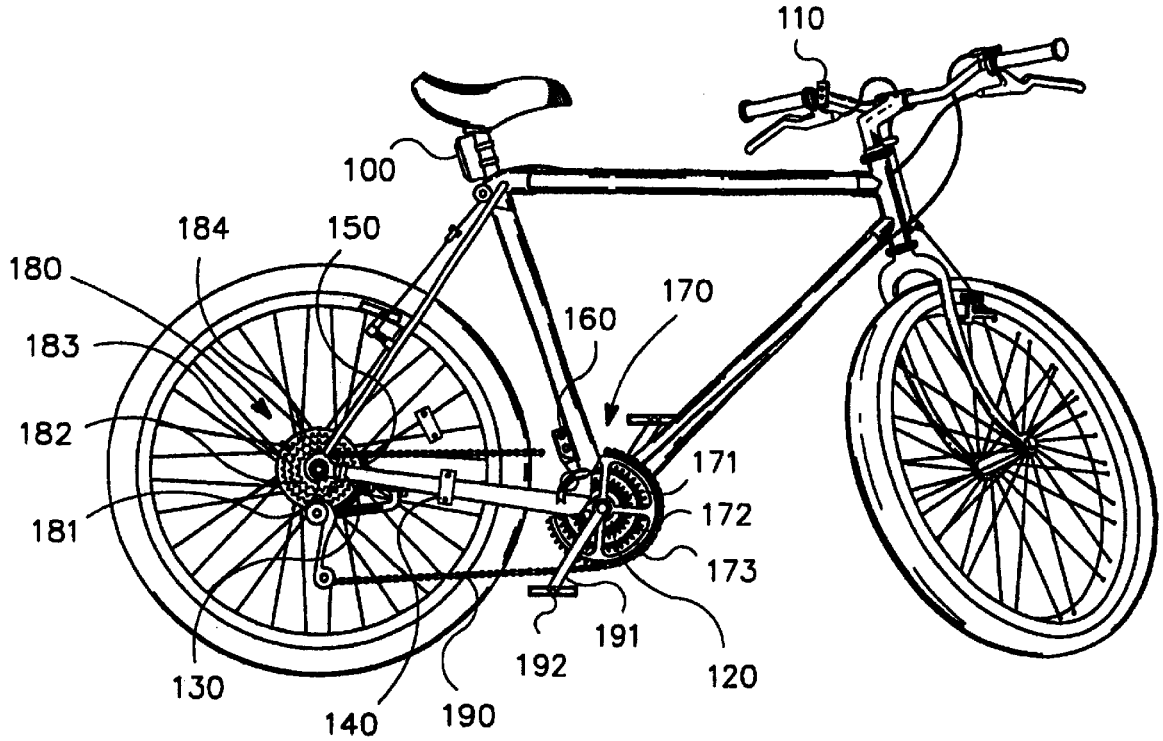

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–27, 32–42 and 45 is confirmed.

Claims 29 and 44 are cancelled.

Claims 28 and 43 are determined to be patentable as amended.

Claims 30 and 31, dependent on an amended claim, are determined to be patentable.

New claims 46–66 are added and determined to be patentable.

28. A method in a computer-controlled bicycle shifting system for shifting a bicycle *having a crank assembly, the shifting system having a crank sensor operatively connected to the computer for generating a quadrature signal indicating the angular rotation of the crank assembly*, the method comprising the steps of:
   determining a new bicycle gear;
   determining whether the bicycle is being pedalled in the forward direction *by*;
      *sending the quadrature signal from the crank sensor to the computer; and*
      *detecting the direction of pedalling based on the quadrature signal sent from the crank sensor;* and
   shifting to the new bicycle gear when the bicycle is being pedalled in the forward direction.

43. A bicycle shifting system for shifting a multigeared bicycle *having a crank assembly*, comprising:
   *a crank sensor for generating a quadrature signal indicating the angular rotation of the crank assembly;*
   means for determining a new bicycle gear;
   means for determining whether the bicycle is being pedalled in the forward direction, *the means for determining whether the bicycle is being pedalled in the forward direction receiving a quadrature signal from the crank sensor and detecting the direction of pedalling based on the quadrature signal received from the crank sensor*; and
   means for shifting to the new bicycle gear when the bicycle is being pedalled in the forward direction.

46. *The method of claim 5 wherein the shifting of the device into the current device gear occurs at the set shift speed.*

47. *The method of claim 46 wherein the device is shifted into the current device gear from a previous device gear.*

48. *The method of claim 47 wherein the previous device gear is the same gear as the new device gear.*

49. *The method of claim 48 wherein when the previous device gear is a lower device gear than the current device gear and the setting of the shift speed sets a shift up speed, the adjusting of the shift speed includes setting a shift down speed to a lower speed than the shift up speed.*

50. *The method of claim 49 including while in the current device gear increasing the previously adjusted shift down speed.*

51. *The method of claim 48 wherein when the previous device gear is a higher device gear than the current device gear and the setting of the shift speed sets a shift down speed, the adjusting of the shift speed includes setting a shift up speed to a higher speed than the shift down speed.*

52. *The method of claim 51 including while in the current device gear decreasing the previously adjusted shift up speed.*

53. *The method of claim 5 wherein the device is shifted into the current device gear from a previous device gear at the set shift speed and wherein*
   *when the previous device gear is a lower device gear than the current device gear and the device shifts into the current device gear at the set shift speed, the adjusting of the shift speed sets a shift down speed to a lower speed than the set shift speed and*
   *when the previous device gear is a higher device gear than the current device gear and the device shifts into the current device gear at the set shift speed, the adjusting of the shift speed sets a shift up speed to a higher speed than the set shift speed.*

54. *The method of claim 53 including*
   *when the previous device gear is lower device gear than the current device gear, increasing the previously adjusted shift down speed; and*
   *when the previous device gear is a higher device gear than the current device gear, decreasing the previously adjusted shift down speed.*

55. *The method of claim 5 wherein the adjusting of the shift speed results in a hysteresis effect.*

56. *The method of claim 5 wherein the setting of the shift speed occurs after the device is shifted into the current device gear.*

57. *The method of claim 56 wherein the adjusting of the shift speed sets the shift speed closer to the current speed.*

58. *The method of claim 57 wherein the adjusting of the shift speed results in an adjustable hysteresis effect.*

59. *The method of claim 5 wherein the shifting of the device into the current device gear occurs in response to receiving a selection of a shift button.*

60. *The method of claim 59 wherein the shift speed is adjusted to maintain a desired cadence.*

61. *The method of claim 5 including selecting as the new device gear a device gear that is not adjacent to the current device gear.*

62. *The method of claim 61 wherein the new device gear is selected such that when shifting from the current device gear to the new device gear the device does not transition through a device gear that is not between the current device gear and the new device gear.*

63. *The method of claim 5 wherein the new device gear is not ordered next to the current device gear.*

64. *The method of claim 63 wherein the shifting from the current device gear to the new device gear is a legal shift.*

65. *The method of claim 63 wherein when shifting, the device does not shift into a device gear that is not between the current device gear and the next device gear.*

66. *The method of claim 63 wherein the device is a bicycle having front gear assembly with multiple gears and a rear gear assembly with multiple gears.*

* * * * *

(12) EX PARTE REEXAMINATION CERTIFICATE (7069th)
United States Patent
Browning

(10) Number: US 5,261,858 C2
(45) Certificate Issued: Sep. 15, 2009

(54) METHOD AND SYSTEM FOR COMPUTER-CONTROLLED BICYCLE GEAR SHIFTING

(75) Inventor: David L. Browning, P.O. Box 10728, Bainbridge Island, WA (US) 98110

(73) Assignee: David L. Browning, Bainbridge Island, WA (US)

Reexamination Request:
No. 90/008,503, Feb. 21, 2007

Reexamination Certificate for:
Patent No.: 5,261,858
Issued: Nov. 16, 1993
Appl. No.: 07/901,549
Filed: Jun. 19, 1992

Reexamination Certificate C1 5,261,858 issued Jul. 19, 2005

Certificate of Correction issued Jun. 7, 1994.

(51) Int. Cl.
*F16H 59/00* (2006.01)

(52) U.S. Cl. .......................................... 474/69; 474/78
(58) Field of Classification Search ............... 474/69–80
See application file for complete search history.

(56) References Cited

U.S. PATENT DOCUMENTS

| 4,490,127 A | 12/1984 | Matsumoto et al. |
| 4,952,196 A | 8/1990 | Chilcote et al. |
| 5,059,158 A | 10/1991 | Bellio et al. |

OTHER PUBLICATIONS

Forester, John, Effective Cycling, 1988, pp. 31–35, published by MIT Press, USA.

*Primary Examiner*—Matthew C. Graham

(57) ABSTRACT

A method and system for computer-controlled shifting of a bicycle is provided. In preferred embodiments, the present invention provides a computer system that detects speed, hub speed, and crank speed, determines the optimum bicycle gear selection to maintain a desired cadence, and shifts the bicycle to the optimum bicycle gear. The computer also inputs a shift up and shift down signals from the cyclist to override the computer-selected gear. When the cyclist indicates a shift up or down, the computer adjusts the desired cadence. The computer determines the gear selection to ensure a uniform transition from the current gear to the next gear. The computer ensures that when shifting from the current gear to the next gear, the bicycle does not transition through a gear that is not between the current and next gears.

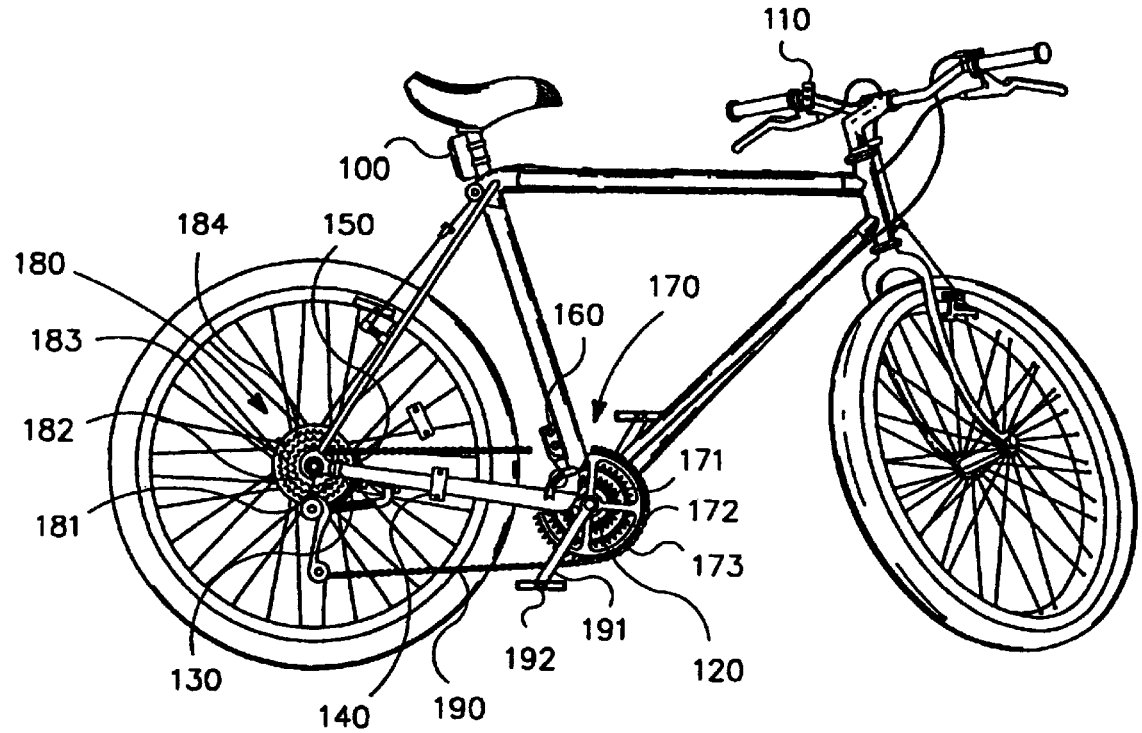

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 29 and 44 were previously cancelled.

Claims 8 and 41 are cancelled.

Claims 5, 7, 9, 10, 16, 53, 54, 55, 61 and 63 are determined to be patentable as amended Claims 6, 11–15, 17–22, 46–52, 56–60, 62 and 64–66, dependent on an amended claim, are determined to be patentable.

New claims 67–75 are added and determined to be patentable.

Claims 1–4, 23–28, 30–40, 42–43 and 45 were not reexamined.

5. A method in a computer-controlled shifting system for a multigeared device for shifting from a current device gear to a new device gear, the device having a current speed, the method comprising the steps of*:*
  shifting the device into a current device gear;
  setting a shift speed;
  while the device is in the current device gear, adjusting the shift speed *by resetting the shift speed when the current speed becomes less than or equal to a desired speed for the current device gear*; and
  shifting into a new device gear based on the shift speed and the current speed.

7. The method of claim [6] *5* wherein the step of shifting into a new device gear shifts when the current speed becomes greater than or equal to the shift speed.

9. The method of claim [8] *5* wherein the desired speed is based on a user selection.

10. The method of claim [6] *5* wherein the step of adjusting the shift speed sets the shift speed closer to the current speed.

16. A method in a computer-controlled shifting system for a multigeared device for shifting from a current device gear to a new device gear to maintain a desired cadence, the device gears being ordered from a low gear to a high gear, the device having a current speed, the system for shifting down when the current speed decreases to a shift down speed and for shifting up when the current speed increases to a shift up speed, the method comprising the steps of:
  when the current speed decreases to the shift down speed[.] *;*
  shifting into a new device gear that is lower than the current device gear;
  setting the shift up speed *in the new device gear* to be greater than the current speed;
  setting the shift down speed *in the new device gear* to be less than the current speed; [and]
  resetting the shift up speed *in the new device gear* to closer to the current speed when the current speed decreases to a predefined speed based on the desired cadence; [and]
  when the current speed increases to the shift up speed[.] *;*
  shifting into a new device gear that is higher than the current device gear;
  setting the shift up speed *in the new device gear* to be greater than the current speed;
  setting the shift down speed *in the new device gear* to be less than the current speed; and
  resetting the shift down speed *in the new device gear* to closer to the current speed when the current speed increases to a predefined speed based on the desired cadence.

53. [The method of claim 5 wherein the device is shifted into the current device gear from a previous device gear at the set shift speed and wherein when] *A method in a computer-controlled shifting system for a multigeared device for shifting from a current device gear to a new device gear, the device having a current speed, the method comprising:*
  *shifting the device into a current device gear;*
  *setting a shift speed;*
  while the device is in the current device gear *and* the previous device gear is a lower device gear than the current device gear and the device shifts into the current device gear at the set shift speed, [the adjusting of the shift speed sets] *adjusting the shift speed by setting* a shift down speed to a lower speed than the set shift speed [and] *responsive to the device speed being equal to or greater than a first desired speed for the current gear*;
  [when] *while* the device is in the current gear *and* the previous device gear is a higher device gear than the current device gear and the device shifts into the current device gear at the set shift speed, [the adjusting of the shift speed sets] *setting* a shift up speed to a higher speed than the set shift speed *responsive to the device speed being equal to or less than a second desired speed for the current gear; and*
  *shifting into a new device gear based on the shift speed and the current speed.*

54. The method of claim 53 including*:*
  when the previous device gear is lower device gear than the current device gear, increasing the previously adjusted shift down speed; and
  when the previous device gear is a higher device gear than the current device gear, decreasing the previously adjusted shift down speed.

55. [The method of claim 5 wherein] *A method in a computer-controlled shifting system for a multigeared device for shifting from a current device gear to a new device gear, the device having a current speed, the method comprising:*
  *shifting the device into a current device gear;*
  *setting a shift speed;*
  *while the device is in the current device gear,* adjusting the *shift speed* the adjusting of the shift speed [result] *to results* in a hysteresis effect*; and*
  *shifting into a new device gear based on the shift speed and the current speed.*

61. [The method of claim 5 including selecting as the new device gear] *A method in a computer-controlled shifting system for a multigeared device for shifting from a current device gear to a new device gear, the device having a current speed, the method comprising:*

*shifting the device into a current device gear;*

*setting a shift speed;*

*while the device is in the current device gear, adjusting the shift speed; and* shifting into a device gear that is not adjacent to the current device gear *based on the shift speed and the current speed.*

63. [The method of claim 5 wherein the] *A method in a computer-controlled shifting system for a multigeared device for shifting from a current device gear to a new device gear, the device having a current speed, the method comprising:*

*shifting the device into a current device gear;*

*setting a shift speed;*

*while the device is in the current device gear, adjusting the shift speed; and* shifting into *a* new device gear *that* is not ordered next to the current device gear.

67. *A method in a computer-controlled shifting system for a multigeared device for shifting from a current device gear to a new device gear, the device having a current speed, the method comprising the steps of:*

*shifting the device into a current device gear;*

*setting a shift speed to less than the current speed;*

*while the device is in the current device gear, adjusting the shift speed by resetting the shift speed when the current speed becomes greater than or equal to a desired speed for the current device gear; and*

*shifting into a new device gear based when the current speed becomes less than or equal to the shift speed.*

68. *The method of claim 67 wherein the desired speed is based on a user selection.*

69. *The method of claim 67 wherein the step of adjusting the shift speed sets the shift speed closer to the current speed.*

70. *A method in a computer-controlled shifting system for a multigeared device for shifting from a current device gear to a new device gear, the device having a current speed, the method comprising:*

*shifting the device into a current device gear from a previous device gear that is lower than the current device gear when the current speed reaches a first shift speed in the previous device gear;*

*setting a shift speed in the current device gear to a shift speed that is lower than the first shift speed in the previous device gear;*

*while the device is in the current device gear, adjusting the shift speed in the current gear from the shift speed that is lower than the first shift speed in the previous device gear to a shift speed that is higher than the first shift speed in the previous device gear; and*

*while the device is in the current device gear, shifting into a new device gear based on the adjusted shift speed and the current speed.*

71. *The method of claim 70 wherein the act of adjusting the shift speed in the current gear occurs in the response to the current speed increasing to a desired speed for the current gear.*

72. *The method of claim 70 wherein the act of adjusting the shift speed in the current gear occurs in the response to the current device cadence increasing to a desired cadence, the desired cadence being substantially the same for a plurality of the device gears.*

73. *A method in a computer-controlled shifting system for a multigeared device for shifting from a current device gear to a new device gear, the device having a current speed, the method comprising:*

*shifting the device into a current device gear from a previous device gear that is higher than the current device gear when the current speed reaches a first shift speed in the previous device gear;*

*setting a shift speed in the current device gear to a shift speed that is higher than the first shift speed in the previous device gear;*

*while the device is in the current device gear, adjusting the shift speed in the current gear from the shift speed that is higher than the first shift speed in the previous device gear to a shift speed that is lower than the first shift speed in the previous device gear; and*

*while the device is in the current device gear, shifting into a new device gear based on the adjusted shift speed and the current speed.*

74. *The method of claim 73 wherein the act of adjusting the shift speed in the current gear occurs in the response to the current speed decreasing to a desired speed for the current gear.*

75. *The method of claim 73 wherein the act of adjusting the shift speed in the current gear occurs in response to a current device cadence decreasing to a desired cadence, the desired cadence being substantially the same for a plurality of the device gear.*

* * * * *